Jan. 27, 1942.   J. W. BRYCE ET AL   2,271,249
MULTIPLYING AND ACCOUNTING MACHINE
Filed July 5, 1929    34 Sheets-Sheet 1

Jan. 27, 1942.  J. W. BRYCE ET AL  2,271,249

MULTIPLYING AND ACCOUNTING MACHINE

Filed July 5, 1929   34 Sheets-Sheet 2

Jan. 27, 1942.  J. W. BRYCE ET AL  2,271,249
MULTIPLYING AND ACCOUNTING MACHINE
Filed July 5, 1929   34 Sheets-Sheet 3

Jan. 27, 1942.   J. W. BRYCE ET AL   2,271,249
MULTIPLYING AND ACCOUNTING MACHINE
Filed July 5, 1929   34 Sheets-Sheet 4

Jan. 27, 1942.  J. W. BRYCE ET AL  2,271,249
MULTIPLYING AND ACCOUNTING MACHINE
Filed July 5, 1929  34 Sheets-Sheet 7

Jan. 27, 1942.　　J. W. BRYCE ET AL　　2,271,249
MULTIPLYING AND ACCOUNTING MACHINE
Filed July 5, 1929　　34 Sheets-Sheet 8

Jan. 27, 1942.   J. W. BRYCE ET AL   2,271,249
MULTIPLYING AND ACCOUNTING MACHINE
Filed July 5, 1929   34 Sheets-Sheet 14
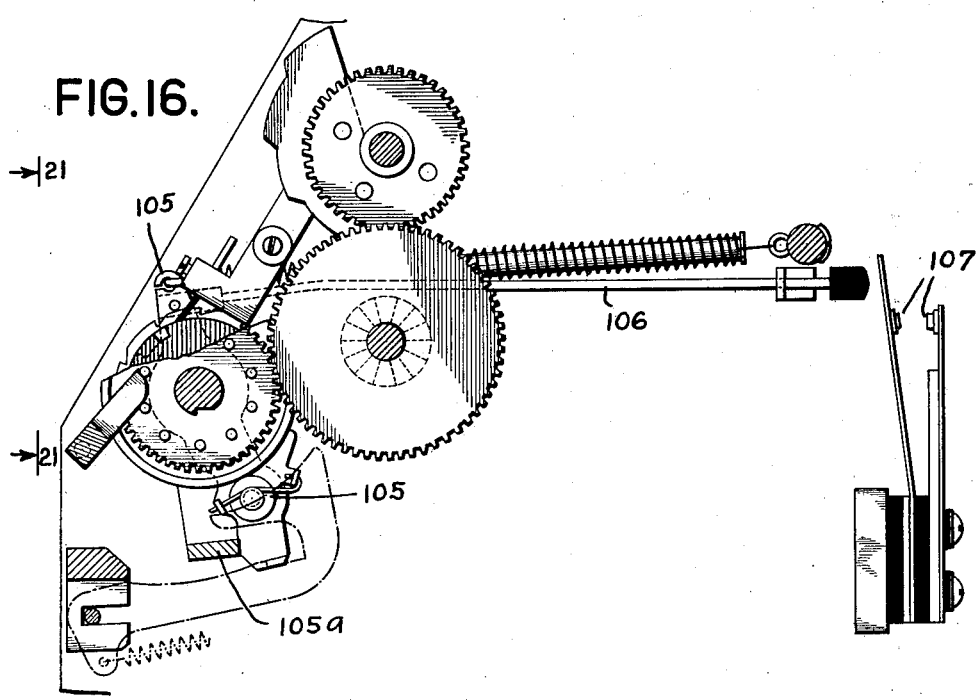
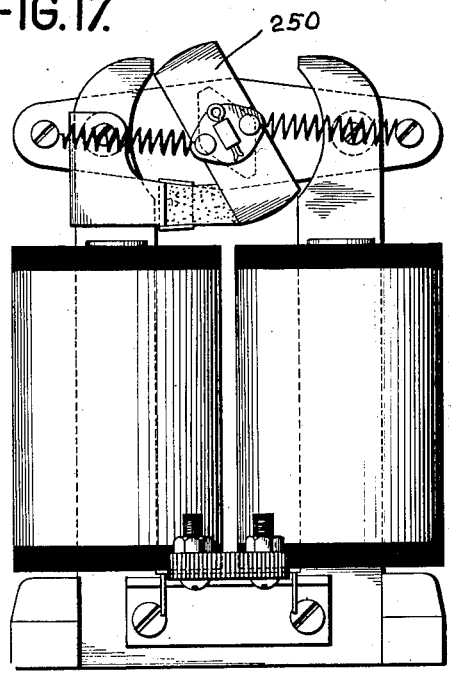
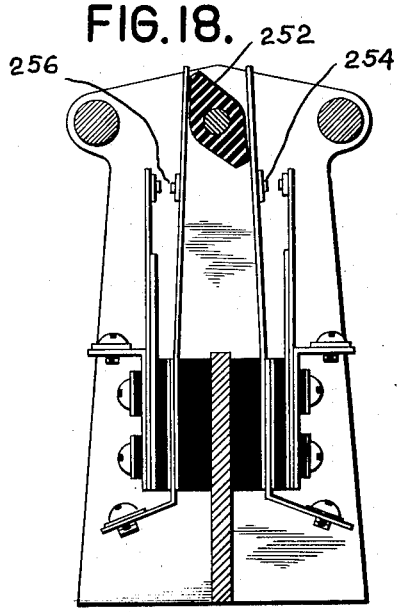
Inventors
James W. Bryce
George F. Daly
By their Attorneys
Cooper, Kerr & Dunham Jan. 27, 1942. J. W. BRYCE ET AL 2,271,249
MULTIPLYING AND ACCOUNTING MACHINE
Filed July 5, 1929 34 Sheets-Sheet 15

Inventors
James W. Bryce
George F. Daly
By their Attorneys
Cooper, Kerr Dunham

Jan. 27, 1942. J. W. BRYCE ET AL 2,271,249
MULTIPLYING AND ACCOUNTING MACHINE
Filed July 5, 1929 34 Sheets-Sheet 18

Inventors
James W. Bryce
George F. Daly
By their Attorneys
Cooper, Kerr & Dunham Jan. 27, 1942.    J. W. BRYCE ET AL    2,271,249
MULTIPLYING AND ACCOUNTING MACHINE
Filed July 5, 1929    34 Sheets-Sheet 19

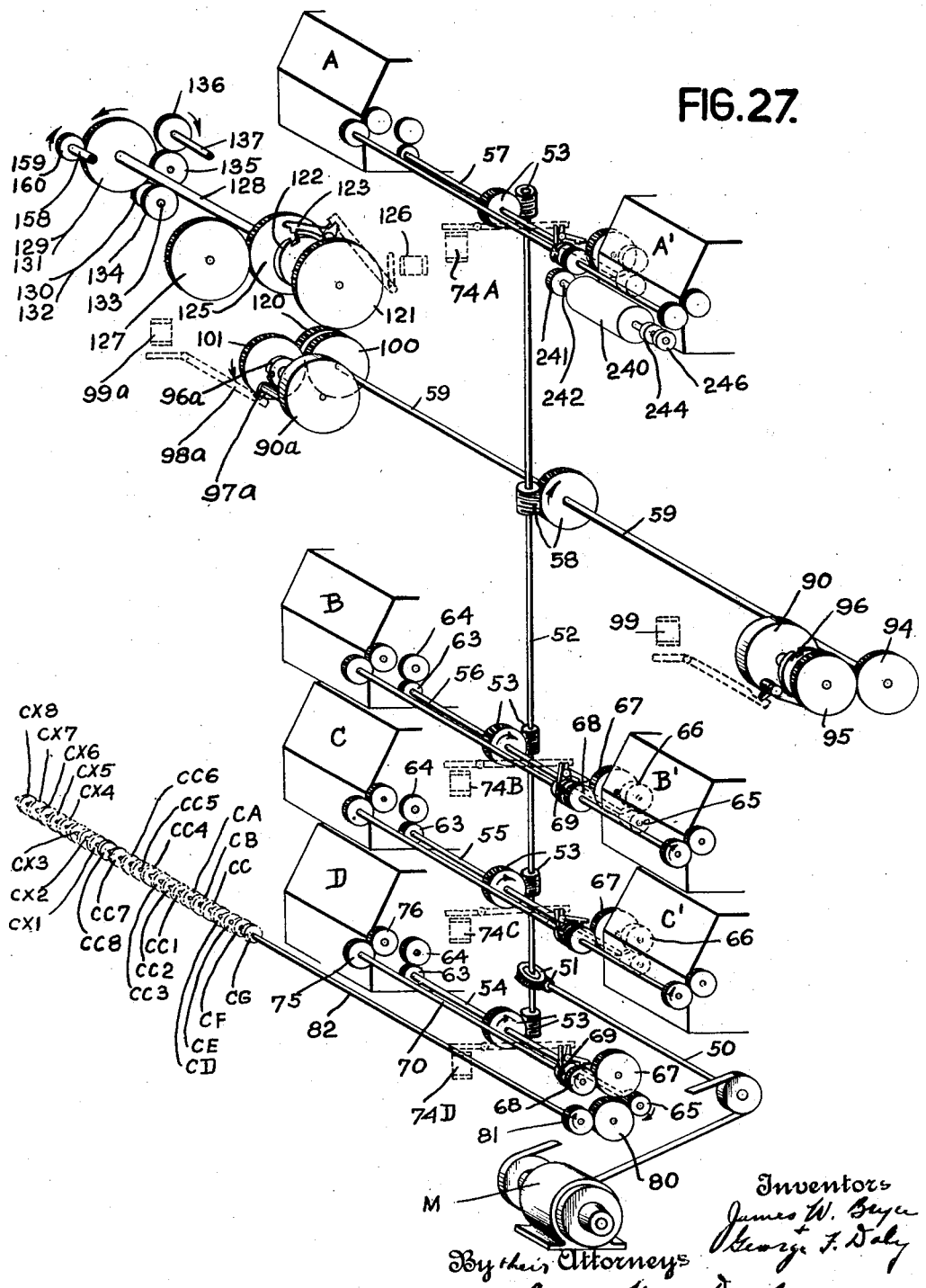

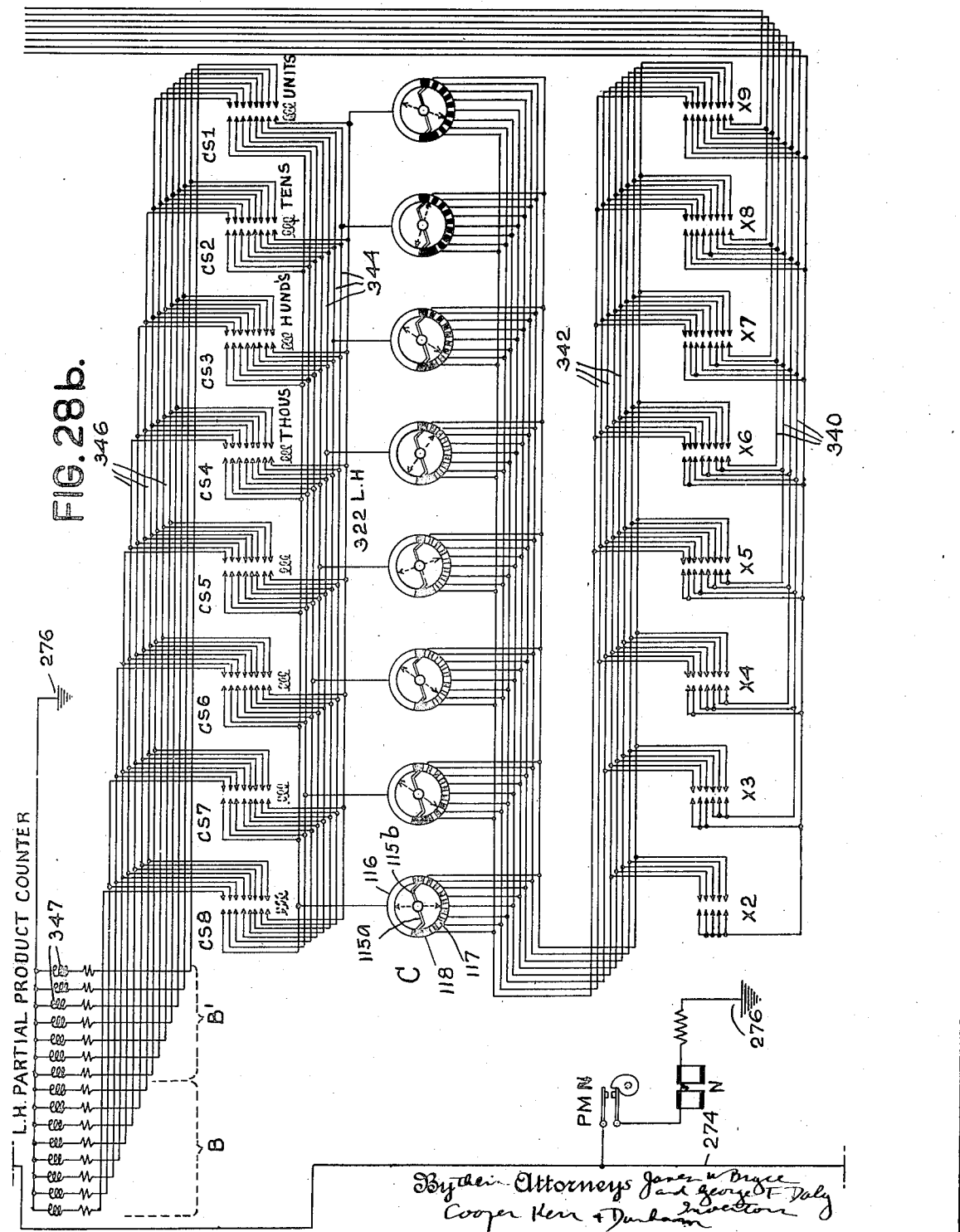

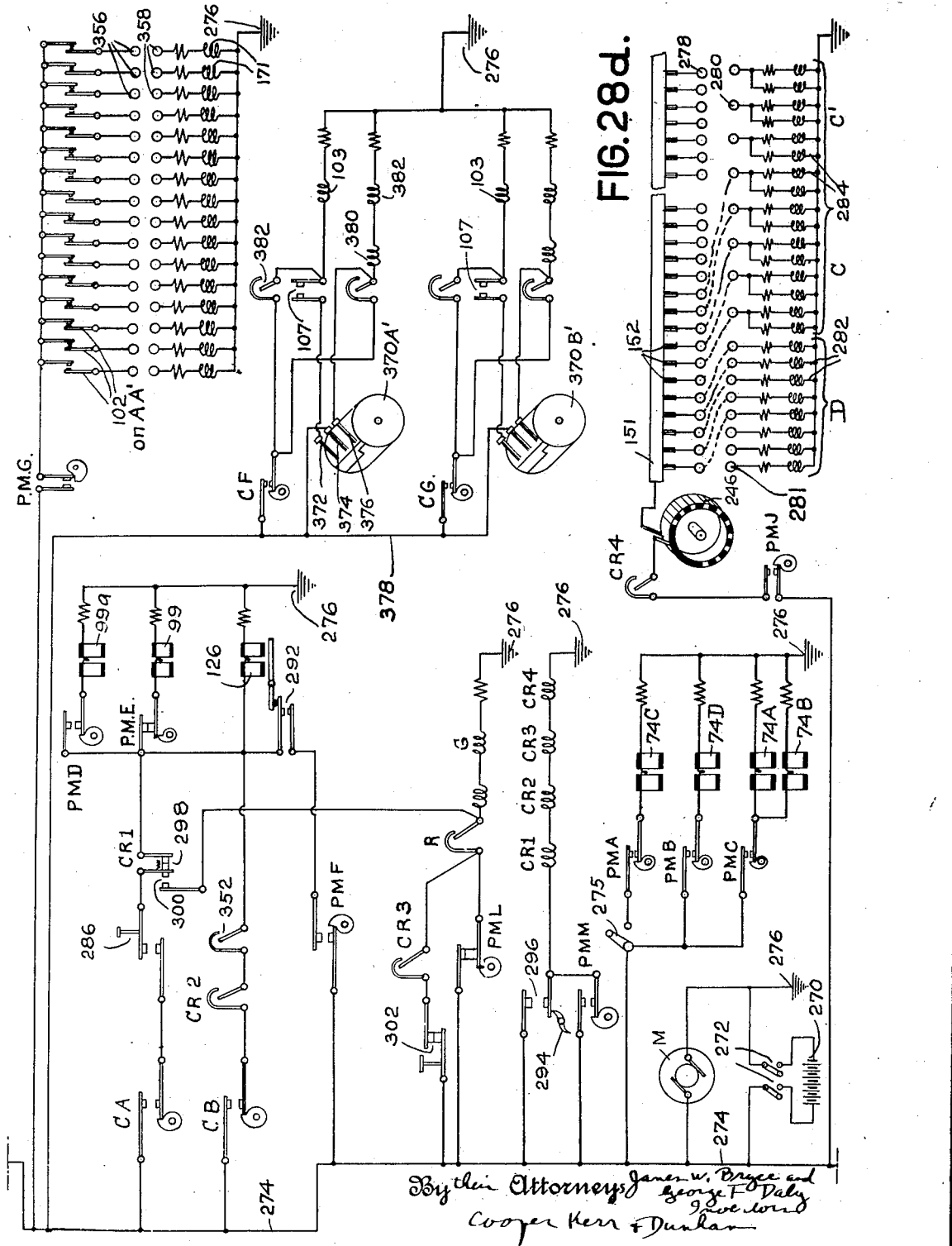

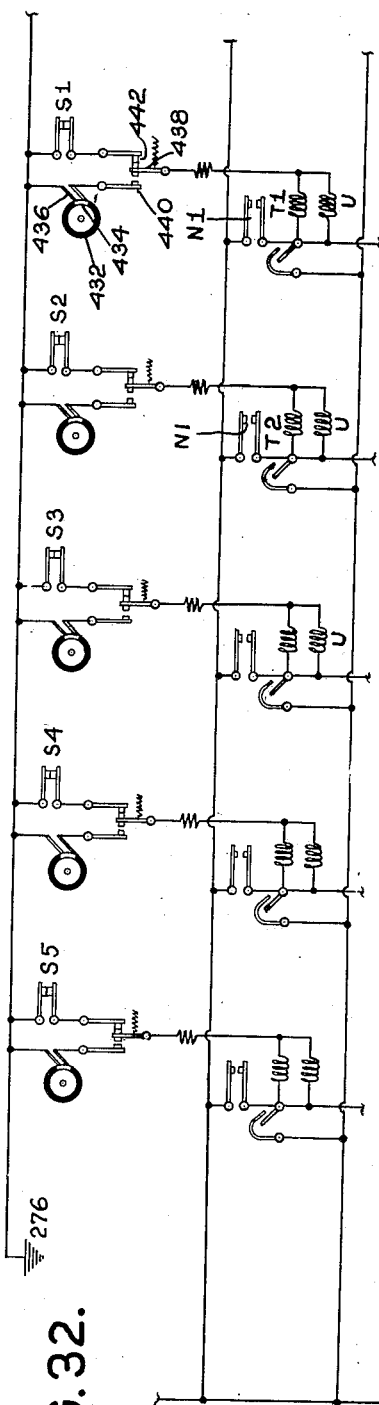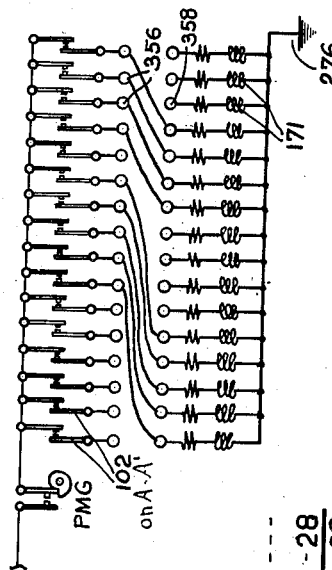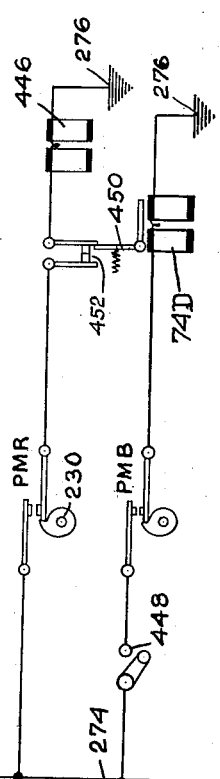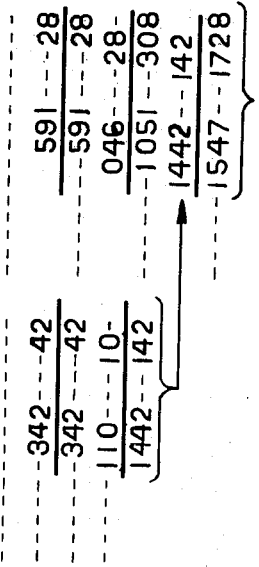

Jan. 27, 1942. J. W. BRYCE ET AL 2,271,249
MULTIPLYING AND ACCOUNTING MACHINE
Filed July 5, 1929 34 Sheets-Sheet 27

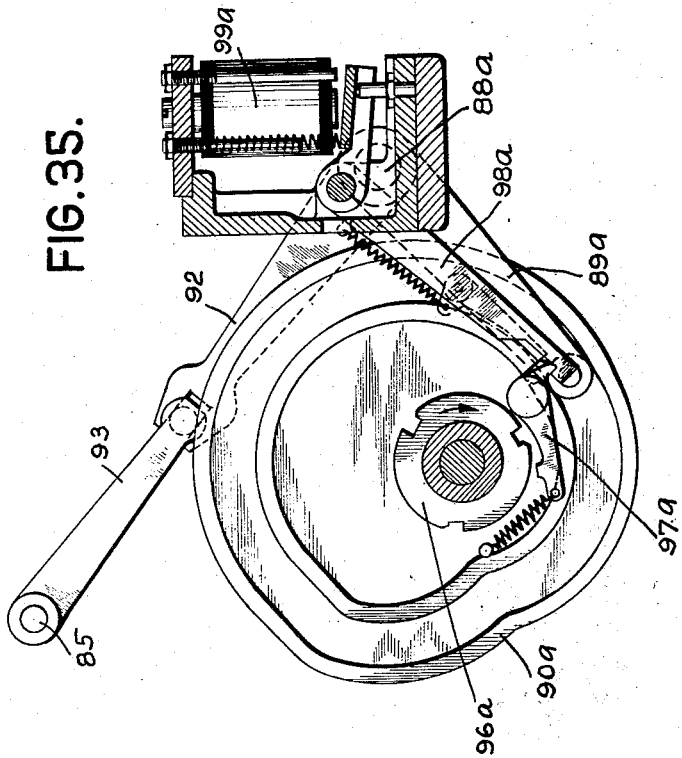
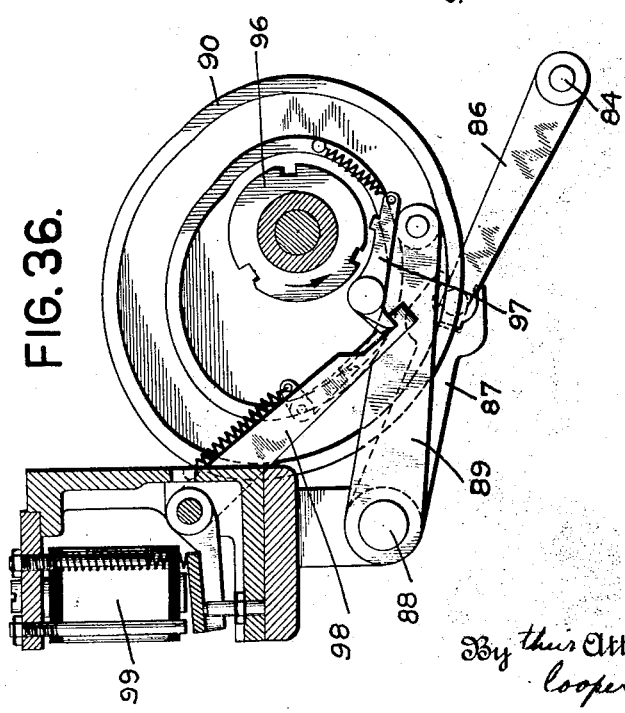

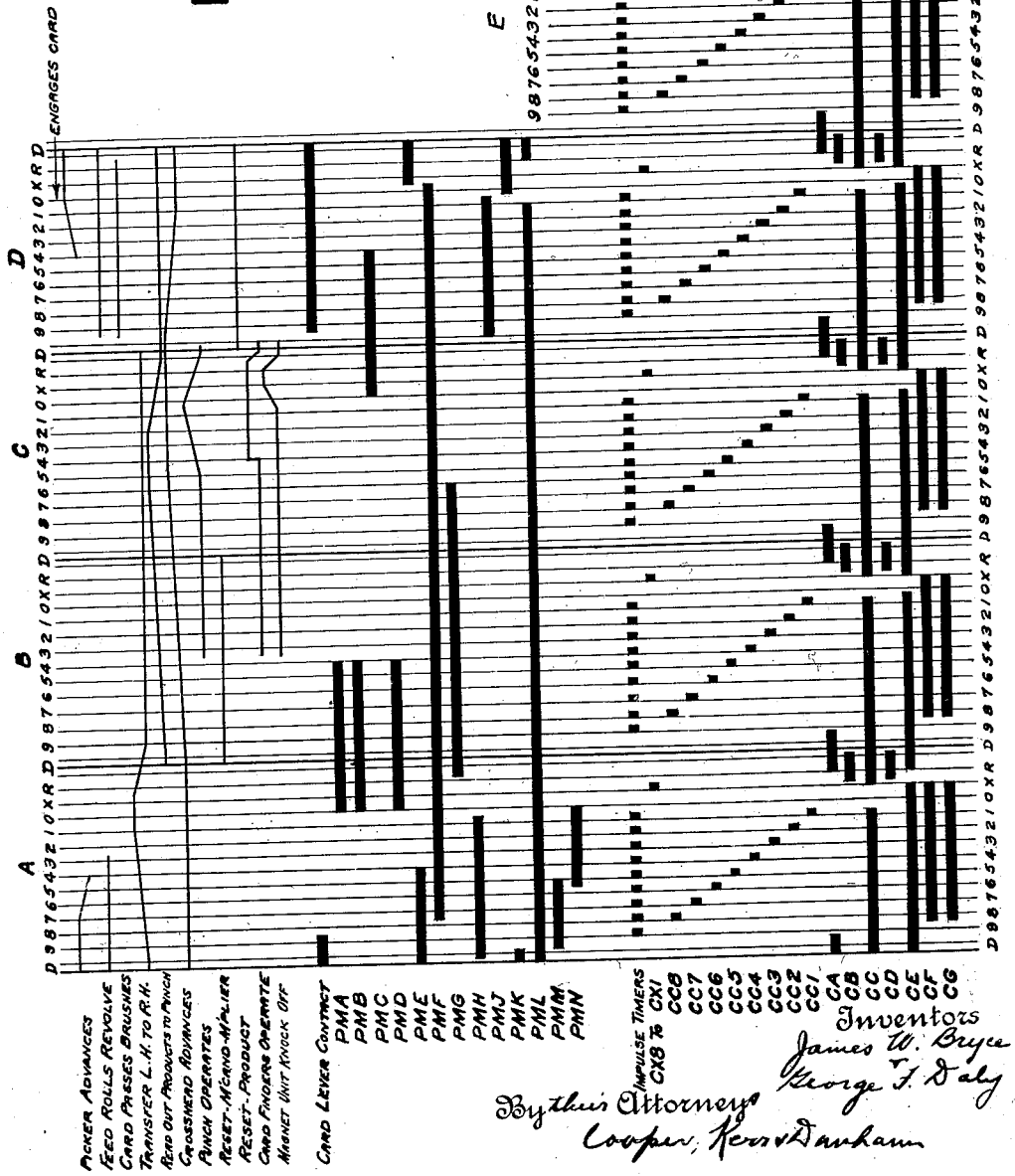

Jan. 27, 1942.   J. W. BRYCE ET AL   2,271,249
MULTIPLYING AND ACCOUNTING MACHINE
Filed July 5, 1929   34 Sheets-Sheet 30

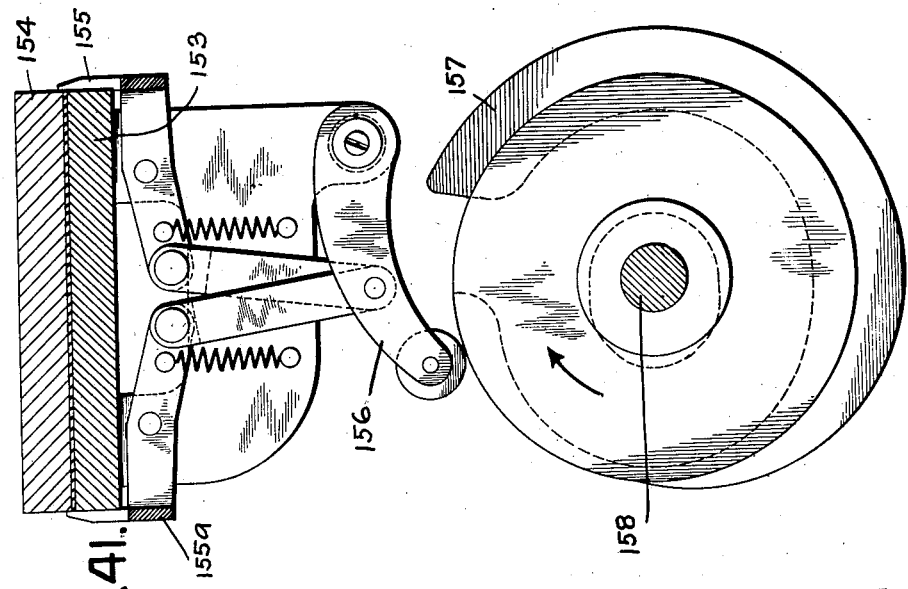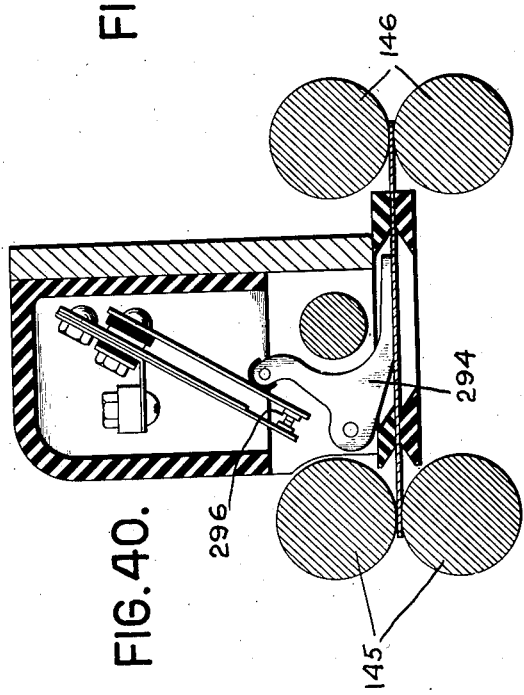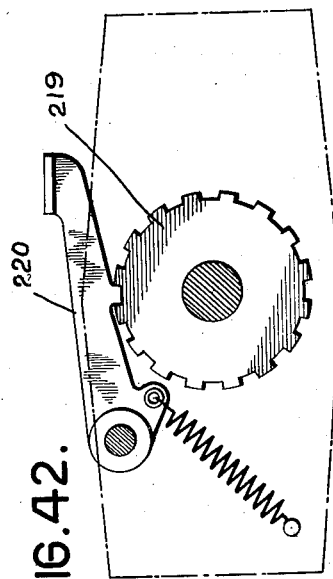

Jan. 27, 1942.    J. W. BRYCE ET AL    2,271,249
MULTIPLYING AND ACCOUNTING MACHINE
Filed July 5, 1929    34 Sheets-Sheet 32
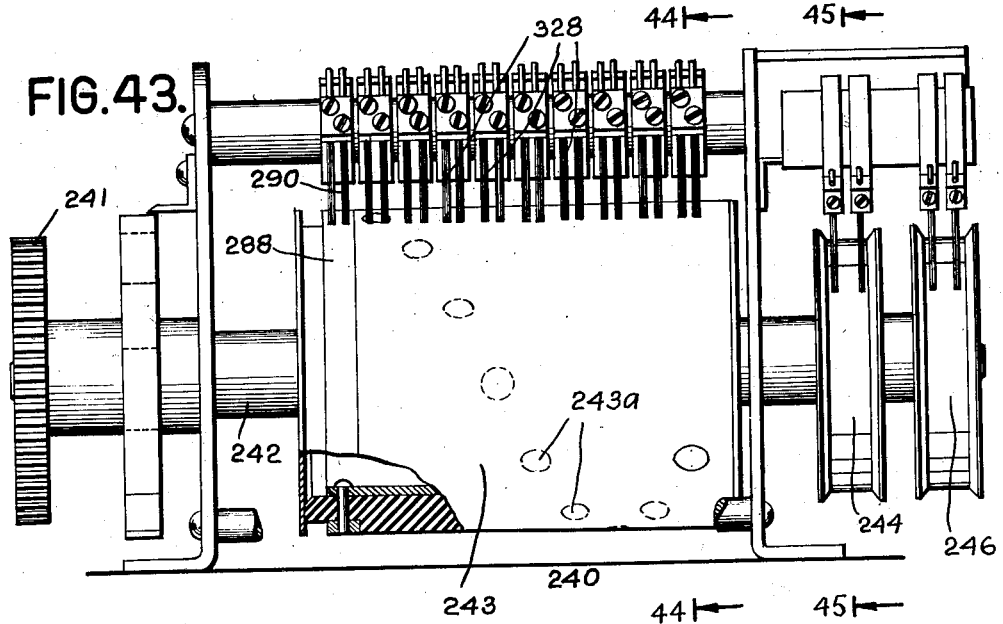
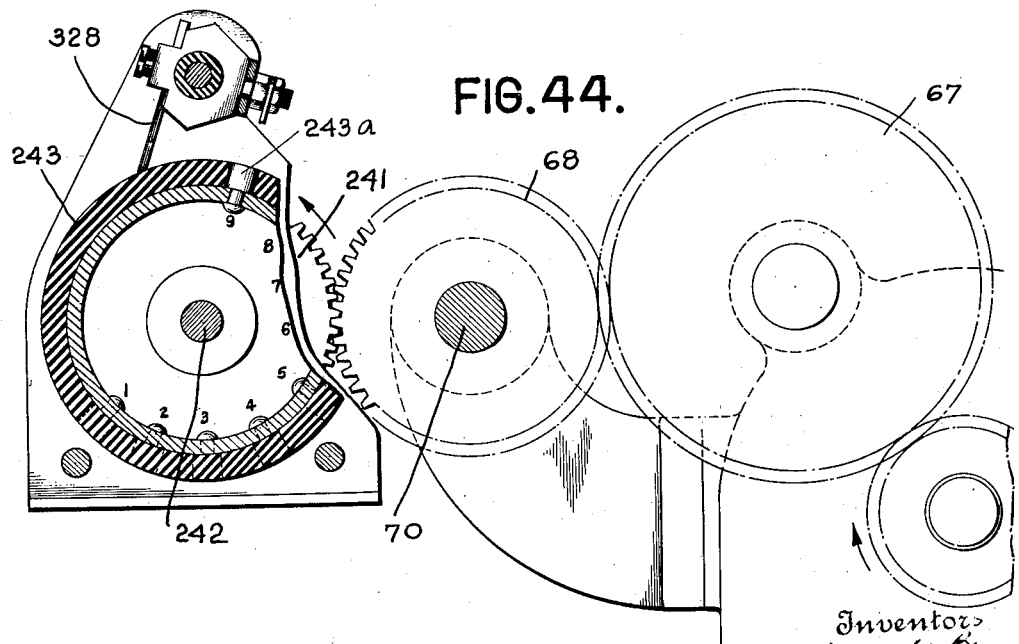

Jan. 27, 1942.  J. W. BRYCE ET AL  2,271,249
MULTIPLYING AND ACCOUNTING MACHINE
Filed July 5, 1929    34 Sheets-Sheet 33

Inventors
James W. Bryce
George F. Daly
By their Attorneys
Cooper, Kerr & Dunham

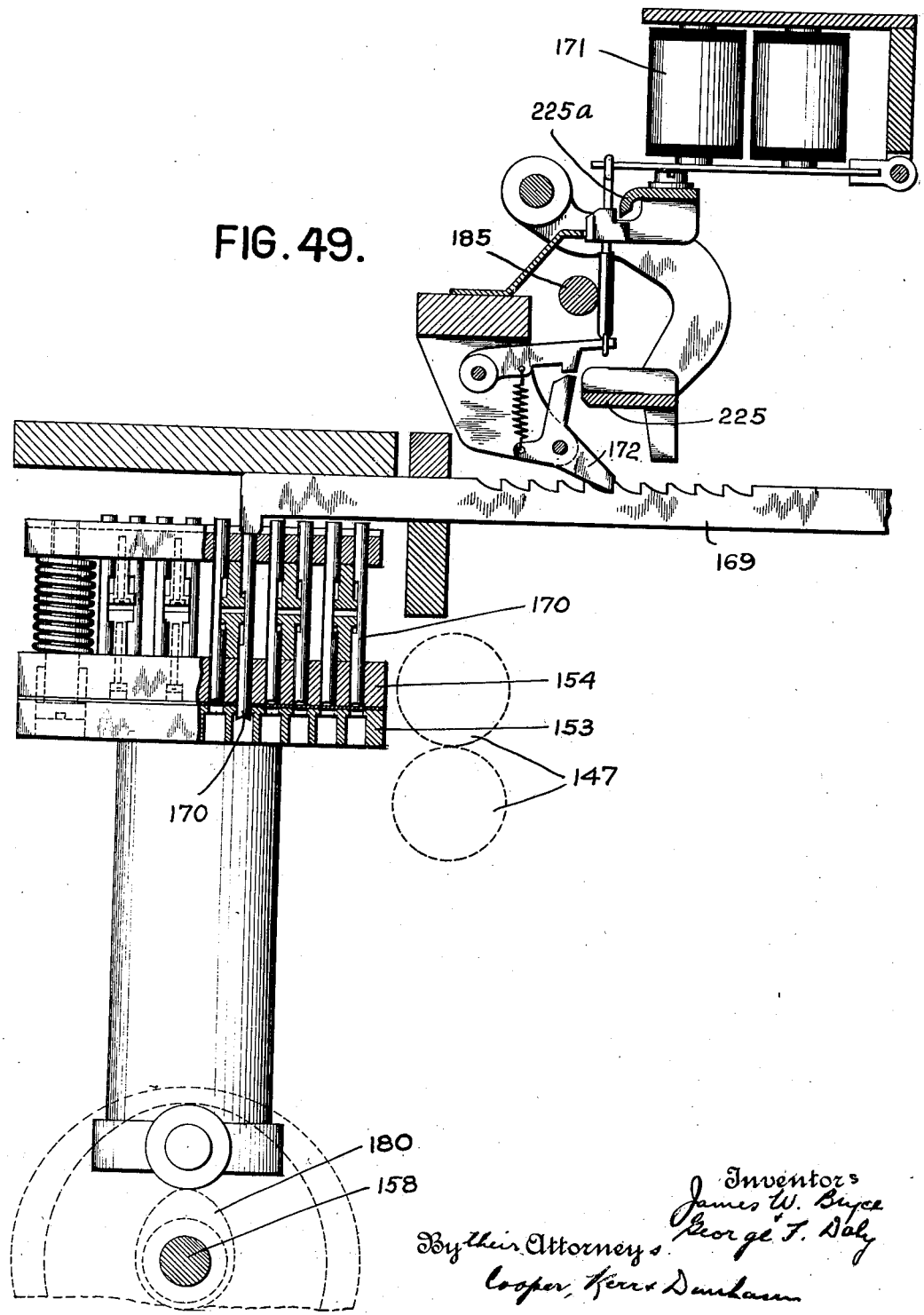

Patented Jan. 27, 1942

2,271,249

UNITED STATES PATENT OFFICE 2,271,249

MULTIPLYING AND ACCOUNTING MACHINE

James W. Bryce, Bloomfield, N. J., and George F. Daly, Johnson City, N. Y., assignors, by mesne assignments, to International Business Machines Corporation, New York, N. Y., a corporation of New York Application July 5, 1929, Serial No. 375,914

24 Claims. (Cl. 235—61.6)

This invention relates to improvements in accounting machines and more particularly relates to a machine adapted to effect certain computations in a more expeditious manner than heretofore.

More particularly, the present invention relates to accounting or calculating machines having improved provisions for effecting the multiplication of factors.

More particularly the present invention has for its object the provision of improvements in the construction set forth in the application of James W. Bryce, Serial No. 258,165, filed March 1, 1928 and the application of James W. Bryce, Serial No. 266,762, filed April 2, 1928. In the first mentioned of the above applications, a machine was disclosed wherein punched record cards were used for entering the factors into the machine. The cards were pre-punched with the factor data and placed in a group in the machine and thereafter the machine was set into operation. The machine automatically performed the computation of multiplication of the factors which were punched in the card and then punched back on the card a punched record of the product. In said application the creation of the product representing impulses was effected by novel form of commutator or emitter device and in the other application, Serial No. 266,762, a more simplified form of emitter was disclosed.

According to the present invention the emitter comprises the simple form which is disclosed in application Serial No. 266,762 and the entry of the factors and the punching of the product is generally along the lines of disclosure of application Serial No. 258,165.

The present invention has for its object among others the provision of an improved arrangement of the machine to the general end that construction may be simplified.

A further object of the invention resides in the provision of improved means for controlling the column shift entry of the partial products impulses into the accumulators or receiving devices.

In lieu of using a commutator for effecting such column shift control as heretofore according to the present invention a number of column shift relays are provided which may be selectively called into operation to control successive column shifting operations.

A further object of the present invention resides in the provision of improved means for establishing circuit relations between the multiplicand setting devices, the multiplier setting devices, the emitter and relay devices. In lieu of using commutator setting devices as heretofore, relay devices are provided which may be selectively called into operation according to the computation which is to be made.

A further object of the present invention resides in the provision of improved cycle controlling devices for controlling the number of computing cycles which the machine is to perform.

A further object of the present invention resides in the provision of improved multiplicand receiving devices and factor set-up devices, in lieu of using a single receiving device for receiving the multiplicand and having dual set-up means one for right hand components of the products and the other for left hand components as heretofore, according to the present invention, dual receiving devices are provided each having individual set-up devices. One set of set-up devices which is associated with one receiving device is provided for right hand component calculations and the other set of set-up devices which is associated with the other receiving device is provided for left hand component calculations By the provision of such construction, while a additional receiving devices or registers are required, simplicity of the set-up construction is obtained.

Further and other objects will be hereinafter set forth in the accompanying specification and claims and shown in the drawings which by way of illustration show one and a preferred embodiment of the invention.

In the drawings:

Figure 16 is a detail sectional view of a portion of one of the accumulator mechanism, the section being taken substantially on line 16—16 of Fig. 7;

Figure 17 is a top plan view or end view of one of the controlling relays used in the machine, the view being taken substantially on line 17—17 of Fig. 6;

Figure 18 is a transverse mid-sectional view of the relay device, the section being taken on line 18—18 of Fig. 6;

Figure 27 is an isometric view showing the various receiving devices and the driving and resetting means therefor. It also shows the drive to other parts of the machine;

Figure 3:
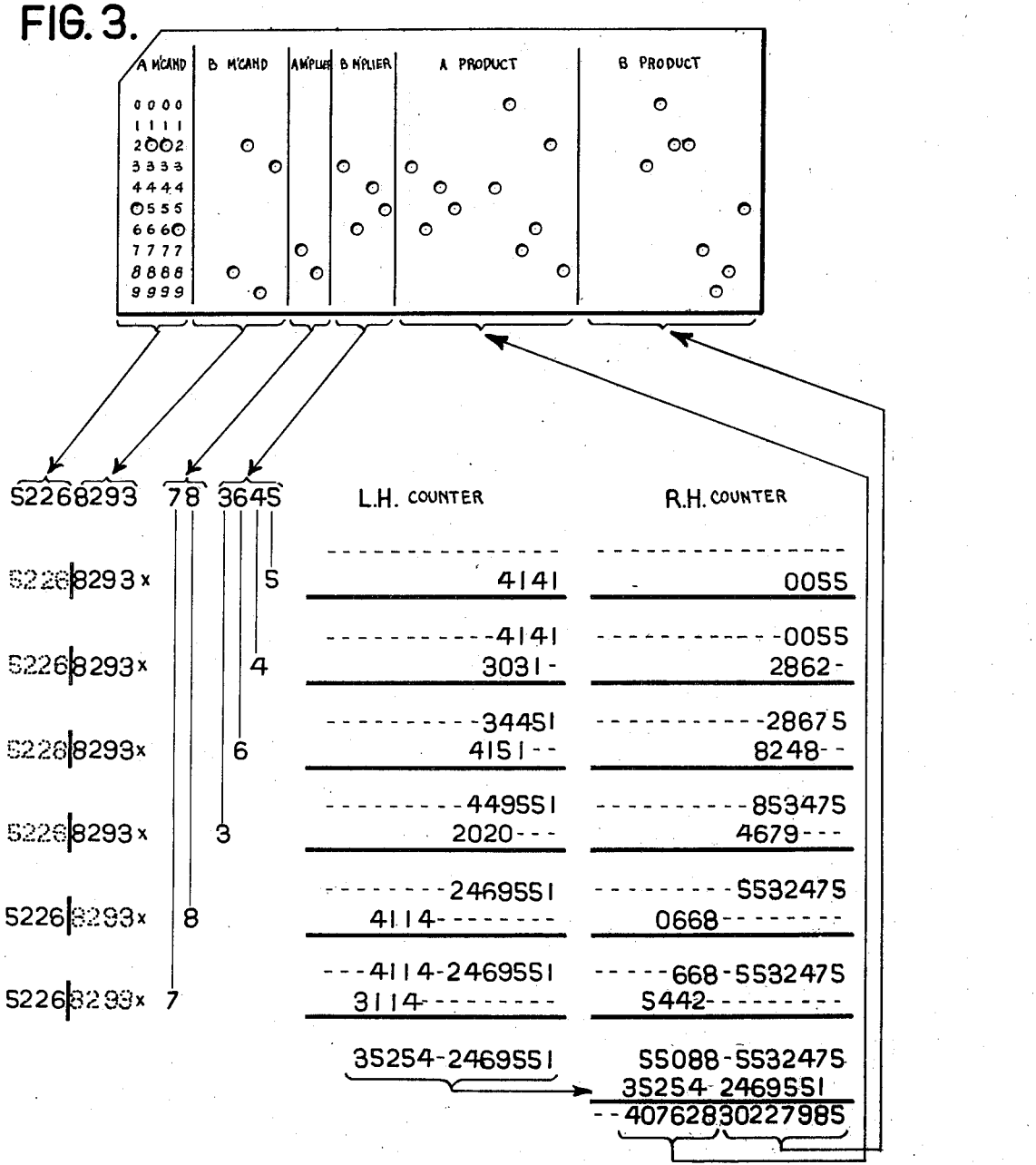
Figure 3 is another diagrammatic view showing a modified form of computation which the machine is adapted to perform.
Figures 28A, 28E:
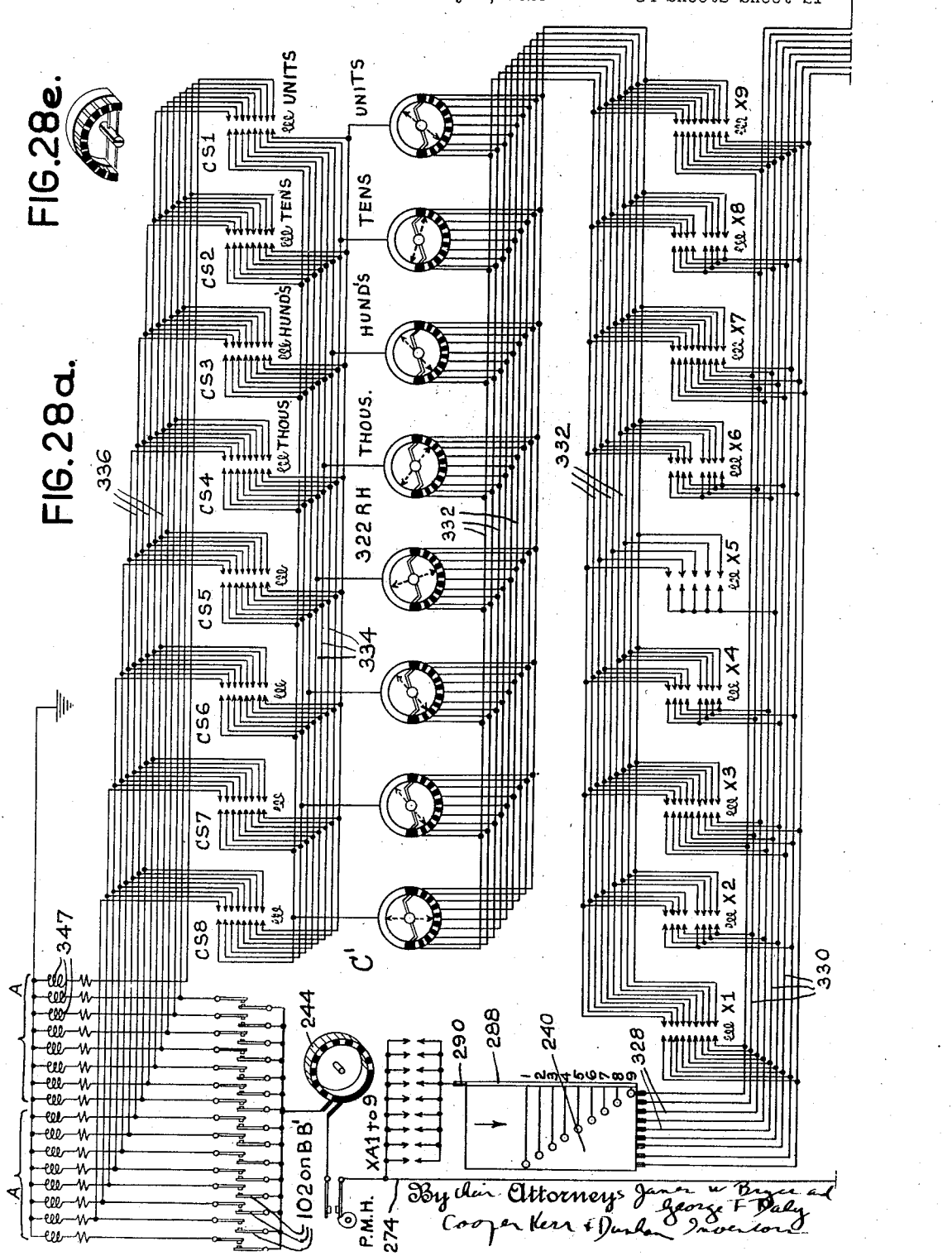
Figure 28C:
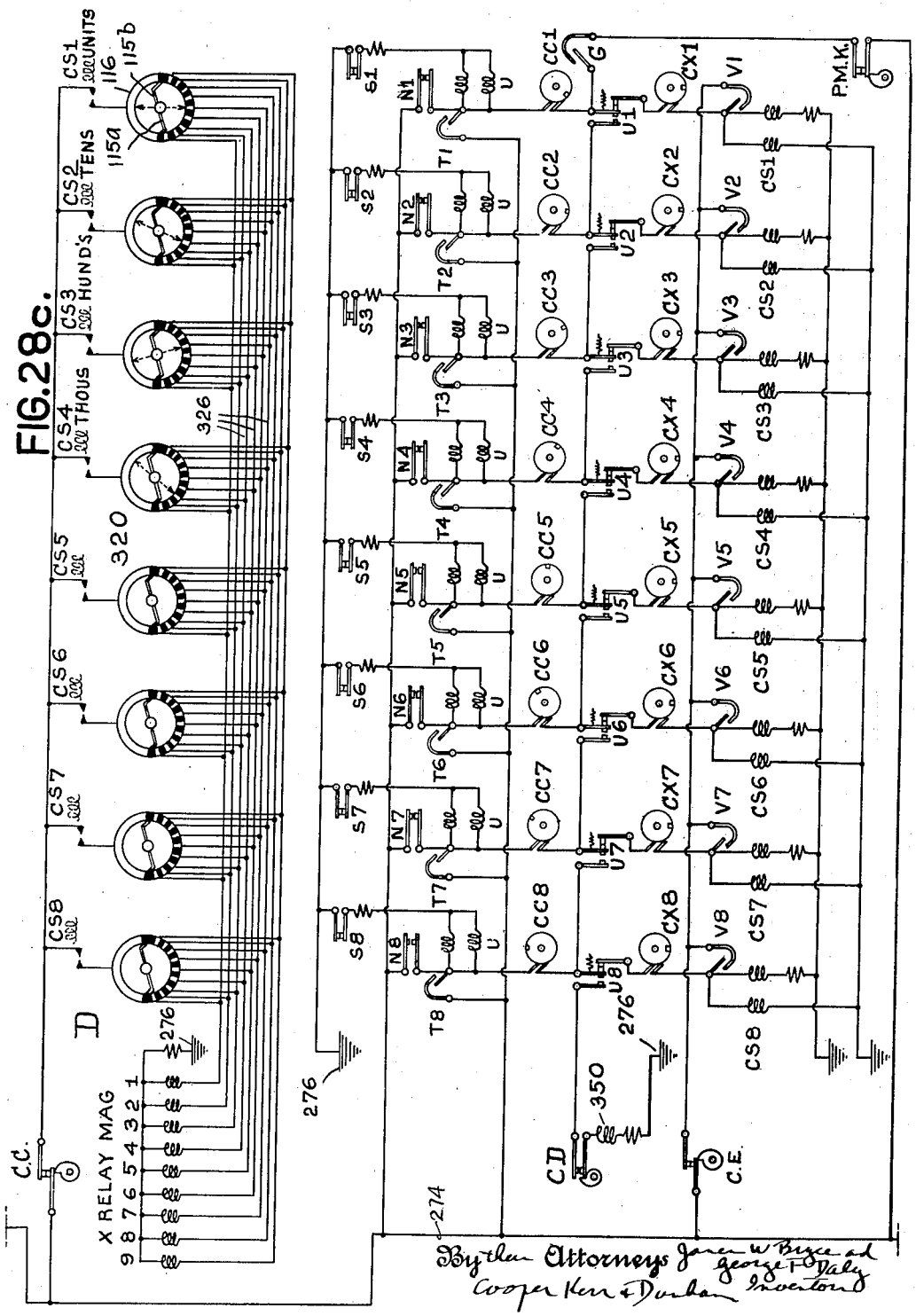
Figure 29:
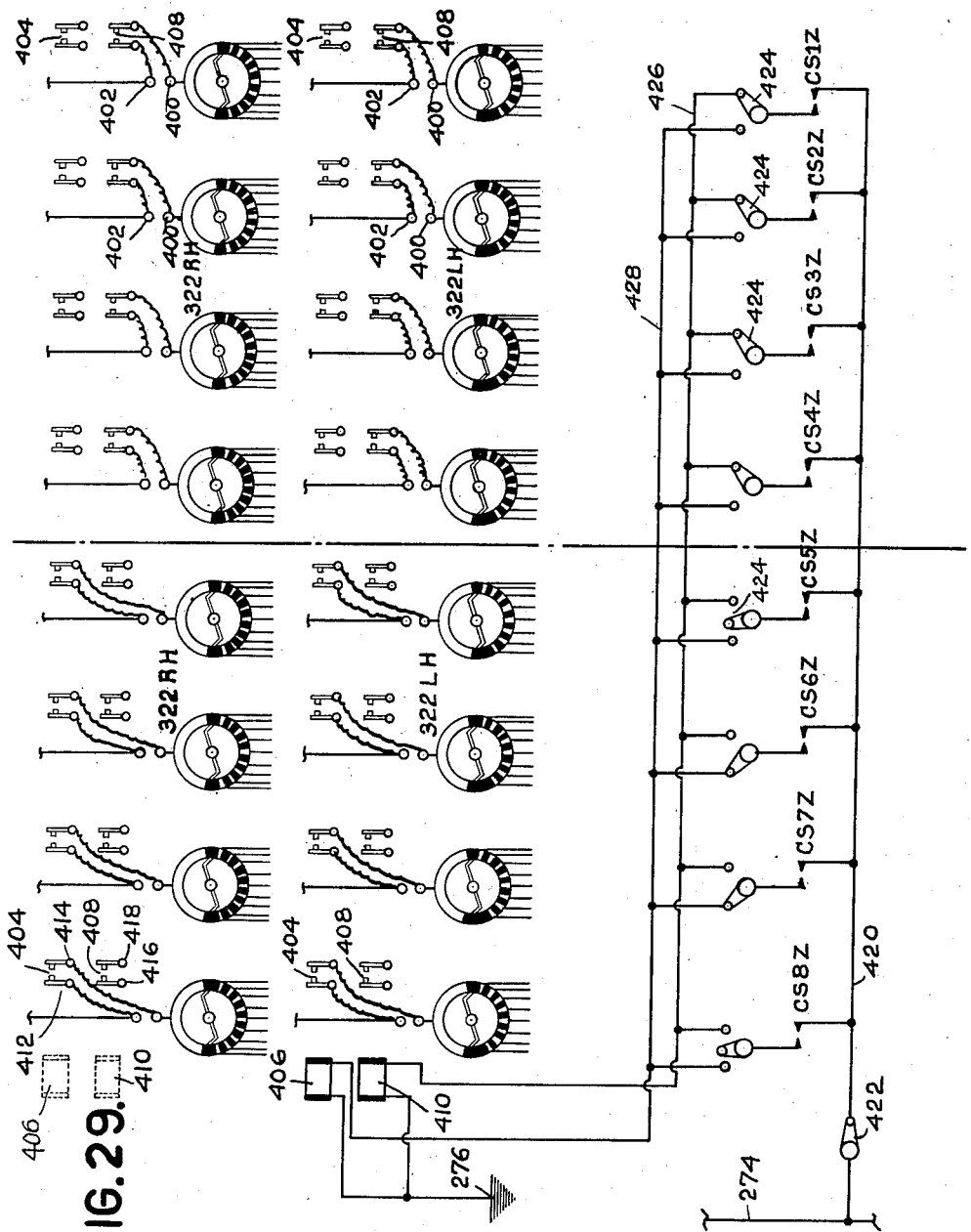

Figures 28a, 28b, 28c, and 28d, taken together show the complete circuit diagram of the machine;

Figure 28e shows more exactly the mechanical construction of certain elements more diagrammatically represented on Figs. 28a to 28d inclusive;

Figure 29 shows a modification of or addition to the circuit diagram of the machine which is to be made when the machine is to perform the computation diagrammatically illustrated in Fig. 3;

Figure 30 is another type of computation which the machine can be adapted to perform by a simple modification or addition. In this figure a computation is shown wherein a one multiplier is multiplied simultaneously by two multiplicands of different amounts.

Figure 5:
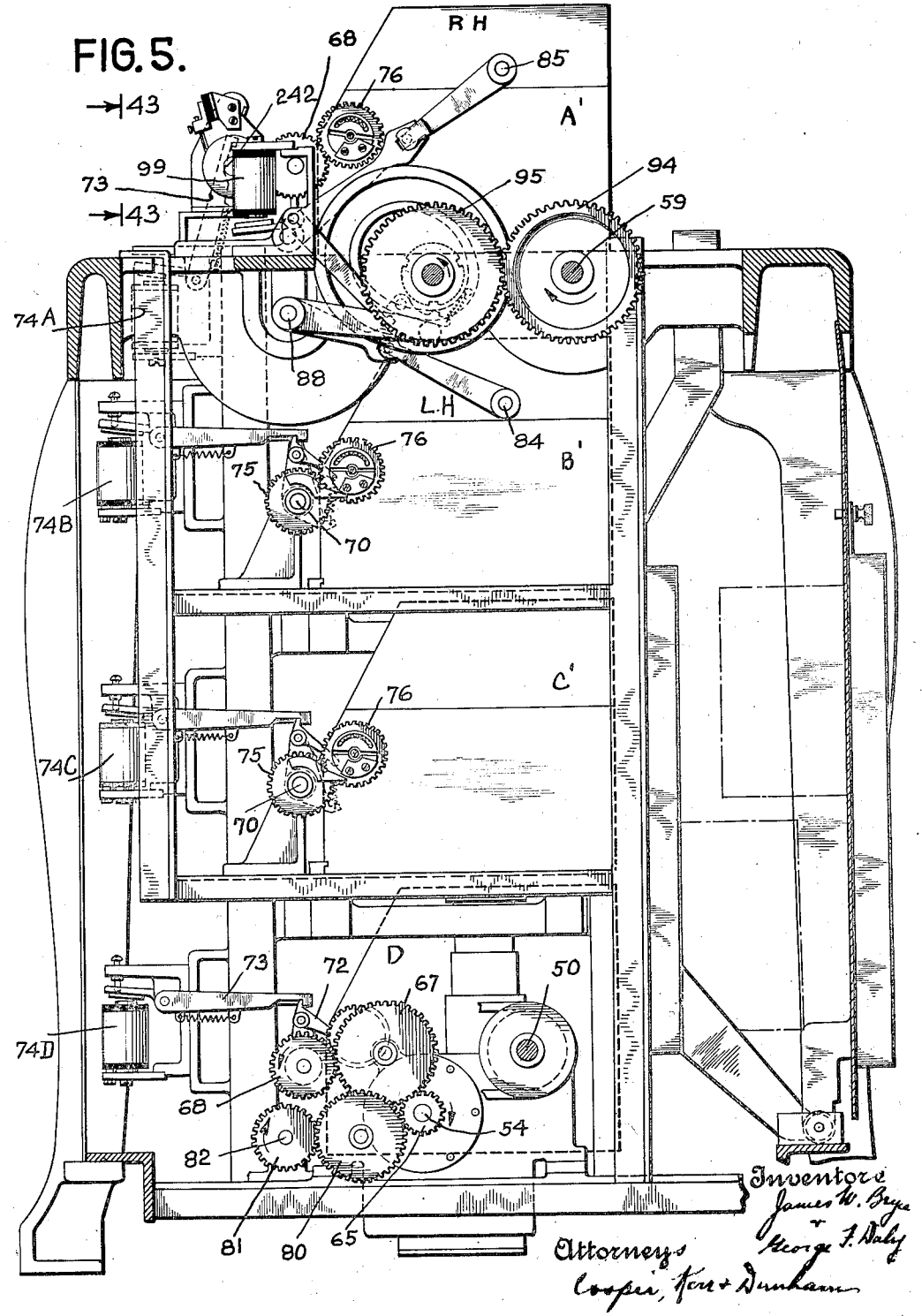
Figure 5 is a side view of the machine with certain housing parts removed, the view being taken substantially on line 5—5 of Fig. 4 and looking in the direction of the arrows.
Figure 6:
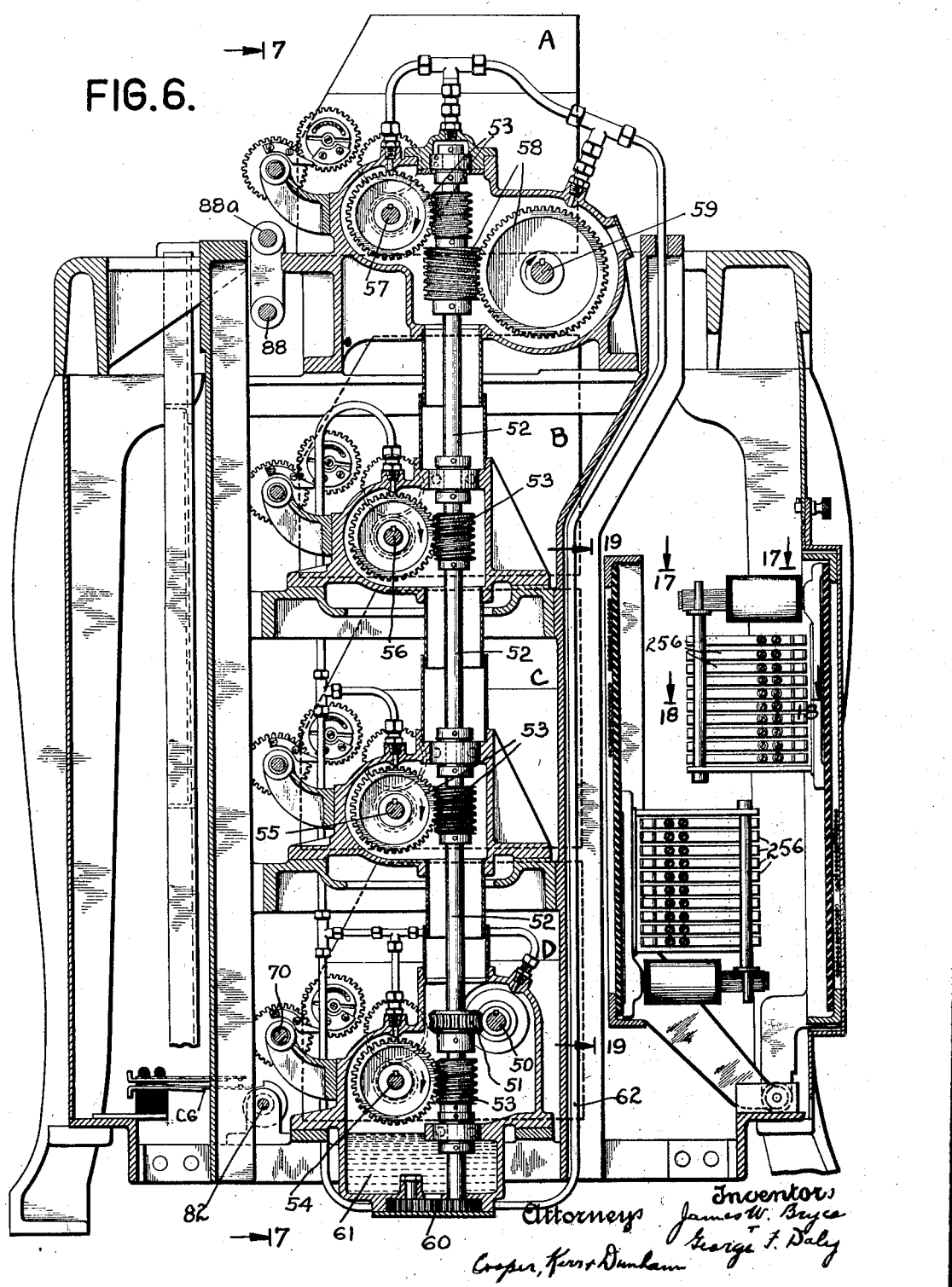
Figure 6 is another transverse sectional view taken substantially on line 6—6 of Fig. 4 and looking in the direction of the arrows.
Figure 7:
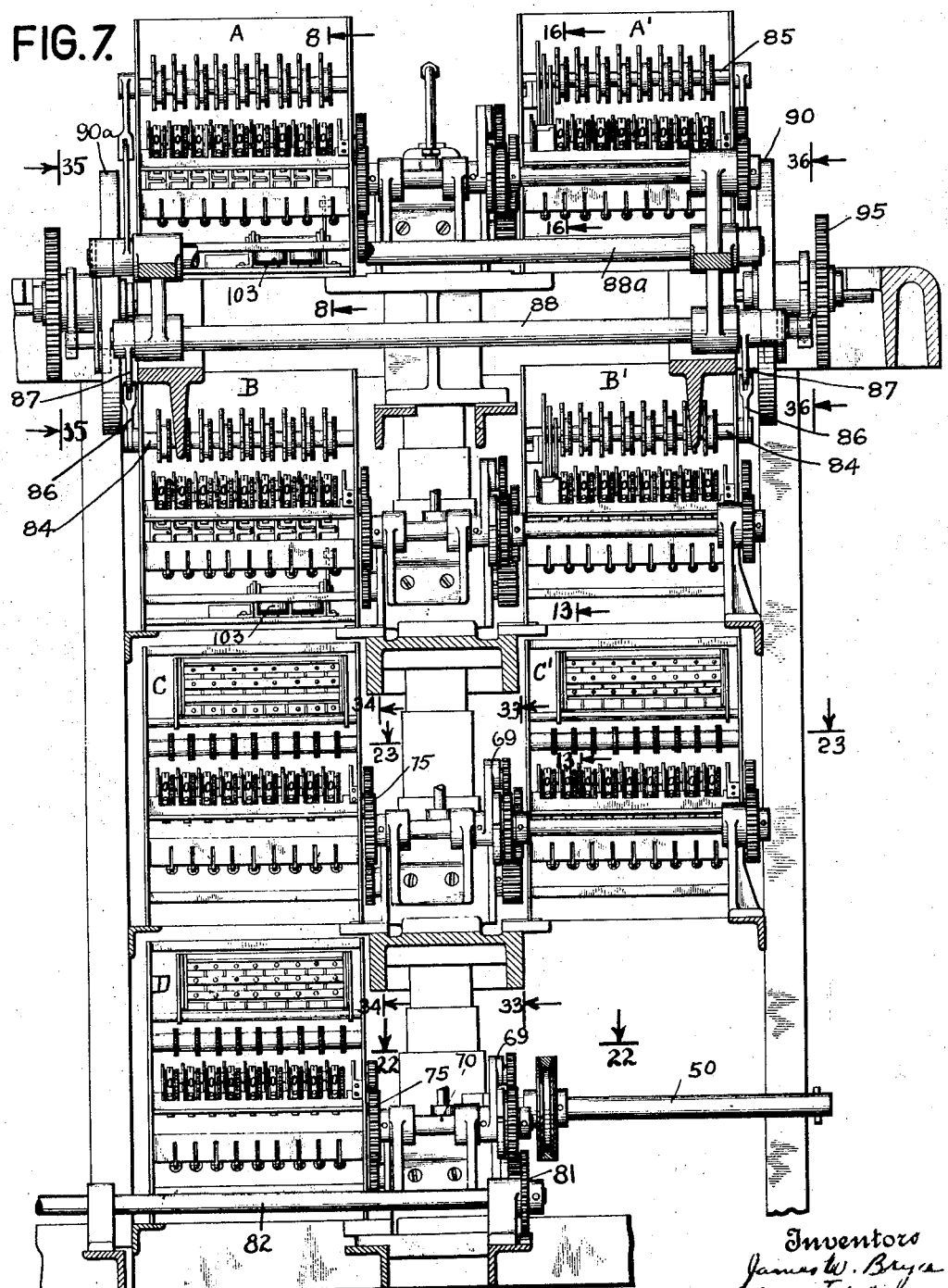
Figure 7 is an enlarged front elevation of the right hand part of the machine showing the accumulators or receiving devices. This view is taken substantially along the section 7—7 of Fig. 6.
Figure 10:
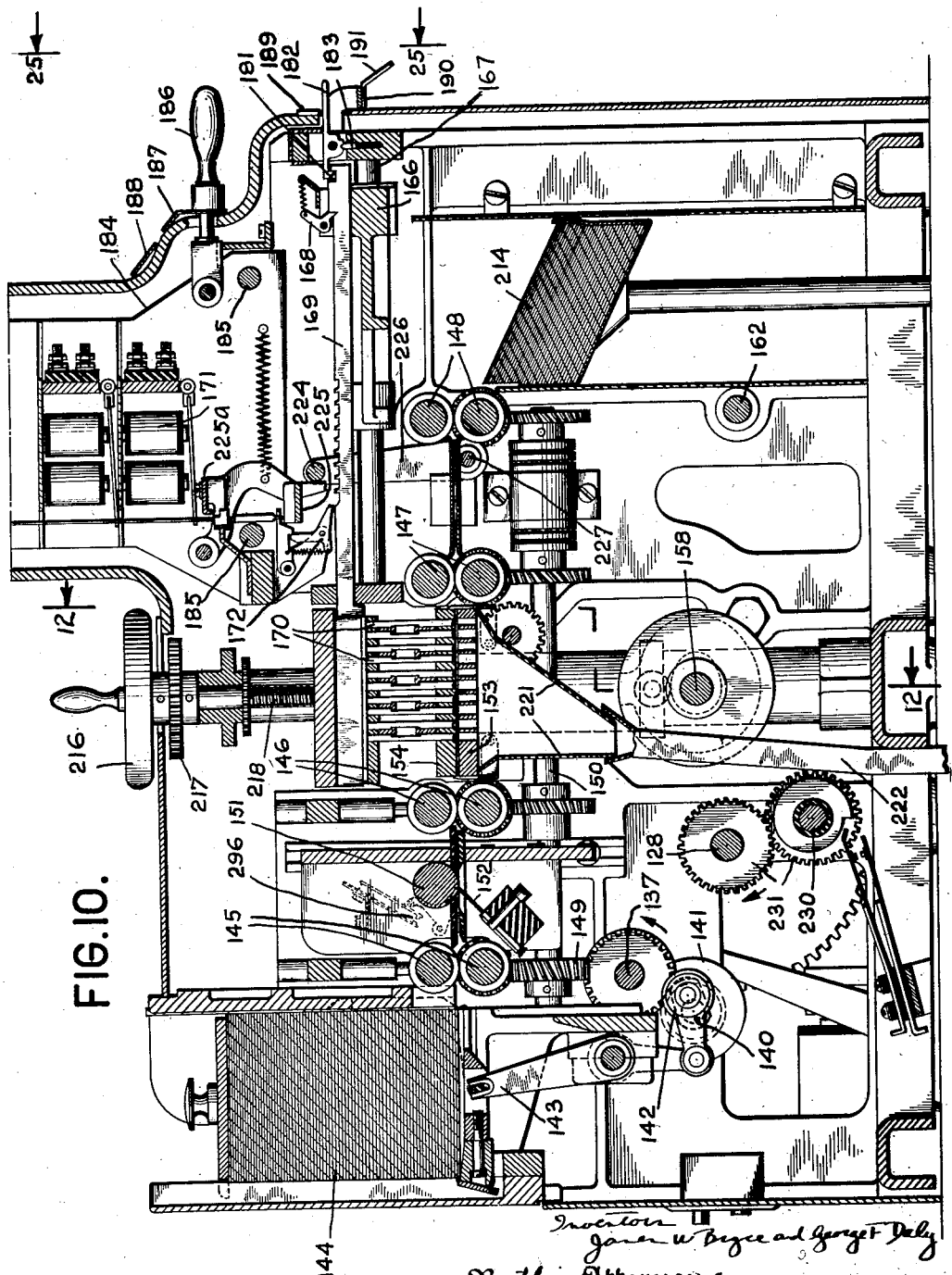
Figure 10 is a transverse sectional view of the card punching and card reading and handling section of the machine looking in the opposite direction from that of Fig. 9, the view being taken substantially on line 10—10 of Fig. 4.
Figure 12:
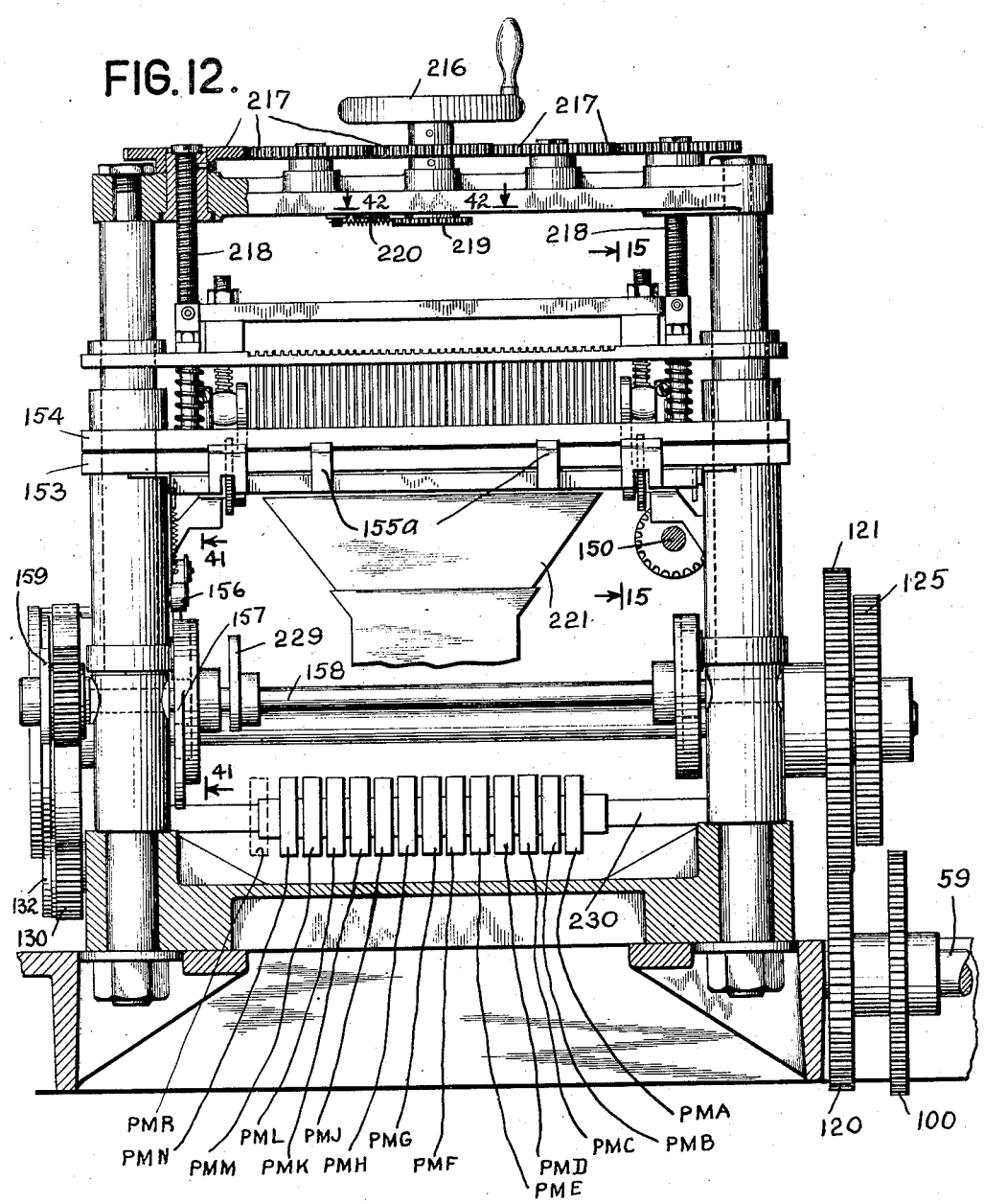
Figure 12 is a transverse part sectional view, the section being taken substantially along lines 12—12 of Fig. 10.
Figure 23:
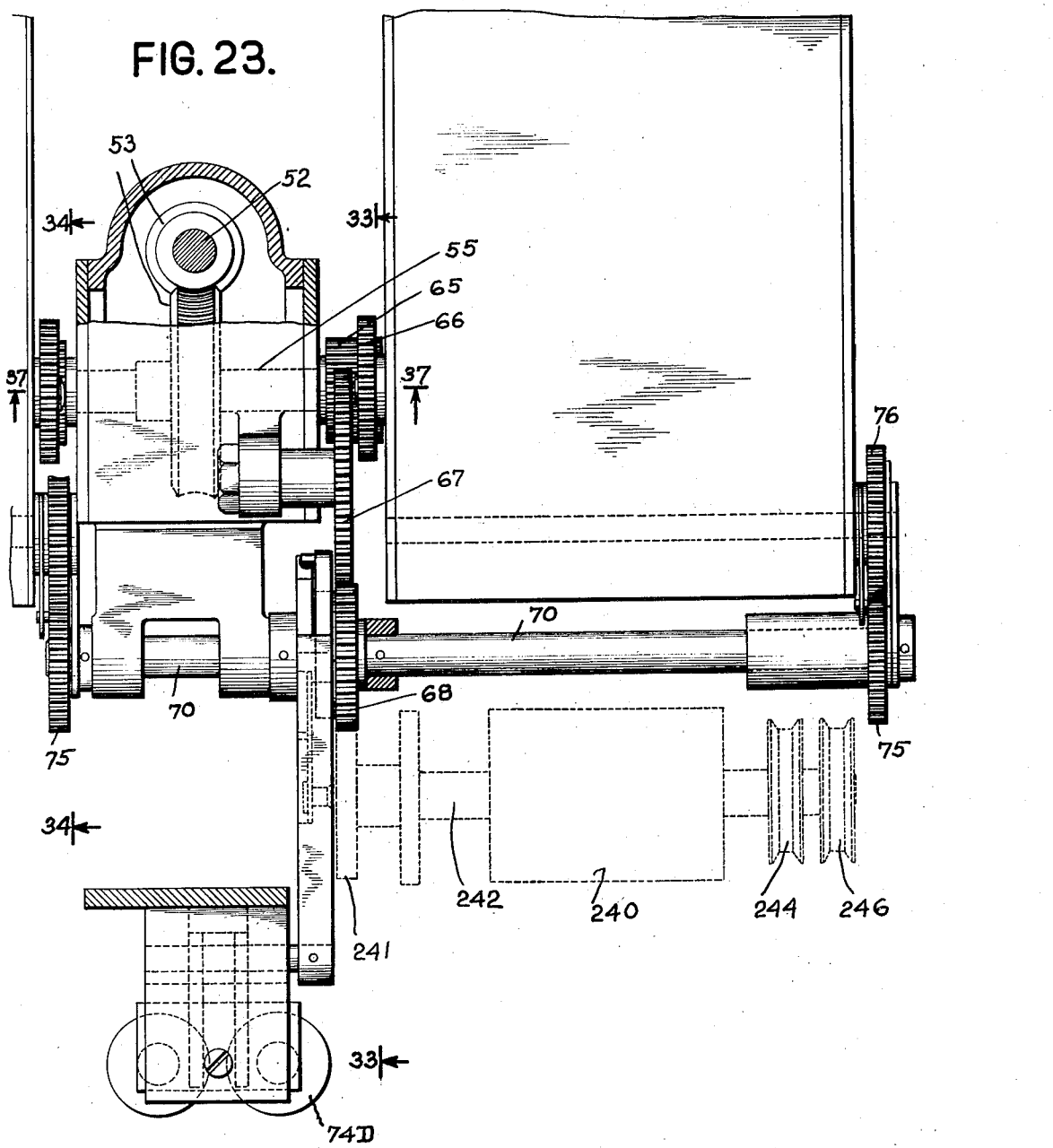
Figure 23 is a horizontal section showing certain of the driving parts. This section is taken substantially on line 23—23 of Fig. 7.
Figure 33:
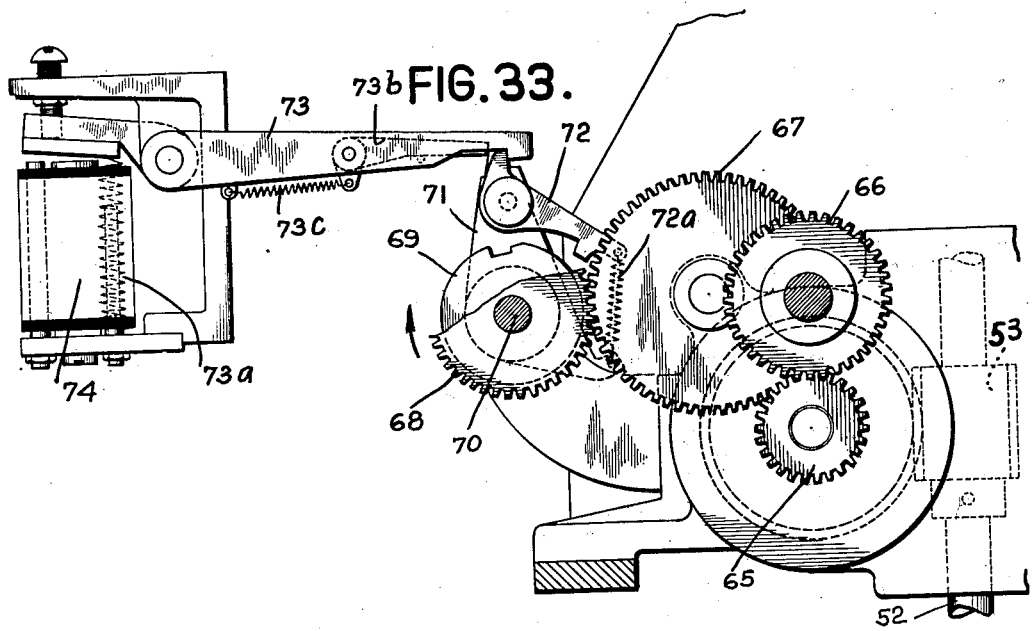
Figure 34:
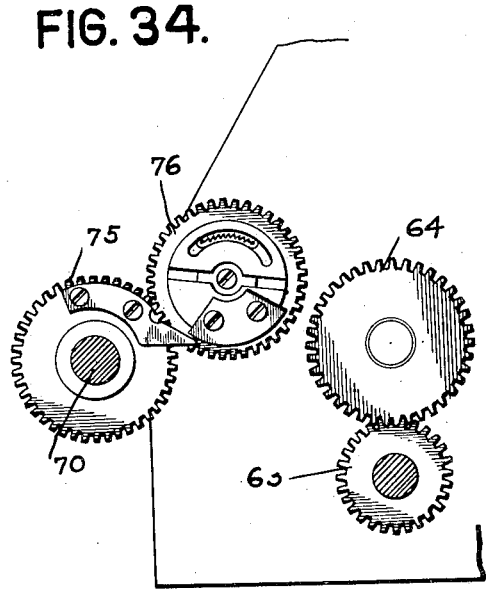
Figure 37:
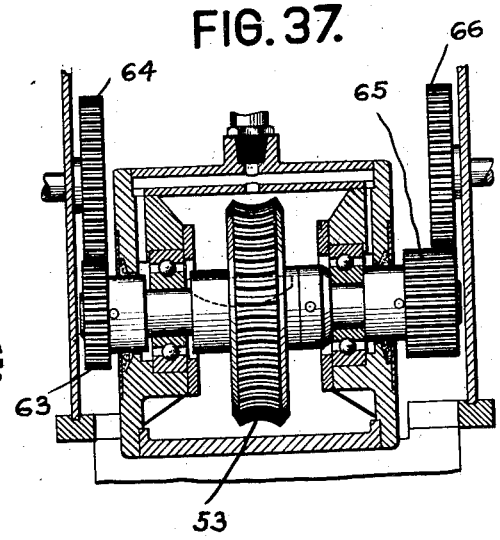
Figure 39:
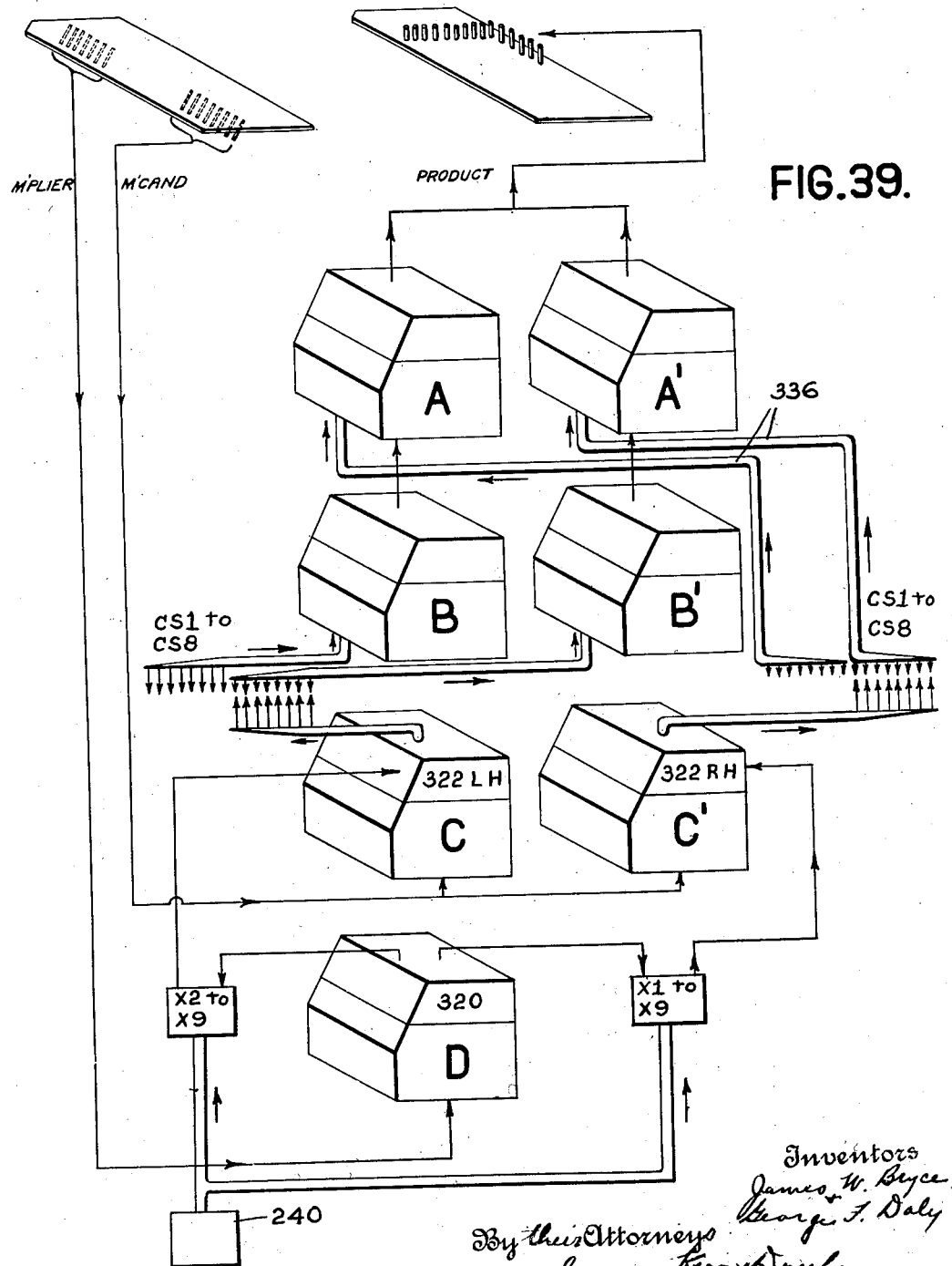
Figure 45:
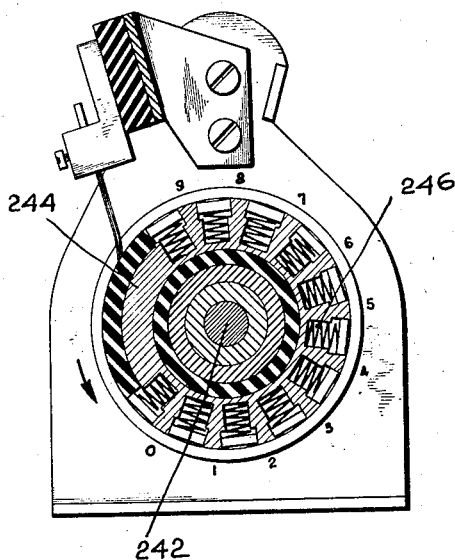
Figure 47:
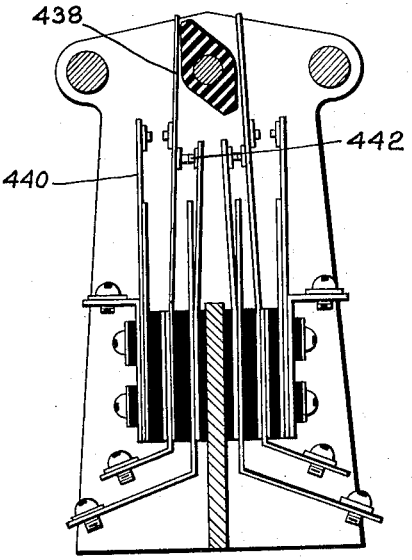
Figure 46:
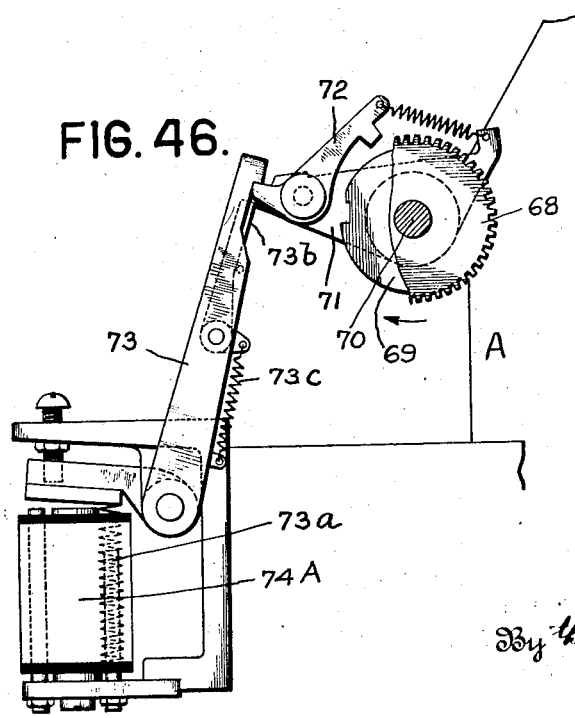
Figure 48:
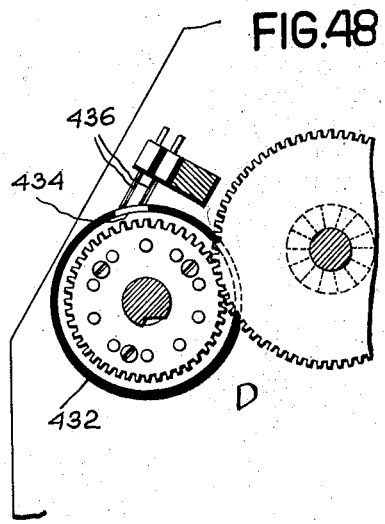

Figure 31 shows certain changes or additions to be made in the circuit diagram of the machine in addition to those shown in Fig. 29, which are necessary in order that the computation of Fig. 30 be performed;

Figure 32 shows another modification of or addition to the circuit diagram which can be made when the machine is to act with a constant multiplier set up in the machine and wherein this constant multiplier is to be multiplied by different multiplicands in successive following cards;

Figure 33 is an enlarged detail view of certain parts shown in Fig. 5 and also in Fig. 6. The view is taken substantially on line 33—33 of Fig. 7 and also on Fig. 23;

Figure 34 is another enlarged detail view taken substantially on line 34—34 of Fig. 7 and also on line 34—34 of Fig. 23;

Figure 35 is a detail sectional view taken substantially on line 35—35 of Fig. 7;

Figure 36 is a detail sectional view taken substantially on line 36—36 of Fig. 7;

Figure 37 is a transverse sectional view taken substantially on line 37—37 of Fig. 23;

Figure 38 is a timing diagram of the machine;

Figure 39 is a diagrammatic view showing the flow of the various groups of impulses from the cards through the receiving devices, relays, etc., and finally shows the punching back of the product upon the card;

Figure 40 is an enlarged detail of the card lever which is shown in Fig. 10;

Figure 41 is a detail sectional view taken along line 41—41 of Fig. 12;

Figure 42 is a detail sectional view taken along line 42—42 of Fig. 12;

Figure 43 is a front view of the emitter showing in end elevation in Fig. 5 and this view is taken substantially looking in the direction of arrows 43—43 of Fig. 5;

Figure 44 is a detail sectional view of the emitter taken substantially along lines 44—44 of Fig. 43;

Figure 45 is another detail sectional view of one of the impulse timers or contactors of the machine, the section being taken substantially along lines 45—45 of Fig. 43;

Figure 46 is a view similar to Fig. 33 but showing the one revolution clutch devices which are used for the upper accumulators and which parts are somewhat obscurely shown in the upper left hand corner of Fig. 5;

Figure 47 is a detail view of one of the relay devices which is used in connection with the modified circuit diagram of Fig. 32;

Figure 48 is an enlarged detail of the multiplier counter wheel used in connection with the modified diagram of Fig. 32;

Figure 49 is an enlarged detail of the punch selecting mechanism of the machine. This view is similar to Fig. 10 but on a larger scale and showing the parts in moved position.

Before describing the details of the machine, a brief explanation will be first given of the general mode of operation of the machine. The cards will first be punched with the factor data by a punch card operator in a separate card punching machine. Thereafter, after the desired number of cards have been punched up, a group of the cards containing the pre-punched factor data is placed in the card magazine of the machine. The operator then starts the machine in operation and the machine performs a number of cycles of movement before the first or lowermost card in the card magazine is withdrawn from the magazine. In due time, the card picker advances and passes a card through the sensing station. In transit through this station the factor data is read from the card and entered into multiplicand and multiplier receiving devices. These devices are generally in the form of tabulating machine counters or registers and they are provided with certain extra devices to enable a reading connection to be established therefrom to the computing mechanism. After the card has been thus read and the factor data derived therefrom, the previously read card is advanced into a punching die and the card remains in such punching die during that period of the operating cycle of the machine in which computing and recording is being effected. Due to the fact that the machine is adaptable to handle computations of various size as to the number of digits involved, the card may be retained in this punching die for a variable number of computing cycles. By the time the card has entered the die, the machine has become set not only with the factor data initially derived from the card, but the machine has also sensed the problem which it is to work upon and has adjusted itself for that particular problem.

It may be explained that the present machine is provided with a cycle controller so that the machine always performs the minimum number of computing cycles which are necessary to completely compute the problem and that this minimum number of cycles is performed in accordance with the size of the number used as a multiplier and in accordance with the characteristics of the digits of the entered multiplier factor. If zeros for example, appear in the multiplier factor, the machine automatically omits computing operations for such zeros, but takes into account the proper columnar entry of the next computation in accordance with such zeros. The machine also takes into account the number of significant figures in the multiplier factor and does not perform idle cycles which might be required for handling the problems of larger size.

After the multiplier and multiplicand are entered into the receiving devices of the machine, these receiving devices assume control of the subsequent computing operations. The receiving devices are provided with read-out means in the form of commutators and these commutators cooperate through switching means with an impulse emitter device with the ultimate result that the impulses created by the emitter are formed into partial product representing impulses by the conjoint action of the switching means and the commutator devices and are entered into other receiving devices of the machine. To save time of machine operation, two receiving devices are provided having the form of accumulators and the right hand components of the various partial products are entered into one receiving device, while the left hand component of these same partial products is being concurrently entered into the other receiving devices. The cycle of operation of the receiving devices are coordinated to the number of necessary cycles to effect the computation.

After the receiving devices have separately gathered together the accumulations of the left and right hand components of the partial products, reading out devices are called into operation, which reading out devices derive the accumulations of the partial products from one accumulator and enter it into the other accumulator or product receiving device. Thereafter other read-out devices come into operation and the entire product of the computation is read out of the second accumulator and this ultimate result is recorded by punching mechanism back upon the record card from which the factors of computation were originally derived. After the individual card has been thus punched with the product it is released from the punching die section of the machine and passed to the card stacking magazine. The other cards follow successively one after the other and the machine once set in operation can compute each problem, separately punch the product on each card, and discharge it from the machine. Various cycles of operation take place concurrently in order to minimize operating time.

The machine also comprises a number of plugging connections which enable the data to be variously derived from the card and entered into the receiving devices. Other plug connections are provided intermediate the read-out mechanisms and the punching section of the machine to permit the deriving of the product which is to be punched from the desired columns of the read-out mechanism and the punching of the product where desired on the cards. The selective location of result punching can also be effected by shifting of certain controlling magnet devices relatively to the punch devices. The plugs also permit desired insignificant figures in the product to be eliminated so as not to be punched.

*Main drive*

The machine is adapted to be driven by a driving motor M (Fig. 27), which motor through a belt and pulley drives the main drive shaft 50 of the machine (see also Fig. 7). This drive shaft constantly rotates while the machine is in operation. Shaft 50 through a worm gearing 51 (Fig. 6) drives a vertically disposed shaft 52 which shaft drives the various counters and receiving devices through worm and worm wheels 53. These sets of worm and worm wheels drive horizontally extending shafts 54, 55, 56 and 57. In order to drive the punching and card feeding section of the machine, worm and worm wheel 58 is provided driving a transversely extending shaft 59. To lubricate the various bearings, gears, etc., a gear pump 60 is provided which is adapted to deliver oil from a sump 61 and deliver it through pipes 62 to various points which are to be lubricated.

Before describing the counter drive in detail it may be explained that as long as the main shaft of the machine is rotating, the drive shafts of all of the counters and receiving devices are actuated. Certain parts of the driving train for the counters also cooperate with one revolution clutches which permit of selective re-setting of the counters under magnetic control. The drive for the counters will be first described and subsequently the selective re-set for the counters will be described.

Referring now to Figs. 23, 27, and 37, the various receiving devices or accumulators are driven from the worm wheels 53 through shafts 54, 55, 56 and 57 which shafts have on their ends the gearing shown in Figs. 23, 27 and Fig. 7.

There will be first described a typical drive for counters C and C' and it will be understood that counters B and B' and A and A' are driven in a similar manner. The drive for counters C and C' is obtained as follows.

Upon one end of the shaft 55 there is provided a narrow gear 63 which drives a gear 64 which gear in turn drives the drive shaft of the counter to the left, viz. C. On the opposite side from gear 63 and upon the other end of the shaft 55 there is a broad gear 65 (see Fig. 23) which drives a counter drive gear 66 which is upon the counter shaft of counter C' so as to impart the proper drive to this counter C'.

It will be understood that there is a similar driving arrangement for counters B and B' and A and A' and counter D is driven by gearing similar to that which drives the left hand section of the counters heretofore described.

In order to provide for drive to the re-set mechanism the following train of driving mechanism is provided. Cooperating with each broad gear 65 (see Figs. 23 and 33) there is in addition to the counter drive gear 66 an intermediate gear 67 which in turn drives a gear 68 which has secured to it a driving member 69 of a one revolution clutch. There are a number of these one revolution clutches in the machine and all of them are of substantially similar construction. One of them will be described in considerable detail in connection with Fig. 33.

As explained before, 69 is in constant rotation and such member 69 is loosely mounted to rotate on shaft 70 which is the shaft which drives the re-setting mechanism of the counters. Shaft 70 has fixed to it an arm 71 carrying a pawl 72. Pawl 72 is normally held out of the notch of the driving disk 69 by an arm 73 attached to the armature of the controlling magnet 74. When it is desired to impart one revolution of movement to 70, magnet 74 is energized releasing 72 allowing a spring 72a to engage the pawl 72 with the disk 69 as the notch comes under the shoulder of the pawl. Thereafter arm 71 and a shaft 70 fast to it are carried around through one revolution and before the end of this revolution is reached the magnet 74 has been de-energized. When the magnet is thus deenergized, the arm 73 is rocked in a clockwise direction by a spring 73a to such position that arm 73 can engage pawl 72 and rock it anti-clockwise so as to disengage it from the notch in the driving member 69. This action takes place at the end of one revolution of shaft 70. Rebound of arm 71 is prevented by a detent part 73b which is held yieldingly by a spring 73c. The ultimate action of these parts is to disengage 71 from the driving member 69 and to hold 71 in its normal position with pawl 72 disengaged from the disk 69.

The shaft 70 is used for re-setting the counters. Shaft 70 has upon each end a gear 75 (see Fig. 34). This gear engages with gear 76 which is the re-setting gear pertaining to the counter. The re-setting mechanism requires no detailed description as it is fully described in Lake Patent No. 1,600,414. Shaft 70 corresponds to the shaft 379 of that patent.

Figure 22:
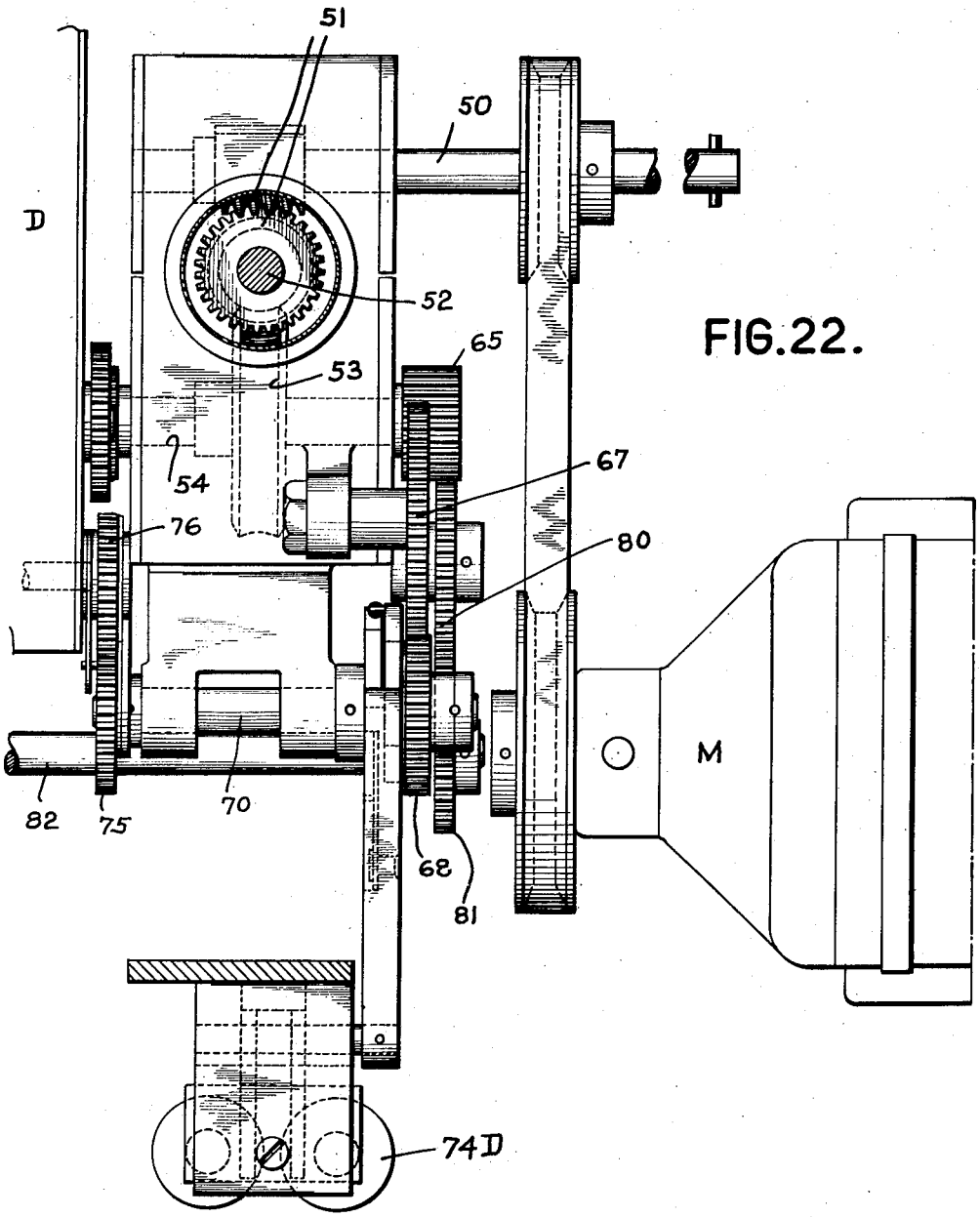
Figure 22 is a detail sectional view showing certain of the drive train for the receiving devices, the view being taken substantially on line 22—22 of Fig. 7.

It will be understood that a single one revolution clutch device as above described, is capable of re-setting a pair of counters. In the machine the lowermost one revolution clutch device only re-sets a single counter, viz. counter D which is to the left of it (see Figs. 22 and 5). The reference numeral 74 is the general reference numeral pertaining to the magnet for operating the one revolution clutch which pertains to re-set. In order to identify these magnets for subsequent description in the circuit diagram, the magnets will be given suffix letters to correspond with the registers or counters which they are to control the re-set of. Thus in Fig. 27 and in Fig. 5, the lowermost magnet is designated 74D. Since this magnet controls the re-set of the receiving device or register D only (see also Fig. 23). The next upper re-set magnet is designated 74C. Such magnet controls the re-set of registers or receiving devices C and C'. The next magnet is designated 74B and controls the re-set of receiving devices or registers B and B'. The next magnet is designated 74A and controls the re-set of A and A'.

As shown in Fig. 5 and more clearly in Fig. 46, the disposition of the parts of the re-set clutch structure pertaining to registers A and A' and particularly the magnet and armature portions is somewhat different. The armature of the magnet extends upwardly for registers A and A' instead of horizontally as in the case with the other registers or receiving devices.

Referring now to Figs. 27, 5 and 7, the lowermost gear 65 which is disposed on shaft 54 (Fig. 6) meshes with an idler gear 80 which in turn drives a gear 81 fixed to a shaft 82. This shaft 82 drives the contact cams which control various circuits in the machine including all cams designated with a C prefix.

As best shown in Figs. 7, 23, 27, and 39, the various counters are disposed to the left and right of the vertical drive shaft 52. Counters A and A' constitute the accumulators (in reality one large accumulator) which receive the right hand component of the partial products and which also receive the final and complete product. The left hand components of the partial products are entered into accumulators B and B' and the accumulation from these accumulators is transferred into A and A' in the operation of the machine. C and C' are the receiving devices in the form of registers which receive the multiplicand which is entered into the machine. D is another receiving device for receiving the entry of the multiplier. C and C' in reality comprise one receiving device. They, C and C', are disposed in the machine in separate assembly for the sake of mechanical convenience and in order to obtain the desired columnar capacity. A and A' in reality constitute one complete large accumulator. B and B' also constitute one large accumulator. Provision is made to carry over a carryover increment from B' to B. Similar provision is made to carry over a carryover increment from A' to A.

The details of these various accumulating devices will be subsequently explained.

Drive for read-out devices

Referring now to Figs. 5, 7, 35 and 36, 84 and 85 are respectively the read-out shafts for the accumulators B and B' and A and A'. Shaft 84 has connected to it an arm 86 cooperating in the forked end of another arm 87 fixed to shaft 88. Shaft 88 in turn has another arm 89 secured to it which cooperates with a cam 90. As shown in Fig. 7 there are two arms 87 on shaft 88. Each arm 87 cooperates with a member 86 which connects to the read-out shaft 84 of each section of the accumulators B and B' respectively. Obviously, one complete shaft 84 could be utilized but for convenience of construction, individual shafts 84, one for each accumulator section B and B' are provided.

Referring now to Figs. 5 and 27, shaft 59 carries on it a gear 94 which drives a gear 95, which has fast to it, one of the elements 96 of a one revolution clutch. This member 96 is similar to element 69 heretofore described, except that it has three notches instead of one on account of the timing of the machine.

Referring now to Fig. 36, the cam 90 is adapted to be clutched to the element 96 by a spring actuated pawl 97, which pawl is mounted upon a stud fixed to the cam 90 and which pawl is likewise controlled by an arm 98 from a controlling magnet 99. In other respects this one revolution clutch structure is similar to the one heretofore described, viz. it is provided with the usual re-bound latches, etc. When the magnet 99 is energized, the one revolution clutch and associated cam 90 bring about a timed rocking of shaft 88 which in turn through 87 and 86 imparts a corresponding rocking movement to the shafts 84 which shafts 84 rocks the readout mechanism for the accumulators B and B'.

These read-out mechanisms are of the general type shown and described in Lake Reissue Patent No. 16,304. Their construction will be further explained in connection with the description of the read-out devices for accumulators A and A' which follows.

Referring now to the read-out devices for the upper accumulators A and A' as shown in Fig. 27, on the opposite end of shaft 59 and to the left in this figure, there is fixed to the shaft 59, a gear 100 which meshes with the gear 101 which has fixed to it a driving element 96a of a one revolution clutch. There are also similar parts including a cam 90a, 97a, arm 89a, magnet arm 98a, magnet 99a and shaft 88a (see Fig. 35). The function of these parts is to ultimately rock the read-out shafts 85 which pertain to the upper accumulator A and A'.

Figure 8:
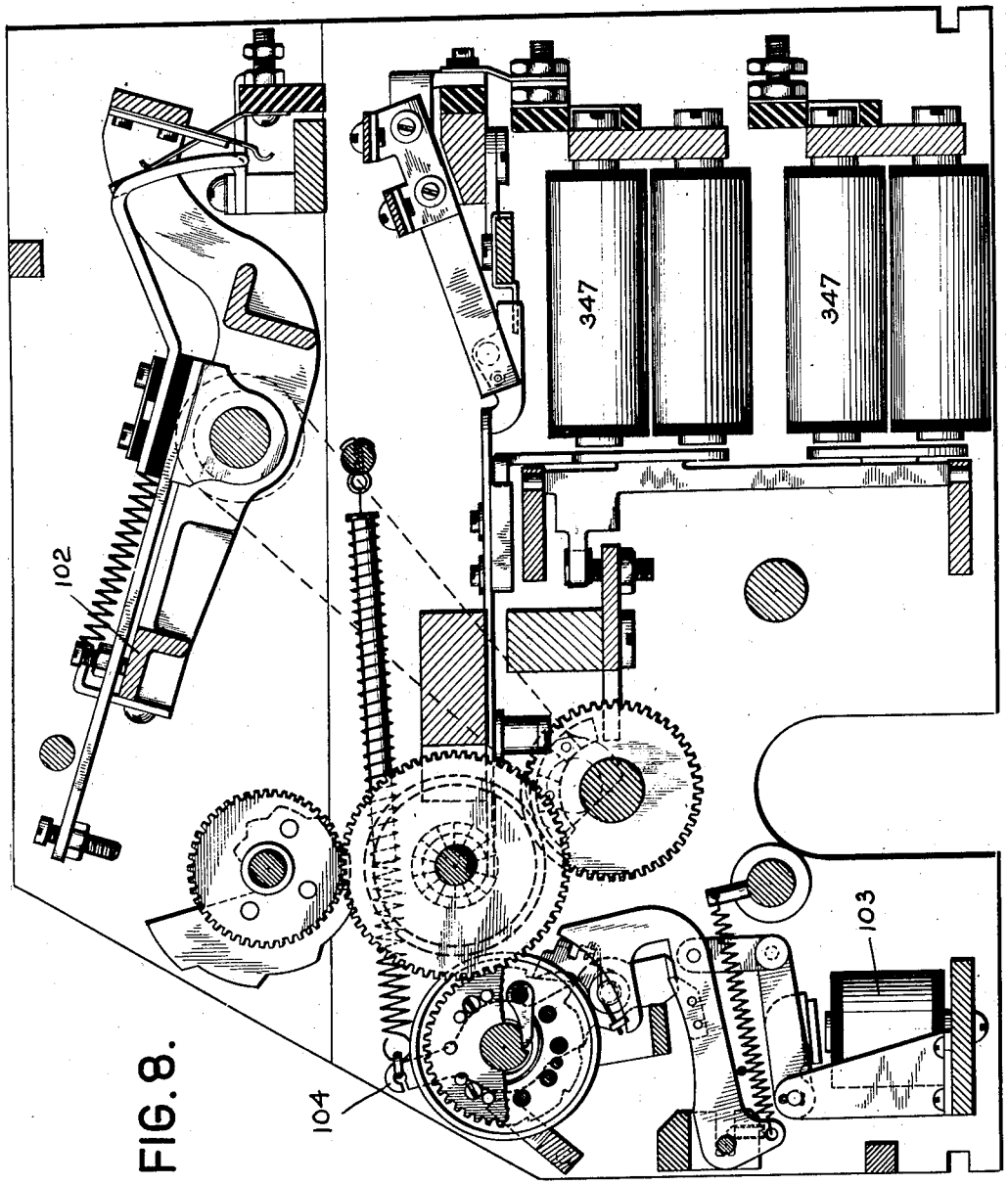
Figure 8 is a sectional view of one of the accumulators or receiving devices, the section being taken substantially on line 8—8 of Fig. 7.

Fig. 8 shows a section through one of the upper accumulators and shows the read-out mechanism which is generally designated 102. This read out mechanism operates in the well known manner to read the step cam and read out timed impulses in accordance with the stepped cam reading.

The reason for providing separate read-out mechanisms 102 on the accumulators B and B' and A and A' and separate controls therefor is because at one cycle of the machine operation, there is to be a read-out of the accumulation of left hand components of partial products which stand in accumulators B and B' and the entry of such amounts into the accumulators A and A' which have previously received the right hand components of the partial products. Subsequently and at a later cycle in the operation of the machine there is to be a read-out of accumulators A and A' into the recording section of the machine.

The accumulators per se are of the conventional type used in tabulating machines and require no detailed explanation. They are electrically controlled in the usual manner and for a fuller description of a construction of such an accumulator reference may be had to the Lake reissue patent previously referred to No. 16,304, and to Hollerith Patent No. 945,236, Lake Patent No. 1,370,040 and Hollerith Patent No. 974,272.

As has been stated before accumulator A and A' constitute one large accumulator and accumulators B and B' constitute one large accumulator. There is accordingly provided means to carry over a carryover increment from A' to A and also between B' and B there is also a similar mechanism to carry over a carryover increment. This mechanism will now be described.

Fig. 8 shows a section of the counter A, it being taken on line 8—8 of Fig. 7 and it also shows a magnet 103 which is intended to trip the transfer mechanism generally designated 104 pertaining to the units column only of this accumulator. It is by the energization of 103 that a carry-over impulse from accumulator A' is caused to trip the transfer of accumulator A, thus causing A and A' together to constitute one complete accumulator.

Figure 21:
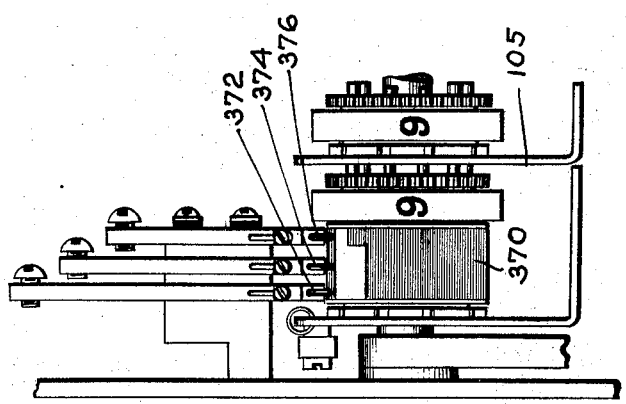
Figure 21 is a fragmentary front elevational view of certain parts which are shown in Fig. 16. The view is taken substantially on line 21—21 of Fig. 16.

Referring to Figs. 16 and 21 on the next to highest order wheel of accumulator A', viz. the second wheel from the left, there is a tripping mechanism generally designated 105. When there is a carryover from the seventh wheel into the 8th order wheel that is, when the seventh order wheel passes from 9 to zero, this tripping mechanism is actuated and causes a member 106 to be moved to the right to close contacts 107.

A similar controlling mechanism is provided on the next to highest order wheel of accumulator B' and a similar contact 107 is there provided also actuated by a part like 106. No such controlling parts are provided intermediate C and C' since these registers never receive more than one entry.

It may be explained that when the tripping mechanism 105 pertaining to the 7th order wheel is restored by bail 105a that there is a mechanical transfer into the next higher order or into the 8th order or left hand wheel of either accumulator A' or B'. A further explanation of the mode of operation of this transfer mechanism will be given in connection with the circuit diagram. But it is sufficient to state that provision is made for energizing 103 pertaining to the units order of accumulator A and B and thus impart one increment of movement to the units order wheel of such accumulator whenever the 8th wheel is set up to pass from 9 to 0.

In explanation of the accumulating or registering devices which are provided in this machine, it may be stated that accumulators A and A' and B and B' are provided with a top read-out section of the type shown in Fig. 8 of the drawings of this application and which read-out mechanism in principal of operation is similar to that shown and described in the Lake Reissue Patent No. 16,304. On registers C and C' and D a different type of read-out devices are provided as will now be described.

Figure 13:
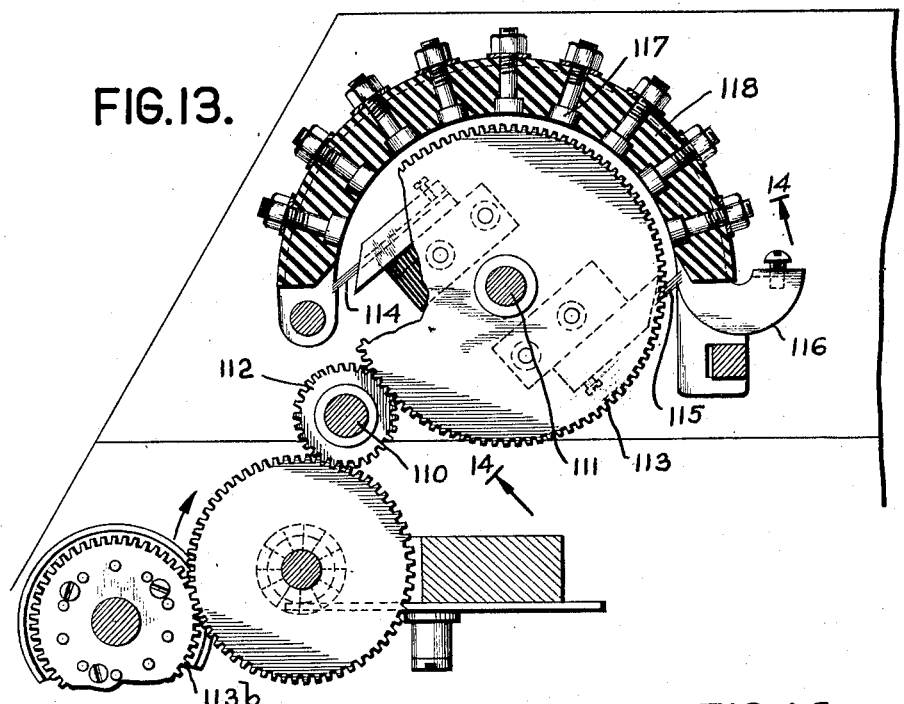
Figure 13 is an enlarged detail sectional view of a read-out device which is used in the machine. The section is taken substantially along line 13—13 of Fig. 7.
Figure 14:
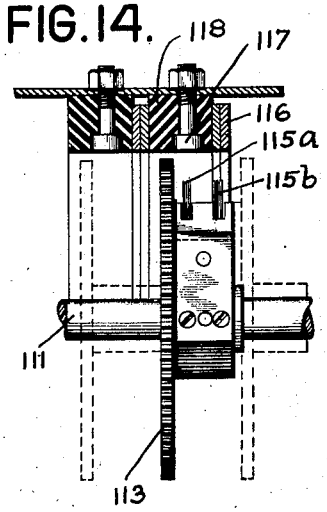
Figure 14 is a part sectional and part elevational view of the read-out device shown in Fig. 13, the view being taken substantially along line 14—14 of Fig. 13.
Figure 19:
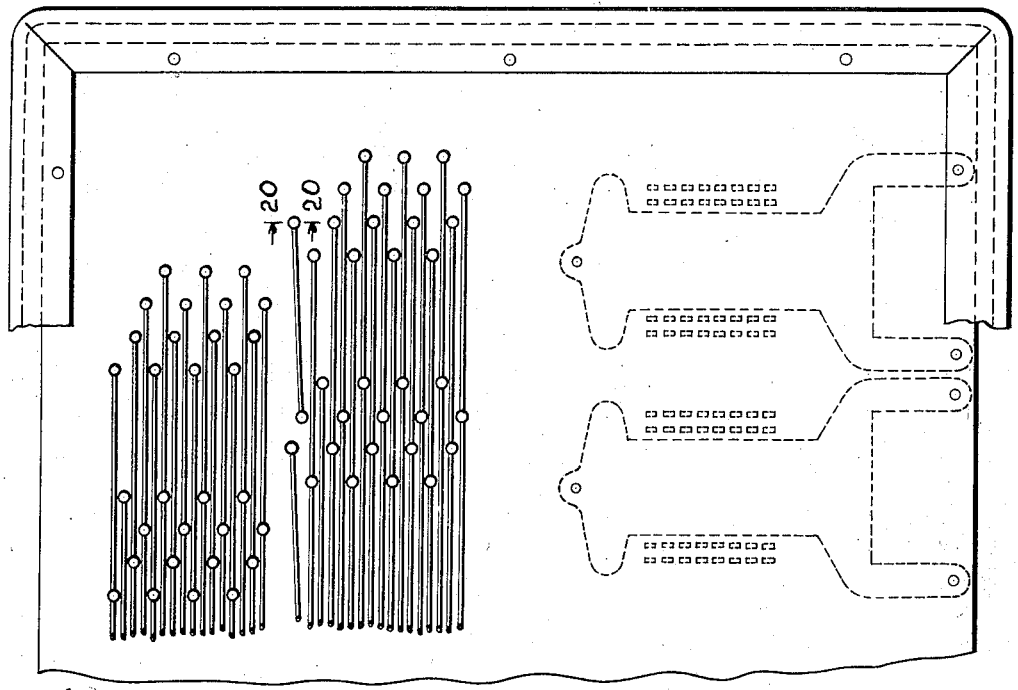
Figure 19 is a fragmentary sectional view showing the bus connectors and their mountings on one of the panels of the machine. The view is taken substantially on line 19—19 of Fig. 6.
Figure 20:
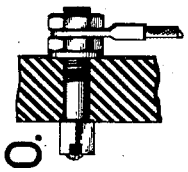
Figure 20 is a detail showing the manner in which a flexible lead is connected to one of the transverse bus connectors. It may be considered as a section taken on line 20—20 of Fig. 19.

The read-out devices for the registers C, C' and D are identical and are shown in Figs. 13 and 14. In lieu of using the top read-out section shown in Fig. 8 of the drawings the top section of the counters C and C' and D are of special construction including suitable side frames for supporting two fixed shafts 110 and 111 (see Fig. 13). The clutch gears of the accumulator pertaining to each order of the receiving devices, C, C' and D through intermediate gears 112 which are freely rotatable on shafts 110, drive gears 113, each of which carries a pair of brush elements 114 and 115. In explanation of the use of two brush elements 114 and 115, it may be explained that gear 113 is twice the size of the adding wheel 113b in the associated and actuating counter. During alternate complete revolutions of the adding wheel 113b, first brushes 114 will ride over the cooperating commutator and the other brushes 115 will be ineffective. During the next complete revolution brush 115 will be active and 114 inactive. This construction employing two brushes is also shown diagrammatically in Fig. 28e. The reason why two pairs of brushes 114 and 115 are employed instead of a single brush is in order to provide for mechanical convenience in the construction of the machine and to provide ample size of the cooperating parts.

Referring now to Fig. 14 it will be noted that the brush element which has been designated 115 in Fig. 13, in reality comprises two brushes, viz. a read-out brush 115a and a current supplying brush 115b. Brush 115b receives current from a circumferential segment strip 116 (see also Fig. 13).

Brush 115a is adapted to cooperate with any one of the conducting segments 117 mounted in the insulating commutator 118. It will be understood that this brush 115a will co-act with a particular segment depending upon the position of the adding wheel in the counter and in this way a circuit will be established to one of these segments depending upon the amount which stands upon the adding wheel counter.

*Drive for reading in, reading out and recording section of the machine*

Figure 4:
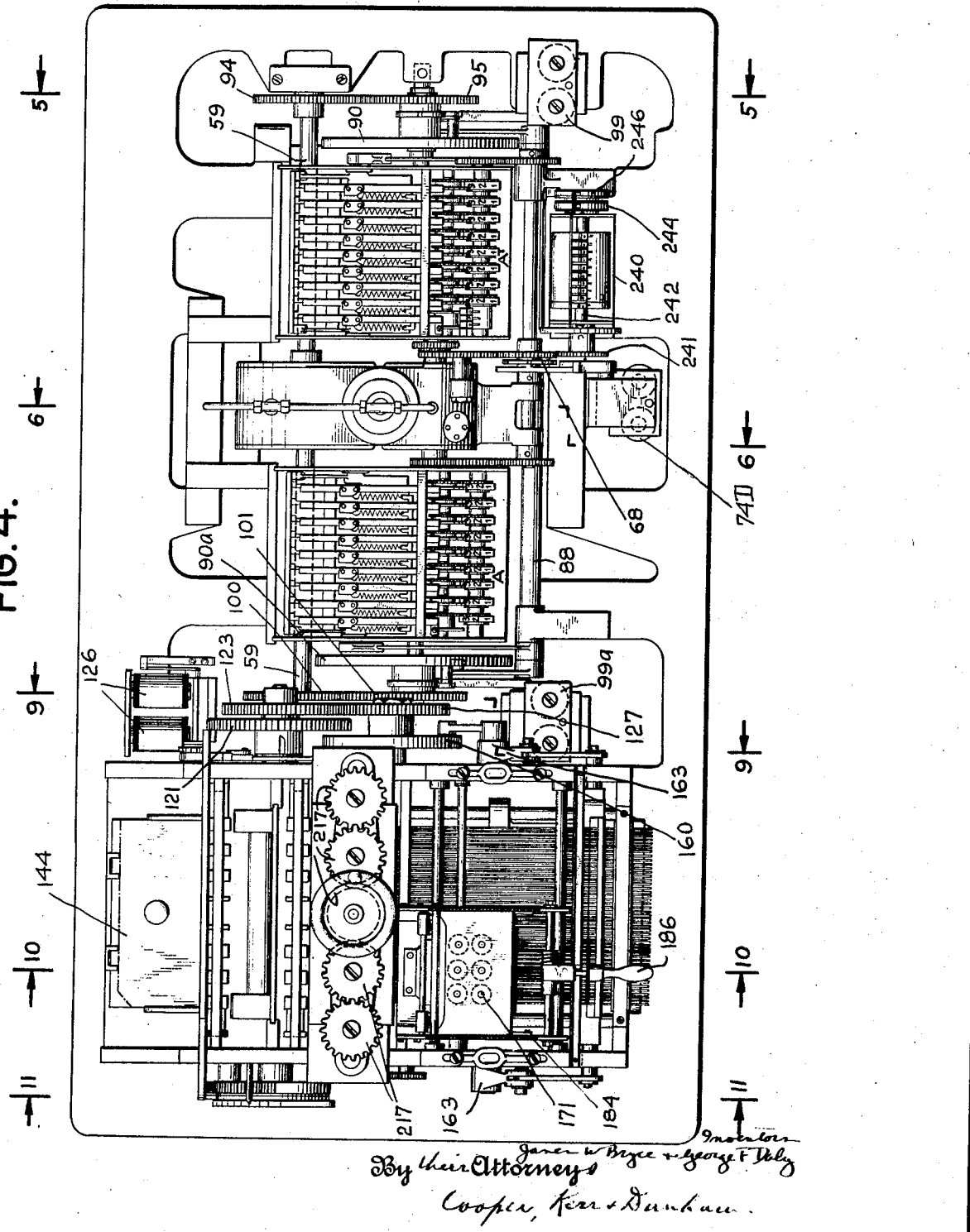
Figure 4 is a top plan view of the machine with certain housing parts removed.
Figure 9:
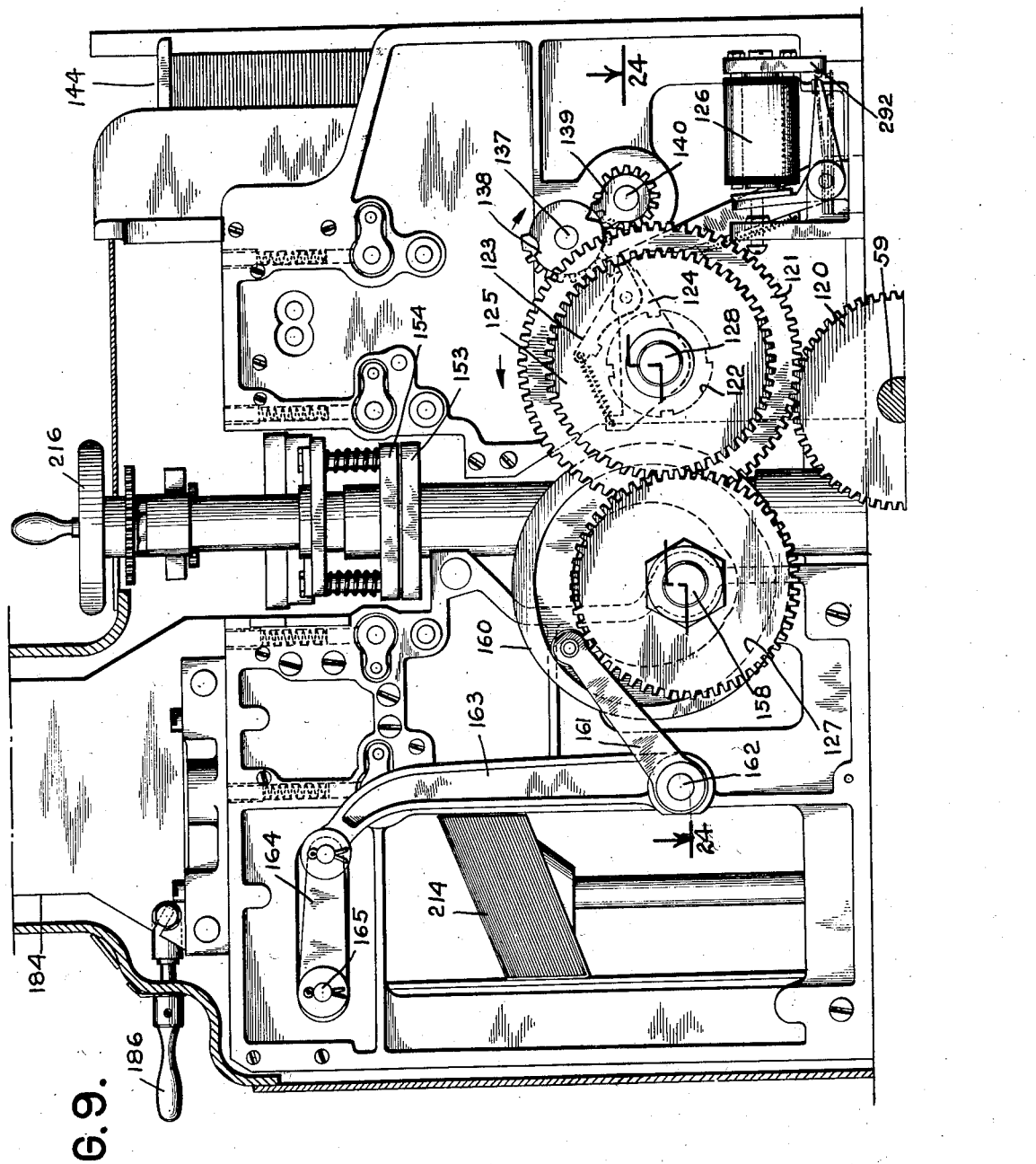
Figure 9 is an elevational view of the card punching and card reading and handling section of the machine, the view being taken substantially on line 9—9 of Fig. 4 and looking in the direction of the arrows.
Figure 24:
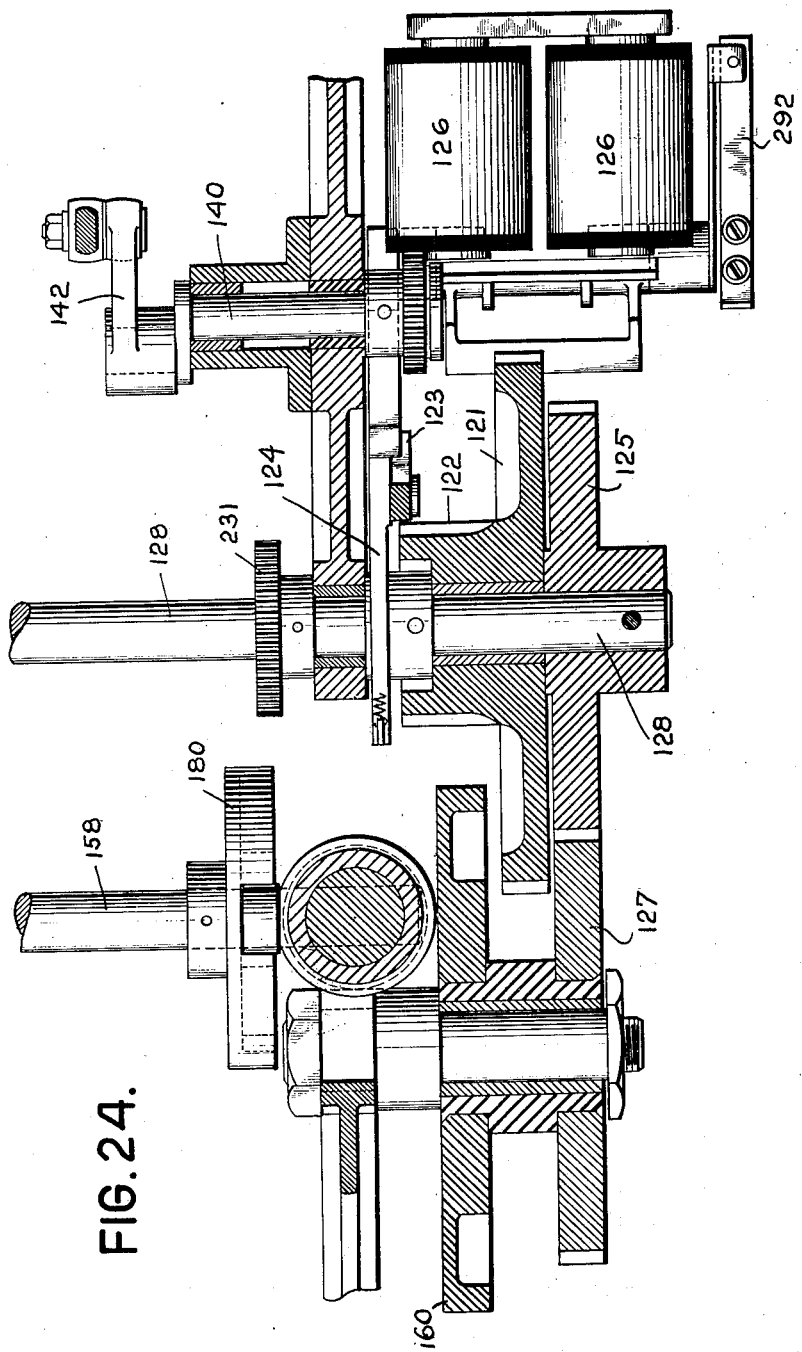
Figure 24 is a detail sectional view showing the drive for the punching section of the machine. The section is taken substantially on line 24—24 of Fig. 9.

Referring now to Figs. 4, 9, and 27, shaft 59 has on its left hand beyond gear 100 (Fig. 27), another gear 120 which gear meshes with the gear 121 which has fast to it a driving element 122 of a one revolution clutch (see also Fig. 24). This element has four notches as shown in Fig. 9. The pawl element 123 of this one revolution clutch is fixed to an element 124 which in turn is fast upon a shaft 128 to which is secured a gear 125. Gear 125 in turn when clutched by the clutch element upon the energization of magnet 126, is adapted to drive a gear 127 and shaft 128 is also driven.

Figure 11:
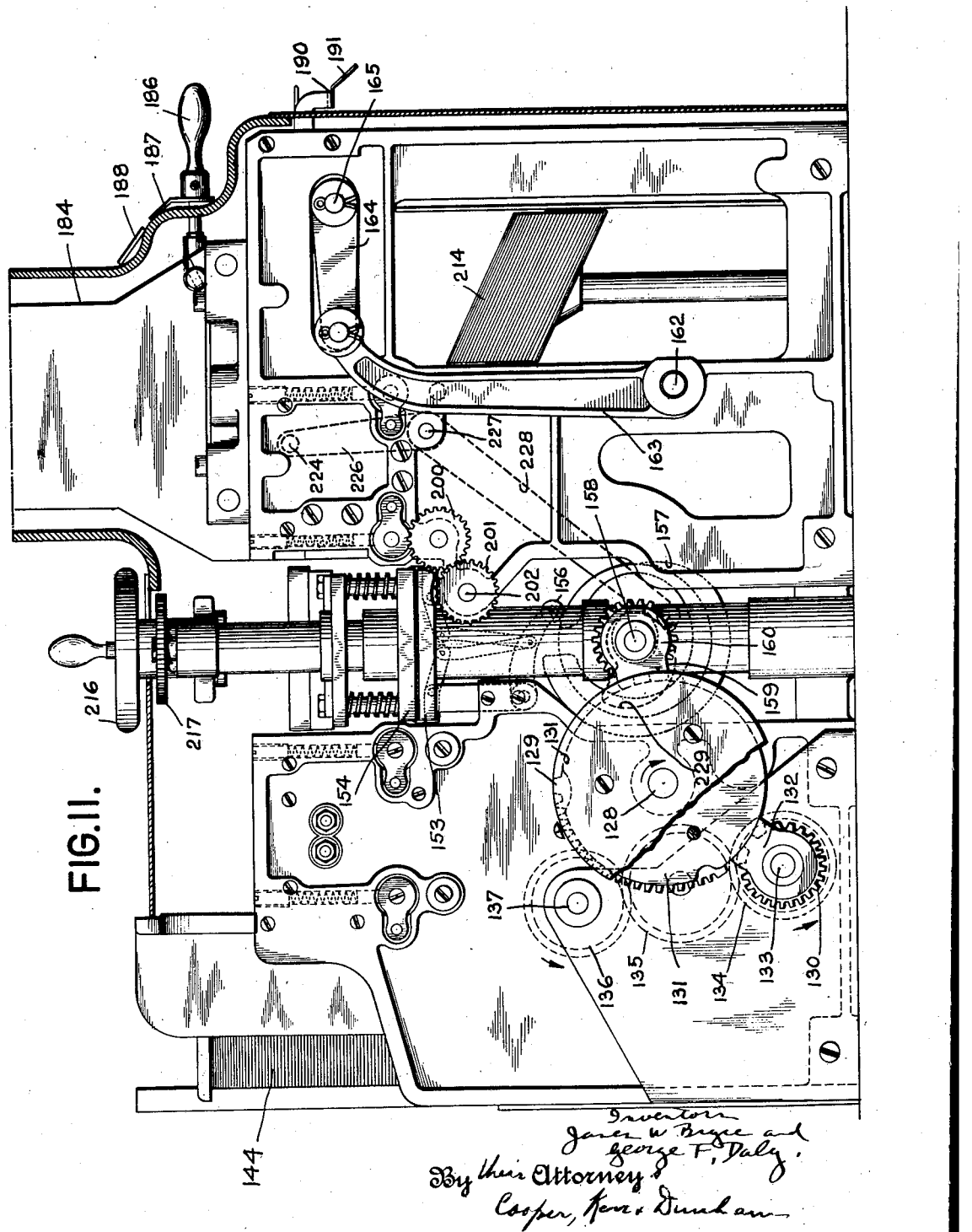
Figure 11 is an outside left hand elevational view of the card punching section of the machine, the view being taken substantially along line 11—11 of Fig. 4.

Referring now to Fig. 11. When shaft 128 is clutched to the driving shaft and turned through one revolution, it rotates in the direction of the arrow in Fig. 11 and on shaft 128 there is an intermittent Geneva gear designated 129, which cooperates with a companion gear member 130, the Geneva element comprising a disk-like element 131 which cooperates with 132. Thus the gear 130 has imparted to it, a movement which is in the direction of the arrow. Upon the initial movement of shaft 128, there is no movement imparted to 130, but later in the movement of 128, 130 turns through a complete revolution in an anti-clockwise direction and is finally locked after one revolution is completed.

Gear 130 is fast to a shaft 133 which in turn through gearing 134, intermediate idler gear 135, and gear 136 is adapted to rotate a shaft 137 in the direction shown.

Referring now to Figs. 9 and 10, the shaft 137 is also provided with an intermittent Geneva device generally designated 138 cooperating with another intermittent Geneva device generally designated 139 which is secured to a shaft 140. Shaft 140 (see Fig. 10) has fast to it a disk 141 which through a crank or eccentric device 142 drives the card picker 143 to advance one card from the supply magazine 144 into a position in which it may be gripped by the first of a series of feed rolls. The feed rolls are disposed in pairs, the pairs being indicated at 145, 146, 147 and 148. Drive for these feed rolls 145 to 148 inclusive is derived from shaft 137 through spiral gearing 149 which drives a shaft 150 provided with suitable spiral gears to drive the respective pairs of feed rolls. Intermediate the pairs of rolls 145 and 146 is a card analyzing means comprising a rotatable contact roll 151 and a row of card analyzing brushes 152. In the operation of the machine a card will be picked from the supply magazine and traversed past the brushes, then delivered by rolls 146 into the die section of the machine. During its transit past the brushes the multiplier and multiplicand reading is derived from perforations of the card.

The die section comprises a lower die plate 153 and an upper stripper plate 154. To align a card when it is in the die section, aligning devices are provided which are adapted to jog the card from each edge and locate it properly in the die. These aligning devices (see Fig. 41) comprise fingers 155 and 155a which are actuated by a linkage and follower 156 (see also Fig. 11) cooperating with a cam 157 fast to shaft 158. The drive for shaft 158 is also derived from the intermittent Geneva gear devices 129—131 through Geneva devices 159, 160. Shaft 158 also actuates other parts of the punching device as will be hereinafter described.

The foregoing description has explained how a card is taken from the supply magazine, passed into the analyzing brushes and delivered into the punching die and aligned there. During the time in the cycle of the machine when the card is being passed under the analyzing brushes the reading of both the multiplicand and multiplier factors is taken from the card and entered into the receiving devices C, and C' and D. C, and C' are the receiving devices for receiving the multiplicand and D is the receiving device for the multiplier. It will be understood that the operation of the registers C, and C' and D is coordinated in time with the passage of the card under the brushes 152, and in this way the multiplicand and multiplier factors are entered into the receiving devices. Such factors are retained therein during certain subsequent cycles of the machine. During certain of these cycles the card remains between the brushes and the die and is afterwards fed completely into the die.

The description of the computing operation itself will be separately and subsequently explained in connection with the circuit diagram and for convenience in description it will now be assumed that the final product has been computed from the multiplicand and multiplier factors and placed upon the accumulator A and A'. After such final product is available as previously described, a reading-out is effected upon the accumulators A and A'. The read-out devices 102 sense the accumulators and produce timed impulses in the conventional way according to the amount which stands on the accumulators. Concurrently with this sensing operation there is a setting up for recording or punching. This will now be described.

Referring again to Figs. 9, 10, 11 and 49 at the time in the cycle when the accumulators A and A' are being readout, the gear 125 rotates the gear 127 which has fast to it a cam 160. Co-operating with this cam is a follower 161 fast to a shaft 162. Also fast to this shaft 162 are two arms 163 which at their upper ends connect to links 164 which connect to studs 165 fast to a crosshead 166 (see Fig. 10). The crosshead 166 is slidably mounted on guide rods 167 and this crosshead carries a number of spring pressed pawls 168, which impositively displace selector members 169 to the left in Fig. 10 as the crosshead is reciprocated in this leftwise direction. The ends of the selector members slide over rows of punches 170 (see Fig. 49) there being one selector for each row of punches. Movement of the selector members 169 is interrupted by energization of magnets 171 when these magnets receive an impulse from the accumulator which is being read out. Such energization of the magnets is adapted to trip stop pawls 172 and thus arrest the movement of the selectors.

The foregoing operation has placed each selector 169 pertaining to a particular column of the punches in position to select a particular punch in that column for a punching operation.

After punch selection has been effected rotation of shaft 158 ensues and a cam 180 raises the die 153 and stripper 154 and as the selected punches are kept from being elevated by the selectors 169 such punches will punch the card according to the previous selection of the punches.

*Suppression of operation on desired rows of punches*

Figure 26:
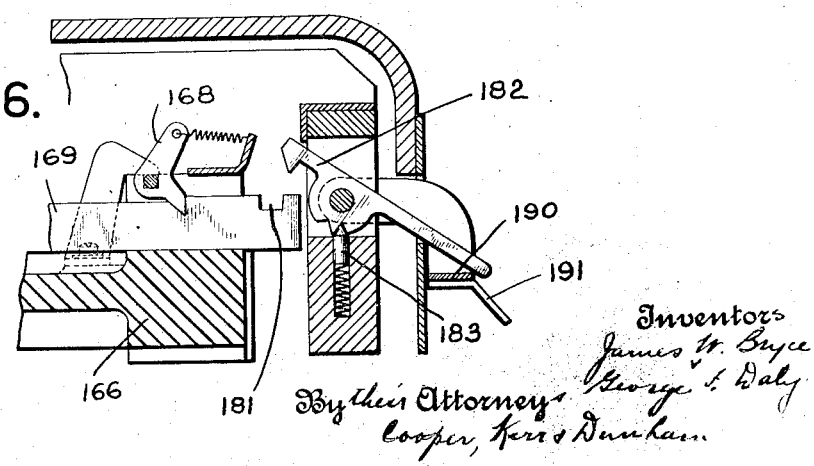
Figure 26 is an enlarged view showing certain parts of Fig. 10 in displaced position.

Provision is made for locking out any desired punch selectors so that the punching operation can be suppressed on any desired columns or so that on unused columns, movement of the selectors can be suppressed. Fig. 26 shows the locking out devices for the punch selectors 169. Each selector 169 is notched at its rear end as shown at 181 and for each selector there is provided a locking finger 182 which is secured in one of two positions by an impositive lock 183. The end of the locking finger 182 when in the position shown in Fig. 26 is free from the notch 181 and the punch selector can then function. When it is desired to lock out the desired selector or selectors the fingers 182 are displaced into the position shown in Fig. 10, thus suppressing leftwise movement of the selectors and accordingly suppressing any attendant punch selection thereby.

Figure 25:
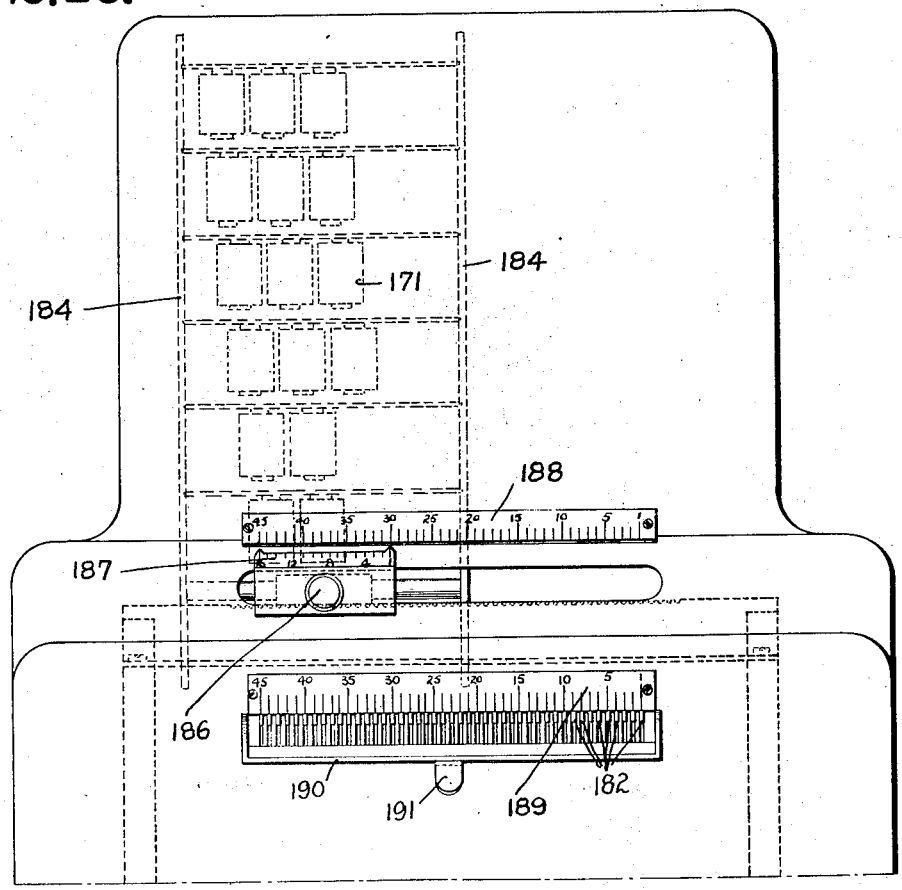
Figure 25 is an enlarged front elevational view of the housing for the punch selecting magnets and this view shows the index devices for controlling the setting of the magnets. The view is taken substantially along lines 25—25 of Fig. 10.

There is one pair of magnets 171 (Figs. 25, 49 and 10) provided for each column or order of the accumulators A and A' although more could be provided if desired. These various magnets 171 are mounted in a frame 184 (Fig. 10) which frame is transversely slidable on guide rods 185. The frame and the magnets may be slid crosswise to any desired position by means of a handle 186 which projects out from the front case of the machine and which has a suitable index device 187 cooperating with a stationary index 188 (see Fig. 25). By displacing the magnet frame to the desired position the various magnets can be cooperatively disposed relatively to any of the selectors as shown. Alternatively in place of shifting the magnets a sufficient number of magnets could be used to provide one magnet for each selector bar. There are forty-five selectors 169 and accordingly the index 188 has forty-five positions thereon. There is also provided another index plate 189 which guides the user in manipulating the lock out fingers 183. Provision is also made for concurrently relatching all of the lockout fingers 182 with the notches in the selectors. This comprises a common bail member 190 (Figs. 26 and 10) which is pivoted on the shaft which carries the fingers 182 and which is adapted to be raised by lifting a lug-like extension 191 which projects forwardly from the bail 190.

Referring again to Figs. 11, 10 and 41 the card jogging devices 155 and 155a are retracted out of the line of the card movement when a card is being fed into the die and are also retracted out of such line when a card is to be fed out of the die. This action is effected by cam 157. Feeding of the card out of the die is effected in the following manner.

Figure 15:
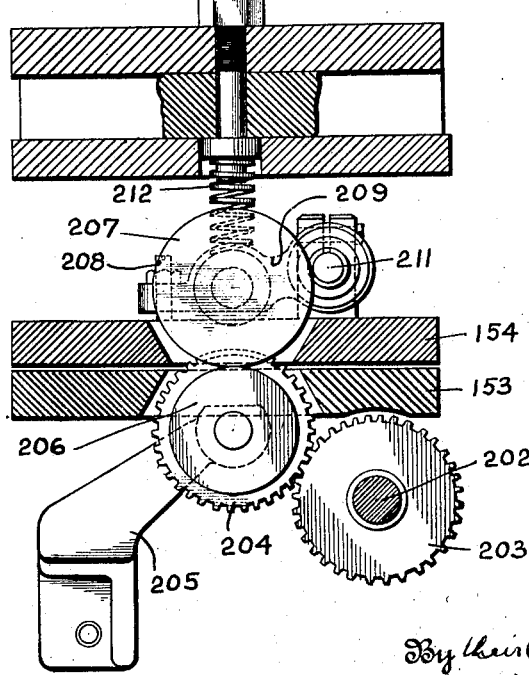
Figure 15 is a transverse section of a portion of the card handling section of the machine showing certain of the feed rolls, the section being taken substantially on line 15—15 of Fig. 12.

Referring now to Figs. 11, 10 and 15, the shaft for the lowermost of the pair of feed rolls 147 has on its end a gear 200 (Fig. 11) which meshes with the gear 201 fast upon a shaft 202. Shaft 202 (Fig. 15) has fast to it a gear 203 meshing with a gear 204 which is supported for rotation upon a bracket 205 fixed to the frame of the machine. Fast to the gear 204 and rotating with it is an ejecting roll 206 which cooperates with a friction driven roll 207 disposed above it. When the die 153 is lifted to punch a card, roll 207 is disengaged from roll 206 which is then stationary. Elevation of 207 is brought about by a stud 208 which contacts with the stripper plate 154. Roll 207 is supported on a bracket 209 pivoted on 211 and spring pressed downwardly by a spring 212. The tension of this spring may be adjusted by means of stud 213. Upon the lowering of the die and the stripper 154, roll 207 is brought down and pressed against the top of the card and roll 206 being then rotated the card is removed from the die and delivered into the feed rolls 147 (Fig. 10) which in turn take the card to the feed rolls 148 which deliver it to the discharge magazine 214 (see Fig. 10).

Provision is made for lifting the stripper plate 154 with respect to the die plate 153 in order to obtain access to the die to remove any card which may have become jammed in the die or for the purpose of cleaning the die, etc. This construction is of conventional form and comprises a hand wheel 216 (Figs. 10 and 12) which through suitable gearing 217 (Figs. 4 and 11) revolves screws 218 and thereby elevate the stripper and punch assembly.

To prevent accidental and inadvertent separation of the die and stripper, a notched disk 219 (Fig. 42) is provided disposed upon the shaft beneath the hand wheel and before the hand wheel can be turned a restraining pawl 220 must be raised out of engagement with the notched disk 219.

Referring to Fig. 10, the punch chips which pass through the die are caught in a suitable chip catching receptacle 221 and are delivered to a chute 222 which delivers these chips to a suitable removable receptacle disposed in the base of the machine.

After the punch selector magnets 171 have been energized, and punch selection made by the tripping of pawls 172, these pawls 172 are restored and relatched by a restoring bail 224 (Figs. 10, 11 and 49). This operating bail 224 is displaced to the left and moves another bail generally designated 225 which serves to relatch the entire group of pawls 172 and also serves to knock off the armatures of magnets 171 by means of a bail 225a (Fig. 49). The bail 224 is mounted on a pair of arms 226 disposed on a shaft 227 which shaft carries an arm 228 cooperating with the cam 229 on shaft 158 (see Figs. 11 and 12).

There are also provided in the read-in and read-out section of the machine certain cam contacts which will be hereinafter described in connection with the circuit diagram. Actuation of the shaft 230 which carries these contacts is effected by means of the gearing 231 (see Figs. 10 and 11) driven from shaft 128.

The impulse emitter which is provided on this machine is shown generally at 240 in Fig. 4. It is also shown in Fig. 5 and in Figs. 43 and 44, and is shown in dotted position in Fig. 23 because it is driven from the gear 68 which pertains to accumulator A'. Gear 68 is a constantly rotating gear as has previously been explained. Such gear 68 pertaining to accumulator A' meshes with a gear 241 (see Figs. 23, 43 and 44). The gear 241 has a suitable shaft 242 fixed to it which carries an insulating cylinder 243 having conducting spots 243a thereon. Cooperating with these spots are brushes generally designated 328 which will hereinafter be described more fully in the description of the circuit diagram. Also carried on the cylinder 243 is a common conducting segment 288 cooperating with brushes 290. 288 is electrically connected to all of the spots 243a. Also fixed to the emitter shaft are the contact timers or make and break devices 244 and 246.

There are a number of controlling relays also in the machine which are shown in Figs. 17 and 18. The energization of the magnet coils shown in Fig. 17 rocks the armature member 250 and thereby rocks an insulated contactor 252 (see Fig. 18). 252 cooperates with sets of contacts 254 and 256 and thus upon the energization of the magnet these right and left hand contacts 254 and 256 are closed. A number of such relays and contacts are provided in the machine and for this reason numerals will not be given for the magnets in Fig. 17. The numbers of contacts which are provided, 254 and 256 depend upon the particular circuits which are to be established in each case.

Referring now to the circuit diagram 270 indicates a suitable source of current which upon the closure of the switch 272 connects a source to main line 274 and also to ground as indicated at 276.

It will be assumed that cards are in the card magazine and that the switch 272 is closed supplying current to line 274 and thereby setting the motor M into operation.

Preferably but not necessarily before cards have been placed in the card magazine the machine is plugged up and referring to the circuit diagram there are shown a row of plug sockets 278 which connect to the brushes 152. There are also shown another row of plug sockets 280 and 281; 281 are for the multiplier and 280 are for the multiplicand. The machine as herein disclosed is provided with a columnar capacity of eight columns for the multiplicand and eight columns for the multiplier. Obviously more or less can be used if desired. It will be noted that the eight right hand plug sockets 280 in the circuit diagram each have wired to them two magnets 284. One of these magnets 284 is in the receiving device C and the other magnet 284 is in the receiving device C' in the corresponding columnar position and relation therein. Magnets 284 are the well known counter magnets in such receiving devices. There are also plug connections provided between the sockets 278 which pertain to the multiplier brushes and the sockets 281 which are wired to the counter magnets 282 in the receiving device D. By this manner of plugging and with this manner of connections from the plug sockets, it will be understood that there is an identical entry made in the receiving device C to that made in the receiving device C'. There are also other plugging operations but these will be described later on.

Having cards in the card magazine the first operation is to press the start key designated 286. As is usual in this type of machine there are a number of cam contact devices for controlling the various circuits in the machine. These cam contact devices generally fall into two groups, viz. those designated CA, CB, CC, CD, CE, CF and CG. All of these contacts having the C prefix in the designating letters are actuated once for each counter cycle. All of these cam contact devices are disposed upon the shaft 82 shown in Fig. 27 of the drawings of the mechanical parts of the machine. Also disposed on this shaft 82 are contact devices CC8, CC7, to CC1 inclusive. These devices are in the form of commutator circuit closers and the suffix designating numeral designates the time at which the circuit is closed thereby as related to the index point cycle of the counters of the machine and also the suffix numeral designates the particular column of the multiplier with which this timing contactor is associated. There are also provided on the shaft 82 other contactors designated CX8, CX7, CX6 to CX1 inclusive. These commutator circuit closers all make at the same time and the suffix numerals associated with each device accordingly merely designates the columnar correlation of the circuit closer. The closing of the circuit through these devices is not variable according to the index point timing of the receiving devices as was the case with the CC8 to CC1 group. There is also another group of cam contact devices which are associated with and driven by a shaft in the punching section of the machine. Such shaft has been heretofore referred and designated 230 and shown in Figs. 10 and 12 of the drawings. Disposed upon this shaft 230 are cam contact devices PMA, PMB, PMC, PMD, PME, PMF, PMG, PMH, PMJ, PMK, PML, PMM and PMN.

In the previous description reference has been made to the timing contactors 244 and 246. These circuit breakers are arranged in cyclic time with the index point relation of the machine and the device 246 is arranged to make a circuit at the time in the cycle of operations when an index point perforation passes brushes 152 and immediately breaks such circuit thus preventing arcing at the brushes. The device 244 serves for a similar function to prevent arcing at the read out devices.

The impulse emitter heretofore mentioned and designated 240, is provided with a number of conducting spots as shown, which are individually connected to a common conducting strip 288 which is supplied with current by brush 290. This emitter cooperates with other brushes as will be subsequently described and emits impulses which are ultimately representative of digits of amounts which make up products.

The operation will now be traced beginning with the depression of the start key 286 heretofore mentioned. In describing the operation, reference will be made to the circuit diagram and also to the timing diagram Fig. 38. It will be noted that CA closes once per counter cycle remaining closed from the R position in the cycle to shortly before the nine position in the subsequent counter cycle. Accordingly upon depression of the start key 286, CA will in time close. Current will thereupon flow from the left side of line 274 through CA, through the contacts associated with start key 286 through the contacts 298 of card lever relay #1 (CR#1), through punch clutch magnet 126 and back to ground 276 which is the other side of the line. The energization of punch clutch magnet 126 (see Fig. 9) closes contacts 292.

Punch clutch magnet 126 having been energized a cycle of operation of the punching and card feeding section of the machine is initiated and the lowermost card in the card magazine is picked up by the picker and fed forward, the advancing movement of the card actuates the usual card lever 294 (Figs. 10 and 40) and closes card lever contacts 296. Closure of the card lever contacts energizes the card lever relay magnets Nos. 1, 2, 3, and 4, designated CRI to CR4 inclusive. The relay coils or magnets will be given similar designations to the contacts which they control.

At this point in the explanation, it may be stated that the first cycle of operation of the machine picks a card from the magazine 144 in Fig. 10 and advances it a short distance. In order to get the card lever closed, it is necessary to hold the start key depressed until the card has been advanced somewhat in the next cycle of operation so that the card can actuate card lever 294. When CRI becomes energized the contacts 298 of CRI open and contacts 300 close.

Contacts PMF serve to provide current supply for the stick circuit through 292 and 126 so that the opening of contacts 298 does not interrupt such current supply. This supply through PMF also supplies current to cam contacts PME and PMD, which will be discussed later on.

After contacts 300 have thus closed, the start key still being held down, current flows down to and energizes relay R and relay G ultimately flowing back to ground 276. The contacts of CR3 have been closed by the energization of magnet CR3 and accordingly, a stick circuit is established through the stop key contacts 302 now closed, through CR3 now closed, through relay R, relay G and back to ground. At this point, it may be stated that the machine may be stopped by depression of the stop key 302.

In order to properly time the stoppage of the machine when it is stopped by such depression of the stop key contacts PML are provided which shunt the stop key and provide for a definite time of opening up of the stop key circuit. A similar safety provision is provided in connection with card lever 294 and contacts 296, the same including the controlling contacts PMM which serve to take the arc of breaking away from contacts 296 and place the same upon the contacts PMM and furthermore, to definitely time the deenergization of magnets CRI to CR4 when cards have been exhausted from the machine. In this connection it may be stated that while PMM will, on account of its own action, effect energization of CRI to CR4 inclusive, the time of such energization is such that this has no detrimental effect upon the operation of the machine, since it is the card lever contacts 296 which are the controlling factor in all cases. In other words, 296 closes well in advance of the closing of PMM which, however, becomes closed very slightly in advance of the opening of 296 so that the deenergization of magnets CRI, CR2, CR3, and CR4 are always effected by PMM.

The machine is now in operation and the first card is in position to be traversed under brushes 152. Before the card is traversed under such brushes relay CR4 has been closed so that current can flow from left side of line 274, through PMJ now closed, through CR4 now closed, through the contactor 246 to the conductor roll 151. The card continues its movement, passes under the brushes and the reading of the multiplicand and multiplier is derived from the card and set up in the receiving devices C and C' and D.

The setting up of the factors is just the same as the registering of an amount in an ordinary tabulating machine counter, the counter magnets 284 for the multiplicand and 282 for the multiplier being energized at the proper times under control of the perforations in the card.

As a condition which precedes the actual reading in of the multiplicand and multiplier into the receiving devices or counters there is another controlling circuit action which will now be described.

Before the brushes start to read the factors from the card, contact PMN closes allowing current to flow from left side of line 274 through the relay magnet N. This relay magnet N is of the type shown in Figs. 17 and 18 of the drawings and such relay magnet N when energized effects closure of contacts N8 to NI inclusive. Disposed in the multiplier counter or receiving device D are contact devices S8 to SI inclusive. These contacts are similar to those commonly used in tabulating machines and are controlled so as to open upon energization of the counter magnets pertaining to that particular column. Contact devices of this sort are shown in Lake Patent #1,534,531 and designated 47b in Fig. 3 of that patent.

It has previously been explained that when magnet N is energized all the contacts N8 to NI inclusive are closed. N8 being closed by the energization of N, current flows from left side of line 274 through N8 now closed, through a relay T8, back through S8 now closed to ground 276. The energization of T8 establishes a stick circuit from the line 274 through the relay T8 and through the circuit previously traced back to ground.

A similar circuit is established for each of the various columns in the multiplier receiving device, there being individual relays provided designated T8 to TI inclusive. In parallel with the coils of T8 to TI inclusive are other magnet coils U which when energized, control contacts U8 to UI inclusive. When the coil U for example associated with T8, is energized, the open contacts of U8 are closed and the contacts of U8 which are shown as closed, are opened. A similar action takes place with U7 to UI inclusive.

Figure 1:
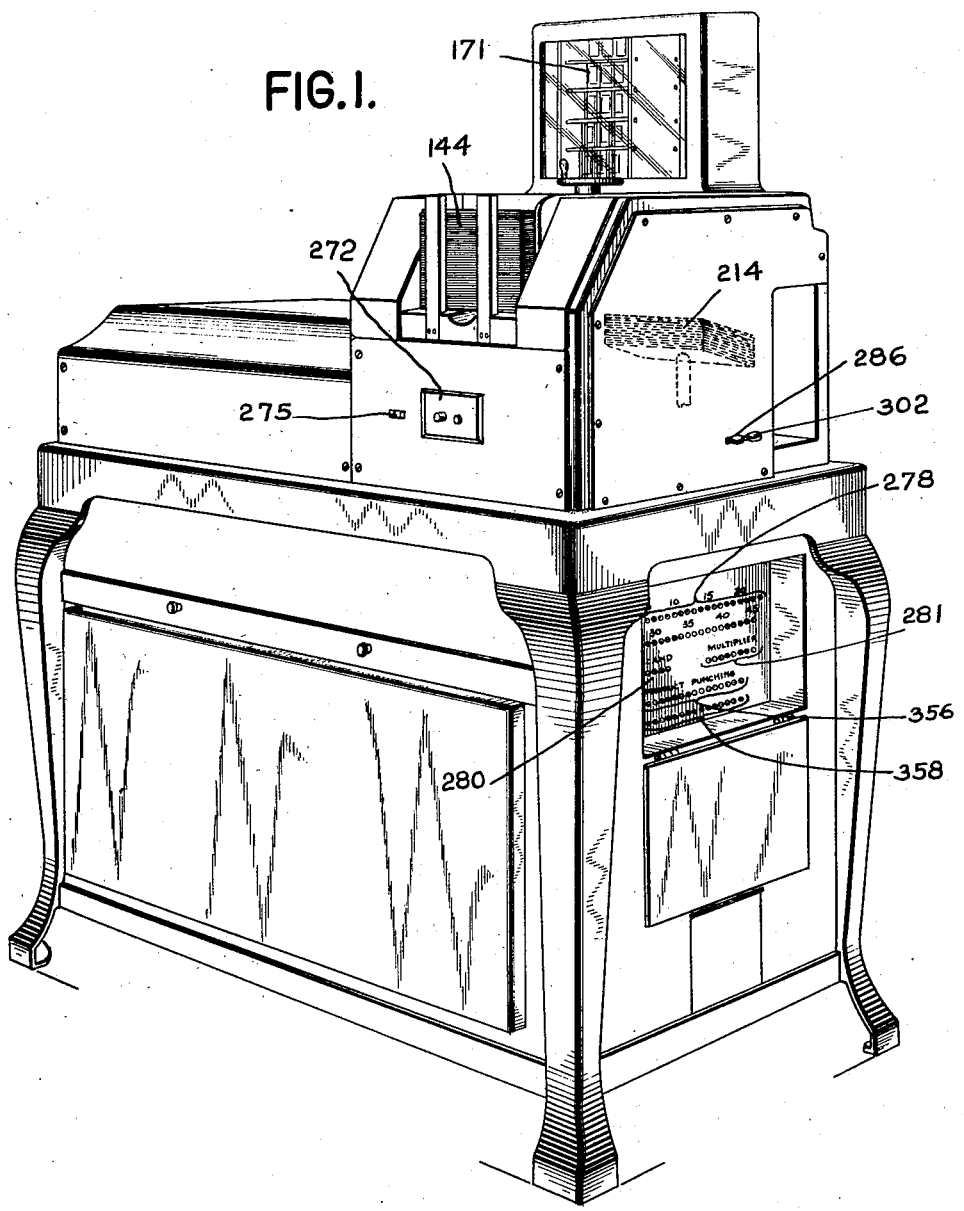
Figure 1 is a perspective outside view of the complete machine.
Figure 2:
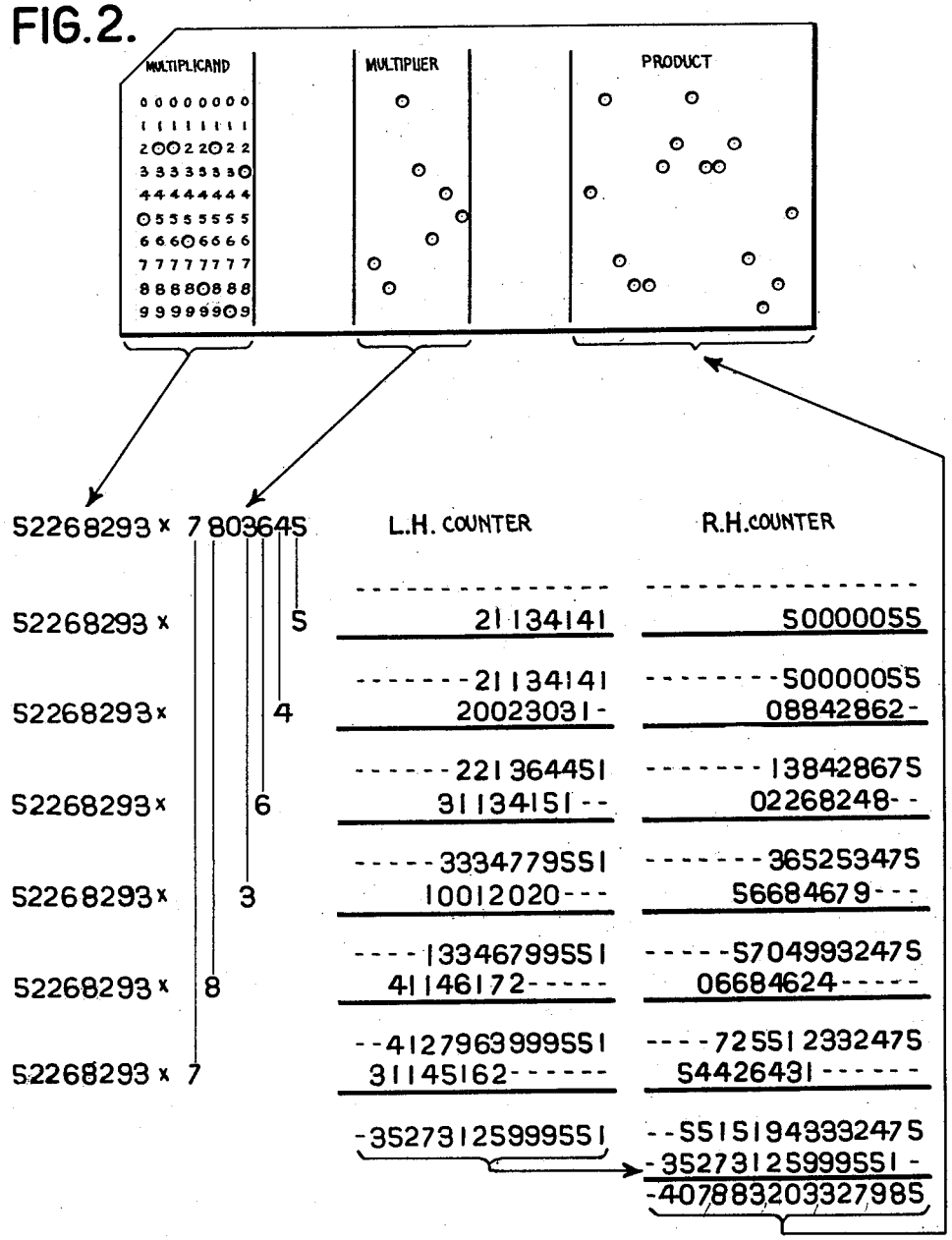
Figure 2 is a diagrammatic view showing a typical computation which the machine is adapted to perform.

Referring now to the example shown in Fig. 2 of the drawings where 52268293 as the multiplicand is to be multiplied by 7803645, it will be noted that as a preliminary to such computation the operator would plug up the eight columns pertaining to the multiplicand brushes with the eight multiplicand magnet sockets. The operator would also plug up seven columns of the multiplier brush sockets to seven columns of the multiplier counter magnet sockets.

It will be further noted that in the problem being handled there is a zero between 8 and 3 in the multiplier. The machine is so constructed that it does not effect an unnecessary idle computing cycle for such zero in the multiplier. The arrangement is such that regardless of the number of zeros appearing in the multiplier the machine will only go through the necessary computing cycles which are related to significant figures. Furthermore, even if the machine is plugged up for a seven column multiplier computation, it will not go through unnecessary cycles if a smaller number or a number including fewer significant figures is to be handled as the multiplier. For example, if seven multiplier columns were plugged up and a computation entered into the machine such as multiplying by 3645, the machine would only go through the necessary number of cycles to compute the multiplication by 3645.

Likewise if the multiplication were by 780000 only two computing cycles would be required, viz. those pertaining to 7 and 8.

Assuming now the problem to be computed to be that of Fig. 2, it will be understood that all of the contacts S1, S2, S3, S4, S6 and S7 will be opened at some time during the passage of the card as it passes the brushes. Contact S5, however, will not become open on account of the zero factor appearing in the card and since no impulse is received through the brush for a zero factor. The cutting off of the impulse at the zero index point is controlled by the cam PMK which cuts off the supply of current between the 1 and the zero index point position on the card. Accordingly, in the operation of the machine with this particular problem the relay T5 will remain energized and T8 will also remain energized, this circuit not having been plugged in the example noted. If such circuit was plugged and this computation was performed, there being no perforation in this column, T8 would remain energized in the same way. Corresponding control will be imparted to the U magnets and associated relays, that is, U8 will be thrown to a reverse position from that shown in the circuit diagram. U7, U6, U4, U3, U2 and U1 after having been shifted to reverse position will be released and allowed to reassume the position shown in the circuit diagram. U5 will remain in the position opposite from that shown.

After the aforesaid control circuits have been established and after the card factor readings have been entered into the multiplier and multiplicand receiving devices, cam contact PMK closes, relay G has been previously actuated, current accordingly flows from left side of line 274, through PMK, through G, through U1 which is at the position shown in the drawings, through CX1, through relay V1 and back to ground. Closure of the V1 relay establishes a stick circuit which comes from left side of line through CE now closed to such relay V1 and thence back to ground. There are other relays similar to V1, V2 to V8 inclusive and the operation of these will be subsequently described.

In parallel with the coils of each of relays V1 to V8 inclusive, are other relay coils CS1 to CS8 inclusive. Such relays CS1 to CS8 are also of the type shown in the Figs. 17 and 18 of the drawings. When V1 is energized as above described, CS1 will also be energized.

*Setting up multiplier and multiplicand and read-out mechanism associated therewith*

As has been previously explained in connection with Figs. 13 and 14 of the drawings, the multiplicand and multiplier receiving devices C and D are provided with the read-out mechanism previously described. In the showing in the circuit diagram and in order to simplify an understanding of the operation there has not been a showing of the two alternatively actuating brushes 114 and 115. In any computing operation only one brush actuates at one computing cycle and therefore in the diagram the showing of one of the brushes has been dispensed with. However Figure 28E shows more nearly the exact mechanical construction.

In the diagram there is shown the feed in brush 115b which cooperates with the conducting segment 116 and also the brush 115a which cooperates with the contacts on the commutator segment. On the circuit diagram the read-out devices for the multiplier receiving device D have been generally designated 320 and it will be understood that these pertain to the units, 10s, 100s, 1000s, etc., reading from the right to the left. The read-out devices for the multiplicand receiving devices C and C' have been generally designated 322 and given suffixes LH and RH respectively. Read-out devices 322LH are associated with and controlled by the multiplicand receiving devices C and the multiplicand read-out devices 322RH are associated with and controlled by the receiving device C'.

It will be understood that these devices 322LH and 322RH pertain to the units, 10s and 100s as is labelled on the circuit diagram.

With the multiplicand and multiplier factors entered into the machine and received by the receiving devices the various brushes of the read-out devices will be disposed in cooperation with the corresponding spots on the various commutator segments. For example, in the multiplier read-out devices the device 320 pertaining to the units order will have its brush standing on a 5 segment spot. The multiplicand read-out devices 322LH and 322RH pertaining to the units order will have their brush standing on a 3 spot, 3 being the digit in the units order of the multiplicand. The setting is similar for the rest of the digits. As actually shown in the diagram the brushes are in ineffective position and not associated with any particular segment spots.

It has been previously explained that when V1 is energized, CS1 is also energized. CS1 is a relay similar to Figs. 17 and 18 of the drawings and it has contacts controlled by it which are similarly lettered elsewhere in the circuit diagram. There are three groups of such contacts, one comprising a single contact which pertains to the units read-out device 320, another comprising a set of multiple contacts which pertains to the units read-out device 322LH and another comprising a group of contacts which pertains to the units read-out device 322RH. Similar groups of such contacts are provided for all of the CS relays, the same being lettered CS2 to CS8, etc. and it will also be understood that when the magnet coil CS1 is energized all of the CS1 contacts will be closed. The various controlling circuits have now been set up so that the machine is ready to multiply the amount of the multiplicand, for example, 52268293 by 5, 5 being the digit in the units place of the multiplier. This first step is indicated in Fig. 2 by the first line below the statement of the problem. The current to energize CS1 passes to it through the following path: from left side of line 274, through PMK, through G, through U1, through CX1 which determines the time of energization of V1 and CS1 and to CS1 and back to ground.

Subsequently, as before explained, a stick circuit is established from 274 through CE and thence by the transverse bus to CS1, through relay V1. CS being energized closes the contact CS1 pertaining to the units order of the multiplier read-out device 320. The brush of such multiplier read-out device stands on the fifth conducting spot and accordingly current will flow from left side of line through cam contacts CC now closed through the single CS1 contact through 116 via brush 115a and b through the fifth segment spot to the fifth bus of the group 326 and via the fifth wire to the X5 relay magnet coil and back to ground.

Energization of magnet coil X5 closes the contacts X5 shown below the read-out devices 322LH and also closes another group of contacts marked X5 shown below 322RH. The energization of the X5 magnet also closes a single contact XA5 to provide current feed to the impulse emitter lead-in brush 290. These contacts X5 and single contact XA5 being closed current now flows as follows: From left side of line 274 through XA5 now closed and to brush 290 thence via 288 to all of the conducting spots on the emitter 240. The emitter 240 rotates in timed coordination with the operation of the machine and of the counters and the spots successively pass a group of brushes 328. Each of these brushes is arranged to make contact at one point only in the cycle of the emitter and when a particular brush is in contact with the correlated spot. The row of numerals to the right of the emitter show the time in the cycle of operation of the machine as coordinated to the counter time that the impulse may be created by a particular spot.

It is also to be noted that each of the brushes 328 is arranged to cooperate only with one single spot and each brush only receives an impulse when the correlated spot is in contact with it.

The effect of the emitter action thus described is to potentially impress upon the lines designated as a group 330 a succession or a ripple of impulses, one timed impulse being sent for each index point position along one line only. For example, on the upper line 330 a timed impulse would be sent over this line at the 9 index point position and on the second line from the top of the 330 group an impulse would be sent over this line at the 8 index point position and so on for all the other lines.

The operation thus traced explains how the timed impulses are sent over the lines 330, each line transmitting a single impulse only and transmitting such an impulse at a different time with respect to the impulse which is transmitted on the other lines and at times coordinated to the cyclic time of operation of the machine and particularly of the receiving devices B and B' and A and A'. Such impulses flow along the line 330 and at a certain point on these lines one line, viz., the fifth from the top is connected to one side of the contact group X5. The other side of these X5 contacts which are closed as has heretofore been explained, are individually connected to the group of lines 332 in the manner indicated in the diagram.

Tracing along the lines 332 it will be noted that these are wired individually to the segments 1 to 9 of the read-out devices 322RH. The relay contacts X5 just described will therefore at the fifth index point of time in the cycle transmit an impulse to the line of the 332 group which pertains to the units, and also an impulse to the 332 group which pertains to 3 and to 5 and to 7 and 9. On the devices 328 lightly dotted arrows have been shown indicating the set-up position of the brushes for the particular problem under consideration which is shown in Fig. 2. The impulses which are thus received by all of the brushes of the 322RH read-out devices pass through the individual read-out devices and are transmitted to another group of lines 334. The left hand read-out devices 322RH transmits an impulse only to the upper line, the next one of the 322RH group to the right transmits an impulse only to the second line and so on.

Lines 334 are denominational lines and accordingly the devices 322RH allot a denominational order to the impulses which heretofore had no denominational value whatsoever. There is a further denominational selection in successive machine cycles but the first denominational selection is made by the 322RH devices in accordance with the way they are connected to the group of wires 334.

As previously explained, contacts CS1 have been closed and accordingly establish certain connections to another group of lines 336, which lines extend over and connect with the counter magnets 347 which pertain to the accumulators A and A'.

With the explanation which has just been given we have been dealing with 322RH only, meaning right hand components of the multiplication of the multiplier by 5. Any number multiplied by 5 for its right hand component must have a result of 5 or zero. Accordingly, the timed impulses which are emitted for 5 are less complex than for other numbers later to be described.

As explained before, an impulse comes over the line of the 330 group at the 5 index point in the cycle. Such impulse at this time is imparted to the third wire from the top of the 332 group which circuit leads to segment #3 of the 322RH device pertaining to the units and through that device to the bottom line of the 334 group. This impulse passes through its associated contacts of CS1 and passes over the bottom line of the 336 group to enter a 5 in the units order or column of receiving device A'. In the computation under consideration, the problem is 5. by 3 and the right hand component of this multiplication is 5.

Now tracing the action of the 322RH device, pertaining to the 10s order the brush of this device stands on the segment 9 which is connected to the bottom line of the 332 group. The device X5 connects this same bottom line to the same bus bar of the 330 group which carries an impulse at the 5 index point, and accordingly 5 will be entered into the tens order of the receiving device A'. In the problem this corresponds to the multiplication of 9 by 5 or 45. 5 being the right hand component. Tracing the operation on the hundreds device, 322RH, it will be noted that the brush of this device as shown by the dotted arrow, stands on the 2 section which connects from the second line on the top which when traced down is found not to be connected at all to any of the X5 contacts. Accordingly, no impulse is transmitted and there is no entry made in the hundreds order of the receiving device A'. This is in accordance with the problem under consideration, viz. 5. by 2 equals 10, 0 being the right hand component of this product. It is unnecessary to trace the further orders in the problem under consideration but it may be stated that the entire group of right hand components of the computation of 5 as the multiplier times the multiplicand is concurrently entered into the receiving devices A and A' during a single counter or register cycle of such receiving devices.

Computation of left hand partial products and entry of the same

The impulses created by the emitter 249 also are transmitted via lines 330 through branch or extension lines 340 to similar circuit controlling and reading devices which appertain to the entry of amounts into the accumulators B and B'. The X5 points have been closed in the manner heretofore explained. The lowermost line 340 transmits an impulse at the index position representing one. The second line from the bottom transmits an impulse at 2, the 3 line transmits an impulse at 3 and the 4th line transmits an impulse at 4 and so on, contacts X5 being closed. Such timed impulses are imparted to the lines 342 according to the connections and arrangement of contacts X5, viz. on the bottom line of the 342 group which connects to the 9 segment of the read-out devices 322LH, an impulse is imparted to such line at the 4th index point position. This will be clear since 9, the multiplicand times 5, the multiplier, equals 45 and 4 is the left hand component of such multiplication. An impulse at the 4th index point position is also sent on the second line from the bottom of the 342 group. This line pertains to 8 in the multiplicand, i. e. 8×5 equals 40. On the next two lines which pertain to 7 and 6 respectively in the multiplicand, an impulse is sent at the 3 index point position inasmuch as 7 times 5 equals 35 and 6 times 5 equals 30, 3 being the left hand component in each case. The next two lines of the 342 group which pertain to 5 and 4 of the multiplicand receive impulses at the 2 index point position which is proper inasmuch as 5 times 5 equals 25 and 5 times 4 equals 20, 2 being the left hand component in each case.

On the top two lines of the 342 group which pertain to 2 and 3 in the multiplicand, an impulse is received on these lines at the 1 index point position, i. e. 5 times 3 equals 15 and 5 times 2 equals 10.

The read-out device 322LH pertaining to units has its brush standing on 3. Accordingly by reason of the circuit heretofore traced through X5 an impulse will pass through this brush at the 1 index point position and such impulse will go to the lower line of group 344 and have a denominational value or order of the units order allocated to it. It will thence pass through the contact of CS1 and finally pass to the units line of the 346 group which extends to the units order counter magnet 347 of the left hand partial product accumulator or register B'.

It will be unnecessary to trace the entry of the other components of left hand partial products as the same general operation is involved.

It will be understood, however, that these left hand partial product components are entered into the receiving devices B and B' in the same accumulating cycle of machine when the right hand partial product components are being entered into the receiving devices A and A'.

Column shift operation

The operation of the machine as described above has taken the operation through the entry of the amounts 21134141 into the left hand counter B and B' (considering B and B' as a single accumulator) and has entered 50000055 into the right hand partial product accumulator A and A'. The machine is now ready to handle the next step in the computation which involves multiplication by 4.

As shown in Fig. 2, the entry of the next set of partial product components both right and left hand must be made into the receiving devices relatively one column further to the left for all digits as compared with the previous entry. This is in accordance with the well known practice in multiplication.

It is of course, to be understood that the shifting of the entry only one column to the left, only applies if a significant figure appears in the next column of the multiplier. If a zero should appear in such next adjacent column in the multiplier the shifting of the entry must be made two columns to the left or as many more as necessary to take care of the intermediate zeroes. In the example noted in Fig. 2, the second figure from the right in the multiplier is a significant figure so the entry is made only one column relatively to the left so far as described, the impulse emitter has made one cycle and the X5 relays have all been kept closed and the CS1 relays have all been kept closed. The machine is now through with this part of the problem. It then proceeds as follows.

After the point in the cycle of the machine which corresponds to an emission of 1 by the emitter, cam contacts CC break (see Fig. 38). This action deenergizes relay magnet X5 and breaks all the relay contacts X5. At the same time or if desired preferably at a slightly later time in the cycle of the machine, cam contacts CE open. When these contacts open the circuit to the relays of the CS group is opened and relay CS1 is thus deenergized. The holding circuit through relay V1 is also opened.

It may be here explained that commutator contacts CC8 to CC1 close in sequence and successively in accordance with the suffix numeral appertaining to each. Thus CC8 closes first followed later by CC7 and so on. No circuit need be traced until CC1 closes. When CC1 closes, current coming from the left side of line 214 through PMK, and points of relay G, passes up through CC1 and energizes relay T1, the circuit being completed through S1 and thence to ground. S1 it may be explained opens only when a significant figure has passed under the sensing brush associated with its particular column and such contact S1 re-closes at the end of such entering cycle and then remains closed throughout succeeding multiplying operations of the machine. The same kind of a contact action applies to contacts S2 to S8 inclusive. It may be explained that the successive action of contacts CC8 to CC1 inclusive has taken place during the previous partial product entering cycle so that at the end of this cycle T1 is already set up and energized. After T1 is thus set up CC and CE function to deenergize V1 and CS1 as previously explained. Towards the end of the cycle CX8 to CX1 close simultaneously and a circuit is then set up through PMK, G, through U1 which is thrown to the reverse position from that shown in the circuit diagram inasmuch as magnet U has become reenergized, then through U2 which is in the position shown, down past CX2 to magnet V2 thereby energizing V2 and setting up another stick circuit through cam contacts CE which are again closed and energizing CS2. During the setting up of CS2 as just described, CS1 cannot become reenergized because U1 has been shifted from the position shown so as to prevent any flow of current down past CX1, V1 and CS1.

This operation has energized CS2 and closed its related contact points including CS2 related to the tens order device 320 (Fig. 28c) and also closed contacts CS2 associated with 322LH (Fig. 28b) and 322RH (Fig. 28a).

It will be noted that as regards 322RH and 322LH that the sets of feeding circuits from 334 to 344 to the groups 336 and 346 are both denominationally shifted one column to the left relatively to the previous entry. The entry of the next group of partial products then takes place as before and the operation proceeds, taking one multiplier column at a time until the operation is completed upon the fourth from the right significant figure in the multiplier. The next figure is a zero. The machine is constructed so as not to go through an unnecessary computing cycle for this zero and this result is brought about in the following manner. During the cycle in which 3 is the multiplier commutator contacts CC4 have energized relay T4 and relay U4 in the manner previously explained. Throughout this cycle, V4 and CS4 have been energized and multiplier relay X3 has also been energized. When cam contacts CC and CE open relays X3, V4 and CS4 become deenergized. At the end of this cycle after these relays have become deenergized and after cam contacts CC and CE have again closed, a column is skipped in the following manner.

It will be recalled that during the entry of the multiplier into the multiplier receiving counter D that the relay T5 was not deenergized inasmuch as this column of register D had not received a significant entry of any digit from 1 to 9 inclusive and accordingly contacts S5 were never opened during such cycle. Accordingly, contacts U5 remained in a position which is opposite to that shown in the diagram. Accordingly, the controlling current which comes over from contacts of relay G passes directly through U5 and is not diverted to V5 and CS5 when CX5 closes the circuit thereto. Instead the current flows across and past U5 to U6 the points of which are in the position shown. The current is diverted through U6 and at the time of the closing of CX6 there is an energization of V6 and CS6. Under control of the circuit just described the following computing cycle goes directly to the next significant figure of the multiplier and omits all cycles when 0's appear in the multiplier.

By noting the circuit diagram, it will be understood that when CS6 is energized the column shift is effected two steps to the left instead of one step or column as heretofore because the previous column controlling relay which was used was CS4. The same law of action would apply if there were numerous intermediate insignificant zeros.

*Transfer of left hand components into right component accumulators and initiation of punching operations*

The cycle controlling circuit just described proceeds to establish circuits step by step through U6, U7 and U8 which latter is in the reverse position to that shown in the diagram and thence through cam contacts CD which close at the end of the cycle and current then flows through punch start controlling relay 350 and back to ground. Energization of 350 closes points 352. Points CR2 have been previously closed by the energization of relay CR2. Accordingly, upon the closure of cam contacts CB, a circuit is established which is traced as follows: from 274 through CB, CR2, 352, through magnet 126 and back to ground 276 and also by a branch circuit through PME now closed through the left hand clutch magnet 99 and also back to ground. The left hand clutch magnet 99 is thus energized.

At this time in the operation of the machine the card is in an intermediate position between the brushes and die and is partially entered into the die. As the machine operation proceeds the card will be completely fed into the punching position in the die (i. e. the position of Fig. 41). The intermediate position of the card is provided to hold the card lever contacts 296 closed and thus to hold CR—2 energized to initiate the operation of the punching mechanism by energization of 126 as previously described.

The energization of magnet 126 closes a pair of contacts 292 and establishes a stick circuit through cam contacts PMF which immediately close and through 292 to magnet 126. The purpose of this circuit will be subsequently explained.

The read-out devices diagrammatically designated 102 in the circuit diagram and which are similar to those shown in Fig. 8 of the drawings are called into action by the energization of 99 in the manner previously described. These read-out devices 102 are those which pertain to the accumulator B—B' (see Fig. 28a). They operate in the usual way, reading the amounts standing upon B—B' and as shown in the diagram they are connected in circuits with the counter magnets 347 which pertain to the A and A' accumulator. Accordingly, the amount standing on accumulator B—B' which is the summation of left hand partial product components, is entered into the accumulator A—A', it being understood that the driving devices for A and A' are in operation during such read-out cycle. The connection of the read-out devices 102 of accumulator B—B' is such that the amount transferred from B—B' to A—A' is entered into A—A' relatively one column to the left from the accumulation which previously stood upon A—A'. This will be clear by reference to Fig. 2 and by examination of the manner in which the read-out devices 102 are connected to the counter magnets 347 of A—A'. The first read-out device to the right, as shown, is connected to the second line from the right of magnets 347 of A and A' and so on. The supply of current for reading-out B—B' and actuating 347 of A and A' upon a read-out operation of B—B' is secured in the following manner. At the proper time in the cycle of operation cam contacts PMH close, and the commutator circuit controller 244 comes into action to establish circuits to the common lead of the read-out devices at the proper index point times and to prevent arcing at the contacts in such read-out devices when they are restored to normal position.

*Second read-out operation and punching of product on the record card*

After the aforesaid transfer of total operation has occurred, there is initiated another reading out operation upon read-out devices 102 of A—A'

(Fig. 28d). The initiating circuit for this secondary read-out is secured as follows: Current flows from left side of line through PMF, 292 now closed as previously described, through PMD now closed thence through right hand clutch magnet 99A and back to ground. Energization of 99A initiates and effects the read-out operation in the manner previously described causing the read-out devices 102 of A—A' to close their proper contacts in accordance with the amount which stands on accumulator A—A'. The read-out devices 102 are connected to plug sockets 356. Other plug sockets 358 are provided and suitable plug connections are made intermediate plug sockets 358 and 356. Sockets 358 are individually connected to the punch selector magnets 171 which upon the other side are connected to ground. Flow of current through the various read-out devices is brought about upon the closure of cam contacts PMG. This operation thus described derives the reading of the complete and total product from accumulator A—A' and punches back upon the record card a product representing punching. No timers are required for the read-out devices 102 of A and A' as more time is available in this part of the cycle and as PMG open before read-out devices 102 are restored.

In this machine it is desirable in the event that an operator stops the machine in the middle of a computing operation, to provide in the machine suitable means to let that particular computing operation go through to completion before the machine is stopped. This is particularly desirable if the current is cut from the machine for any reason and then when the current supply comes back provision should be made so that the intermediate partially completed operation should not be lost. Accordingly, certain safety controls are provided for this purpose.

Referring to the circuit diagram, if the operator desires to stop the machine, the operator depresses stop key 302. In order to stop the machine, this key must be held down momentarily until cam contacts PML open at which time the punching operation on the last computed card has been completed. Also new factors will have been entered into the machine from a following card but no multiplication operation or part of a multiplication operation will have been performed upon these factors. Suppression of multiplying or computing under these conditions is brought about by the deenergization of relay G which when deenergized cuts off current supply to set up relays T1 to T8 inclusive.

In the event that a group of cards has been placed in the machine and separately computed and the last card has been passed through and computed and punched, provision is made for automatically stopping the machine under these conditions. This is brought about by deenergizing CR3 under the control of card lever 294, 294 interrupting the circuit to CR3 when PMM opens up. This action will open up CR3 and consequently R and G will become deenergized upon the opening of contacts PML. This action opens up contacts G and suppresses computing.

In this connection it may be stated that the only way that punching may be automatically started is by the closure of cam contacts CD and that after points G are opened CD can receive no current. Accordingly, no punching will be effected when points G are open irrespective of whether G are opened by the depression of a stop key or by cards running out of the machine.

It will be understood that the time of operation of the machine can be saved by providing overlapping cycles. These overlapping cycles are fully set forth on the timing diagram, Fig. 38. However, certain of them will be explained in detail in connection with the timing diagram and the circuit diagram.

For example, re-set of the multiplicand and multiplier receiving devices can be effected after such multiplicand and multiplier have been entered into the machine and while the machine is performing other cycles of operation other than the computing or entering cycles. For this purpose, near the end of the cycle designated A on the timing diagram, cam contacts PMA and PMB close. Current then flows from left side of line 274 through switch 275 now closed, through PMA and through 74C. Current also flows from left side of line through PMB and thence through 74D and back to ground. Energization of 74C and 74D then brings about re-set of the multiplier receiving device D and of the multiplicand receiving devices C and C'. The purpose of the switch 275 is to provide for introducing a multiplicand once in the machine and thereafter to leave it in the machine so that subsequent multiplications can be made from the same multiplicand. By merely opening switch 275, the re-set cycle of receiving devices C and C' is suppressed and accordingly, the multiplicand set up will be maintained for any desired number of machine operations.

When it is desired to clear out such multiplicand, it is only necessary to close switch 275 and operate the machine.

Reset of accumulators B and B' and A and A' is effected in another machine cycle as will be noted on the timing diagram. PMC closes shortly before the end of the C cycle. Closure of PMC energizes 74A and 74B and thus brings about a re-setting of the A and A' registers and the B and B' registers concurrently.

The operation of the machine will be briefly summarized with reference to the timing diagram.

It will be assumed that cards are already in the machine and that the machine has been started so that a card is about to be passed under the brushes. On the diagram there are four zones designated A, B, C and D. Each of these zones corresponds to one counter cycle and the four zones taken together correspond to one card handling and punching cycle.

It will be noted that the picker advances in cycle A but that the card is passed under the brushes in cycle D. The passage of the card under the brushes has entered the amount from the card into multiplicand and multiplier receiving devices C and C' and D. Beyond the cycle marked D there are an indeterminate number of computing cycles of the machine during which the computation is effected. The number of these cycles will depend upon the size of the problem being computed.

During these so-called computing cycles which are shown in the timing diagram at E and F the entire punch and card handling section of the machine is stationary. After the various computing cycles have been completed as determined by the cycle controller which has previously been explained, the cycle of the card handling section of the machine is automatically resumed. The first step is to transfer a summation of left hand components into the summation of right hand components. This is effected in cycle A of the card handling mechanism.

The next step is to read out the complete products from registers A and A'. This is effected in cycle B and also lapses over into cycle C as shown on the timing diagram. It is during cycle B also that re-set of the multiplicand and multiplier is effected. Punching of the product which has been read out is effected in cycle C as shown. Re-setting of product registers A and A' and B and B' is effected in cycle D. The card finders, viz. the devices shown in Fig. 41, operate during the C cycle and the magnet knock-offs also operate during the C cycle. The time of operation of the card finders is carefully coordinated to the punch operation.

During the D cycle, the product counters A and A' and B and B' are re-set and it will be noted that during this same D cycle while these product counters are being re-set that the succeeding card is being read into the multiplicand and multiplier receiving devices. Thus in the timing of the machine, the cycles are overlapped so as to save operating time as much as possible and to concurrently perform two or more non-conflicting operations.

It has heretofore been explained that there is a transfer of a carryover increment from B' to B and also from A' to A in order to make devices A and A' constitute one complete accumulator and to similarly make B and B' constitute one complete accumulator. The circuit control for this transfer mechanism will now be described. As has heretofore been explained in connection with Fig. 16, the counter wheel of the highest order of accumulators A' and B' namely the eighth order wheel has secured to it a commutator device generally designated 370 (see Figs. 16 and 21). On the circuit diagram the commutator device pertaining to the A' accumulator is designated 370A' and that pertaining to the B' accumulator is designated 370B'. The configuration of these commutators are as shown in the circuit diagram and in Fig. 21 and cooperating with each commutator there are a plurality of brushes 372, 374 and 376. Inasmuch as the circuit and mode of operation of each of these transfer devices is the same, only one will be explained. The arrangement of the commutator and brushes is such that brushes 372 and 374 are shorted when 9 stands upon the adding wheel and brushes 374 and 376 receive an impulse when the commutator and associated adding wheel passes from the 9 to zero position. Assume 9 to be standing on the highest order wheel of either accumulator A' or B'. Under these conditions 372 and 374 will be resting on the spot on the commutator, but brush 376 will not be on any conducting spot on the commutator. Now assume that a carryover increment comes into the 8th order wheel (the highest order) from the 7th order wheel (the next lower order) by reason of action of the tripping mechanism 105.

This action which prepares for mechanical transfer into the 8th order wheel will have closed contacts 107. Current then flows as follows: from left side of line 274 through 378, thence through brush 374, brush 372, contacts 107 now closed and magnet 103 which pertains to the units order of accumulator A or B as the case may be. This will add one into the units wheel of A or B. This will effect the transfer under these conditions. Now assume another condition. Assume that an amount say 8 is standing on the highest order wheel of accumulator A' or B' and that an amount is added on to this wheel directly by the entry mechanism which causes it to pass beyond the 9 to zero position. Such motion of the adding wheel will provide for flow of current through 378, through 374 and 376 and serve to energize relay 380 and the coils of relay 382. A stick circuit is now established through cam contacts CF now closed, through the relay 380 and 382 and so on to ground. The energization of the coil of 382 then establishes another circuit as follows: From 378 through CF now closed, through 382, through 103 and back to ground. Energization of 103 effects a transfer in the units order of A or B as before.

For convenience in understanding, the operation of the machine, diagram Fig. 39, has been prepared which shows generally the flow of entries through the machine.

As shown, the multiplicand and multiplier are derived from the card. The multiplier is entered into receiving device D. The multiplicand, however, is set up in duplicate upon C and C', that is, the same multiplicand is set up on C as is set up on C'. The impulse emitter 240 sends out its impulses and selection is made from D to the right through the X1 to X9 relays and through the set-up devices pertaining to register C1 designated 322RH, thus forming right component product representing impulses. These are entered through the line 336 into the accumulators A' and A. The multiple arrows show the column shift devices which on the circuit diagram are designated CS1 to CS8 inclusive. Also under the control of the multiplier receiving device D there is a selection to the left through the X2 to X9 devices through the set-up devices 322LH pertaining to receiving device C, thence through similar column shift devices CS1 to CS8 inclusive and into accumulators B and B'. The arrows intermediate B and B' and A and A' represent the transfer of the accumulation from B and B' into A and A'. Then following out from A and A' are lines which extend back to the card to represent the punching of the ultimate product back upon the card.

Referring now to Fig. 3, it will be appreciated that in some cases it may be desirable to provide for carrying out two separate sets of computations. For example, there may be two multiplicands designated in Fig. 3, the A multiplicand and the B multiplicand. It also may be desirable to provide for two multipliers, viz. the A multiplier and the B multiplier. Then in computing, there can be a computation formed to give A times A and a separate computation can be performed to give B times B. By changing plugging computation A times B and B times A might be performed.

The machine heretofore described with a simple addition to the circuit diagram previously explained, is capable of performing such multiple or split computation. This will now be described in connection with the circuit diagram, Figs. 28a to 28d inclusive and Fig. 29.

To provide for this sort of a split computation, the lines leading out of the 322RH reading out devices to the buses 334 and the lines leading out from the 322LH reading out devices to the buses 344 are interrupted and provided with plug sockets designated 400 and 402 in Fig. 29.

Additional relays are provided in the machine of the type shown in Figs. 17 and 18 and such relays are provided with sets of contacts in pairs designated 404. Such contact sets 404 are actuated for closure by a magnet 406 and another set of relay contacts 408 are provided actuated for closure by a magnet 410. The pairs of contacts 404 and 408 are provided with individual plug sockets 412, 414, 416 and 418 respectively.

As clearly shown in the diagram, Fig. 29, it is possible to selectively connect the 322RH devices or the 322LH devices by plug connections either to the contacts 404 or to the contacts 408.

As shown, the four read-out devices 322RH to the right are connected by plugs to the 408 contacts and similarly the four 322LH read-out devices to the right are connected to other 408 contacts. Also both of the four corresponding read-out devices to the left are connected by plugs to the 404 sets of contacts.

It will be apreciated that by selectively energizing 406 or 410 that contacts 404 can be closed or 408 can be closed. In the operation of the machine, it is only necessary to provide means for keeping the 406 relay magnet energized for the number of orders of the multiplier pertaining to the B computation and thereafter to provide means to deenergize 406 and energize 410 so that the A part of the multiplicand may be multiplied. This result is obtained in the following manner.

On each of the relays CS1 to CS8 inclusive, an additional contact is provided which will be termed Z. These contacts CS1Z to CS8Z have one side wired in common to a line 420 which through a switch 422 extends to left side of line 274. The other side of these contacts CS1Z to CS8Z are wired to double throw switches generally designated 424. The switches 424 may be selectively thrown to connect the contacts through to a common line 426 or to a common line 428 or to off position. Line 426 leads to the relay magnet 410 and thence back to ground and line 428 leads to magnet 406 and thence back to ground.

It will be understood that contacts 404 and 408 are selectively plugged up in accordance with the splitting of the multiplicand, in this instance the split is between the fourth or thousandth and the fifth or normally ten thousandth position, which ten thousandth position when the machine is operated in this manner becomes a secondary units position. The switches 424 are selectively positioned in accordance with the split in the multiplier.

As shown in Fig. 3, the split in the multiplier is after the fourth order from the right, the next adjacent column being left blank. Accordingly, the fifth switch 424 from the right is thrown to mid position. All of the other switches to the right of this fifth switch being thrown to connect with line 426. The two next switches to the left of the mid position switch are thrown to the opposite positions so as to connect them with line 428.

With this circuit arrangement, the machine then proceeds to carry out the double split computation which is shown in Fig. 3 of the drawings.

It will be understood that it is not necessary to split the multiplier at the same place that the multiplicand is split. For example, in place of splitting the multiplicand between the fourth and fifth position, the multiplicand might be split between the fifth and sixth positions. With this splitting the switches 424 can be left in the position shown or otherwise shifted to meet the particular computation which is being performed.

By referring to Fig. 29 in the circuit diagram, it will be obvious that the splitting of the outgoing lines from 322RH and 322LH by means of the contacts 404 and 408 and the plug connections leading thereto will serve during the operation of the machine to prevent any multiplying computation being effected on the split off portion of these read-out devices. Thus in the computation under consideration in Fig. 3, while 5226 is set up on the read-out devices, there are no impulses flowing out from the left hand group of read-out devices while the computation is being performed on the other group.

Later in the cycle, however, when the computation is completed upon the right hand group of multiplier amounts a reading flows out from the left hand group. This is clearly shown in Fig. 3 wherein 5226 is shown in dotted lines signifying that while there is a setting of this amount, there is no computation made based upon it while multiplying by the multiplier 3645. Such computation does come, however, later on down where the figures are shown in solid lines at which time there is a suppression of multiplication upon the other part of the multiplicand which, however, still remains set up.

Referring to Fig. 30, this figure shows another type of computation which the machine is capable of performing with the general circuit diagram of Figs. 28a and 28d inclusive. In this computation there are two multiplicands of different values which are to be both multiplied by a common multiplier amount. The machine is merely plugged up to provide a sufficient columnar capacity between the multiplicand amounts and the computation is performed in a similar manner as the computation for Fig. 2 heretofore given.

In the Fig. 31 there is shown a detail of the way the plugging would be connected up from the total counters A and A' to the punch selector magnets 171. As shown, the plug connections between 356 and 358 are so connected that a considerable space is left between the two results on the record card. Obviously any arrangement of plugging can be made as desired and it will be also noted that one of the read out plug sockets 356 has no plug connection whatsoever as no reading is taken from this particular column.

Referring now to Fig. 32, in some cases it may be desirable to leave the multiplier in the machine as a constant and permit computations with changeable multiplicands.

This is particularly desirable where the multiplier comprises the smaller number of digits and to save machine time, it is preferable that the smaller number of digits be used as the multiplier. In cases where this multiplier remains constant and the multiplicand is a variable amount, other changes in the circuit diagram can be made to provide for this form of computation.

To provide for this sort of an operation, each adding wheel of the multiplier counter or register or receiving device D is provided with a commutator 432 (see Fig. 48) and such commutator 432 has a single conducting spot 434 thereon adapted to bridge a circuit between a pair of brushes 436. This circuit is thus closed from brush to brush when the adding wheel stands at zero.

The machine is also provided with another relay of the type similar to Figs. 17 and 18 but having additional sets of contacts of a different type as shown in Fig. 47. The arrangement of this relay is such that a common contact can cooperate with either one of a pair of contacts. In Fig. 47, 438 is the common contact and 440 and 442 are the individual contacts. These relay contacts are wired in the outgoing circuit from the coils T1, etc. and U, to the common line back to ground to which contacts S1 to S8 inclusive connect. 442 is the normally made contact, 440 are the normally open contacts and 438 is the bridging contact. It may be also mentioned that the arrangement of the special relay of Fig. 47 is such that contact 440 makes with 438 before 438 breaks contact with 442. This is provided by the particular spring bias of contacts 442 and 438.

As shown in Fig. 32, contacts 442 are wired in series to contacts S1, etc., whereas contacts 440 are wired individually to one of the brushes 436. The circuit is completed by the segment spot 434 to the other brush and thence to the outgoing line to ground 276.

Heretofore, it has been explained that when a multiplier amount is entered into receiving device D, such of the contacts S1 to S8 inclusive as pertain to columns which receive significant figures are opened and on columns wherein no significant figures are received, such contacts remain closed.

As has been previously explained, during the successive steps of multiplication, the setup of relays T1, T2 etc. and U, is destroyed after the computation has been carried out. However, by the provision of the additional relay construction and the commutators on the various adding wheels such setup can be retained after a particular column of a computation has been completed. The special relay contacts shown in Fig. 47 and marked on the circuit diagram 440, 438 and 442 have a controlling magnet similar to that of Fig. 17 and which is designated 446 on the circuit diagram. An additional cam contact device PMR is provided on the machine. The cam being disposed upon shaft 230 as shown by dotted lines in Fig. 12. The circuit to cam contacts PMB is provided with a switch 448 between the cam contacts PMB and the left side of line 274. Re-set magnet 74D is also provided with a supplementary actuating member 450 adapted to open a pair of contacts 452 when 74D is energized.

It will be understood that if switch 448 is open, counter D will not be re-set at its usual time, but will remain with the setting of the multiplier set up upon it. Contacts 452 will then remain closed. Then during the operation of the machine when cam contacts PMR close which as shown in the timing diagram is during the B cycle of the punching end of the machine, the closure of these contacts will energize 446. This will actuate the relay device controlled by magnet 446 to close the normally open contacts 440 and 438 and to open up contacts 438 and 442.

The effect of this operation is to provide for the de-energizing of coils T1, T2, etc. and U on any columns of the receiving device in which there is a significant number standing upon the wheels of the receiving device. If in lieu of a significant number there is a zero standing upon such order of the receiving device the commutator device 432—434, will maintain the circuits closed leading to T1, T2, etc. This will prevent these relays from becoming de-energized and provide for a column skip at that point. Thus the effect of the various mechanisms described heretofore in connection with Fig. 32, is to substitute a counter reading for a card reading and inasmuch as this particular counter D is not re-set successive repetitions of readings can be taken from it until such time when repeated multiplication by the same multiplier is no longer desired. At this time the operator of a machine merely closes switch 448 whereupon the next operation of the machine will energize 74D and re-set this counter D so that there is no longer any repeated multiplication.

It will be understood that according to the foregoing operation in accordance with circuit diagram, Fig. 32, the practice will be to punch the multiplier only in the first card of a group and to leave the multiplier field in the subsequent cards in that field blank.

Heretofore, in the specification and hereinafter in the claims, the term "notation" and the terms "digits of a notation" or significant numbers of a notation are used. By the term notation when referring to the decimal system, the Arabic or decimal notation of nine digits is signified and while the invention is here shown as adapted to a multiplication involving the Arabic or decimal notation it is not limited to such decimal notation. It may be used in computations involving other notations than the decimal notation where the significant numbers are not merely the digits 1 to 9 inclusive. The term "progression" is also used in the commonly accepted mathematical sense, that is a series of numbers which increase by a common difference. In forming the product representing impulses, use is made of this progression term to define the progression which is based upon the notation and one of the factors of the computation. For example, with the decimal notation and a multiplier of 3, the progression would be as follows: 3, 6, 9, 12, 15, 18, 21, 24 and 27. The term "transient representation" is also used to signify a representation which is created and which may then be obliterated. A differentially timed electrical current impulse is such a transient representation.

For clearness of description, the following résumé of some of the points of operation of the machine and the terminology may be given. The emitter 240 of Fig. 28a is capable of creating transient representations or of potentially creating impulses. When these representations are actually created they are in the form of differentially timed electrical current impulses, which by their timing with reference to the cycle of operation of the machine, are representative of digits or significant numbers of the notation. The emitter 240 creates only as many impulses as there are digits or significant numbers in the notation to be represented.

The impulses are impressed upon the lines 330, which lines 330 are what might be termed "digit lines," there being as many of these lines as there are digits in the notation which is to be represented. The impulses are imparted to lines 330 coordinated as to a progression based on units. From such lines 330 there is a subsequent coordination to coordinate the impulses into one or more progressions based upon a multiplier factor or factors. This coordination is effected by the devices X1 to X9 inclusive. From lines 332 and 342 which carry these coordinated impulses and which lines may be termed "progression impulse lines" there is a selection by devices 322RH and 322LH which devices in addition to selecting some or all of the impulses have the additional function of providing a primary denominational allocation to the outgoing and selected impulses. These selected impulses upon which there has been a primary denominational allocation flow on lines 334 and 344. From these lines there is a secondary denominational allocation to the impulses delivered to the receiving devices AA' and BB' over lines 336 and 346. Such secondary denominational allocation is effected by the devices CS1 to CS8 inclusive on Figs. 28a and 28b. It may be mentioned that the secondary denominational allocation is a progressive one, that is, on the first computing cycle it enters into one set of orders of the receiving device and on the second computing cycle it enters into ten times as great a value and so on.

We claim:

1. In a calculating machine having an emitter which has the potential capability of emitting impulses one for each digit, which impulses are differentially timed so that by their timing they are representative of the digits of a notation, a plurality of digit lines leading from the emitter, one for each digit of the notation, an accumulating type of receiving device adapted to receive and be controlled by differentially timed impulses from said emitter, lines leading to said receiving device, selector means for control of impulse flow over said last mentioned set of lines and for selection of digits and denominational allocation of impulses which flow to the receiving device, electromagnetically controlled coordinating switching means intermediate the digit lines from the emitter and the selecting means for coordinating the emitted impulses in accordance with a predetermined progression, and electromagnetically controlled switching means intermediate the selector means and the lines leading to the receiving device for controlling the flow of impulses into selected columnar orders of the receiving device.

2. The invention set forth in claim 1 in which the electromagnetically coordinating means comprise a plurality of relay devices, one of which is provided for each digit or significant number of the notation involved in one of the factors of a computation.

3. The invention according to claim 1 wherein the accumulating type of receiving device includes an accumulator for right hand components of partial products and an accumulator for left hand components of partial products and wherein the electromagnetic coordinating means includes devices for concurrently coordinating left hand and right hand partial product component impulses.

4. In a calculating machine having an emitter with provisions for emitting impulses which are differentially timed so that by their individual timing they are individually representative of the digits of a notation, a plurality of digit lines leading therefrom, each of which receives an impulse pertaining to one digit only, a double set of selectors settable to represent a factor of multiplication, one set for controlling formation of right hand components of partial products and the other set for controlling formation of left hand components of partial products, a set of digit lines associated with each set of selectors, and electromagnetically controlled coordinating switching means selectively operable in accordance with another factor intermediate the selectors and digit lines from the emitter.

5. In a calculating machine including in combination, means for handling records, means for concurrently deriving from a record the factors of a plurality of to be performed computations, means for retaining said factors in the machine, multiplying devices with product receiving means therefor, means for first controlling the multiplying devices by the aforesaid means which retains one set of factors, means for thereafter controlling the multiplying means by the means which retains a second set of factors, and means controlled from the product receiving means of the multiplying devices for concurrently recording the results of the plurality of computations.

6. The invention set forth in claim 5 in which the recording means cooperates with the record from which the plurality of factors relating to the plurality of separate to be performed computations were derived to record back upon the same record the product results of the several computations.

7. A calculating machine with multiplicand receiving devices, multi-denominational readout means set thereby, multiplier receiving devices, means for selectively splitting the readout means set by the multiplicand receiving devices into a plurality of separate sections so that a plurality of separate multiplicands may be set up and multiplied therefrom, and multiplying devices controlled by the multiplicand receiving devices as split by said last mentioned means and by the multiplier receiving devices.

8. In a calculating machine including factor entry means, multiplying means, and recording means, means for concurrently entering the factors of a plurality of multiplying problems into the factor entry means of the machine, means for successively automatically carrying out the separate computations by the multiplying means, and means for recording concurrently the separate products by the recording means.

9. An accounting machine having a series of digit lines one for each digit of a notation over which differentially timed impulses are adapted to flow, a series of progression lines over which the impulses flow and a series of denominational lines over which the impulses flow, and electromagnetic switching means controlled in accordance with one factor of a multiplication problem to control the flow of impulses from the digit lines to the progression lines and selector devices controlled in accordance with another factor of said problem intermediate the progression lines and the denominational lines to control the flow of impulses from the first mentioned to the latter mentioned lines.

10. The invention set forth in claim 9 in which a supplementary set of denominational lines are provided and in which selectively operable electromagnetic switching means control the flow of impulses thereto from the other denominational lines and control the denomination value of the transmitted impulses.

11. In an accounting machine in combination, a common impulse emitter, a series of digit lines one for each digit of a notation and having the capability of having impressed thereon and individually on each line by said emitter electrical impulses which are relatively differentially timed with respect to each other according to the digits of a notation, including in combination a common set of outgoing lines, a series of switching devices for the different digits of a notation associated with the lines to coordinate the transmission of impulses from the digit lines to the outgoing lines according to a progression, one switching device when effective transmitting impulses to the set of outgoing lines according to a progression based on one digit and the other switching devices when effective each coordinating the transmission of impulses to the same set of outgoing lines according to other progressions based upon the other and different digits of the notation and selectively operable electromagnetic means for controlling the operation of said switching devices selectively depending upon which digit is to determine the progression, and a factor entry set up device set up according to digit values of a factor for selectively controlling said last named means.

12. In an accounting machine including a receiving device which is controlled by differentially timed impulses, a series of digit lines one for each digit of a notation, an impulse emitter adapted in each cycle of operation to be capable of emitting to each digit line one impulse which is differentially timed according to the value of the digit and of the line and including in combination electromagnetic switching means for the different digits of a notation associated with the lines for coordinating the impressed impulses on their way to the receiving device according to a progression based on one digit or to other progressions based on one or the other of the different other digits of a notation, and means set up according to one or more entered digits of a factor for selectively controlling said last mentioned means according to which digit or digits is to determine the progression.

13. A calculating machine including multiplying devices and means for entering into the machine by one entering operation a plurality of multiplicands and a common multi-denominational multiplier, means for concurrently carrying out the several separate multiplications by the multiplying devices and for setting up the separate products upon a products receiving means, and means controlled from the products receiving means for recording the separate products distinctly with the omission of the recording of zeros intermediate the separate products to distinctly separate them.

14. A multiplying machine including in combination, multiplier entry receiving means with an associated readout means, multi-contact multiplying control relays selectively called into action under the control of the aforesaid readout means, multiplicand entry receiving devices with dual selective readout means controlled thereby to control the transmission of impulses representative of left hand and right hand components of partial products, products receiving means receiving such transmitted impulses and multi-contact column shift relays intermediate the dual selective readout means and the products receiving means and controlled for column shifting by the readout means of the multiplier entry receiving means.

15. The invention set forth in claim 14 in which a cycle controller is provided for eliminating unwanted and unnecessary multiplying cycles, said cycle controller also selectively controlling the appropriate column shift relays.

16. In a calculating machine having multiplying devices, the machine being adapted to perform a succession of calculating cycles in computing a single problem and for also computing a succession of different problems, record controlled multiplicand factor receiving means which receive first one multiplicand factor for one problem from one record of a run, then become cleared and thereafter receive other multiplicand factors each pertaining to a different problem from each of the following records of a run, a multiplier factor entry receiving and retaining means controlled to receive a multiplier factor pertaining to one problem and to retain that factor set up while a plurality of succeeding complete and separate different problems are computed, a cycle controller for eliminating unwanted and unnecessary calculating cycles, means for controlling said cycle controller by sensing the multiplier factor entry retaining means for one factor of the first problem and for repeating such sensing and control of the cycle controller for each and every succeeding complete and separate different following problem, said sensing control of the cycle controller detecting the presence or absence and location of zeros in various denominational orders of the entered factor.

17. A calculating machine with multiplicand entry receiving devices, multiplier entry receiving devices, multiplying devices controlled by both of the aforesaid entry receiving devices, means providing for the selective splitting of the multiplicand entry receiving device into a plurality of separate sections so that a plurality of separate multiplicands may be set up and multiplied, and means provided for the selective splitting of the multiplier entry receiving device into a plurality of separate sections so that a plurality of separate multipliers may be set up and used as multipliers for the set up multiplicands.

18. The invention set forth in claim 17 in which means is provided for selectively associating any of the multiplier sections with any of the multiplicand sections so that multiplications may be made under the control of any multiplicand section and any associated multiplier sections.

19. The invention set forth in claim 17 wherein the means for selectively splitting the multiplier section includes means for separating the lowest order of section from the highest order of the next adjacent section by a column in which no set up of a number is made to thereby separate the two products and prevent overlapping thereof.

20. In a calculating machine including multiplying devices, means for entering into the machine by one entering operation the factors of a plurality of separate computation problems which are to be separately computed by the machine, means for utilizing the factors of one computation problem for controlling the multiplying devices to carry out the computation of one problem, and means for thereafter calling the multiplying devices into operation to carry out another separate and distinct computation according to the factors of the next of the aforesaid plurality of separate computation problems.

21. The invention set forth in claim 20 in which the multiplying means cooperates with product receiving means, and in which means is provided controlled from the product receiving means for recording concurrently the results of the plurality of computations, said recording means including provisions to provide for the selective distinct separation of the separate computed results to separate them to any extent desired by the operator.

22. An accounting machine having a series of digit lines for each digit of a notation, over which differentially timed impulses are adapted to flow, a series of progression lines over which the impulses flow and a series of denominational lines over which the impulses flow to a receiving device, multiplier set up devices, electromagnetic switching means controlled by said devices to control the flow of impulses from the digit lines to the progression lines, multiplicand selector devices and supplemental electromagnetic switching means to control the flow of impulses from the progression lines to the denominational lines, said selector devices making a first denominational allocation of impulse flow according to the denominations of the multiplicand and said supplemental switching means making a further denominational allocation of impulse flow according to the order of the multiplier being used, said electromagnetic switching devices and selector devices being both disposed intermediate the progression lines and the denominational lines.

23. A multiplying machine including in combination multiplier entry receiving means with an associated readout means, multiplying control multi-contact relays selectively called into action under the control of the aforesaid readout means, multiplicand entry receiving devices with dual selective readout means controlled thereby to control the transmission of impulses representative of left hand and right hand components of partial products, an impulse emitter having the potential capability of emitting differentially timed impulses, one for each digit of the notation employed and differentially timed according to the value of the digit represented, digit lines leading from the emitter to one set of contacts of the multiplier relays, other lines leading from the other set of contacts of the multiplier relays to the dual multiplicand selective readout devices, products receiving means receiving impulses transmitted from the emitter, and multi-contact column shift relays intermediate the dual selective readout means and the products receiving means and controlled for column shifting by the readout means of the multiplier entry receiving means.

24. A multiplying machine including multiplying devices, means upon which a plurality of multiplier factors may be established for use in multiplying computations, means upon which a plurality of multiplicand factors may be established, means correlating each multiplier factor with one of the multiplicand factors, and means for selectively effecting multiplication of a multiplicand factor by its correlated multiplier factor.

JAMES W. BRYCE.
GEORGE F. DALY.